US012091247B2

(12) United States Patent
Medford et al.

(10) Patent No.: US 12,091,247 B2
(45) Date of Patent: Sep. 17, 2024

(54) WAREHOUSING SYSTEM FOR STORING AND RETRIEVING GOODS IN CONTAINERS

(71) Applicant: Symbotic LLC, Wilmington, MA (US)

(72) Inventors: Matthew Medford, Wilmington, MA (US); Elizabeth Clark-Polner, Wilmington, MA (US); Jeffrey Adam Traina, Wilmington, MA (US); Edward Macdonald, Somerville, MA (US); Colton Ebersold, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 647 days.

(21) Appl. No.: 17/358,383

(22) Filed: Jun. 25, 2021

(65) Prior Publication Data

US 2022/0002081 A1   Jan. 6, 2022

Related U.S. Application Data

(60) Provisional application No. 63/044,721, filed on Jun. 26, 2020.

(51) Int. Cl.
*B65G 1/04* (2006.01)
*B65G 1/06* (2006.01)
*B65G 1/137* (2006.01)

(52) U.S. Cl.
CPC ............. *B65G 1/0492* (2013.01); *B65G 1/06* (2013.01); *B65G 1/1373* (2013.01)

(58) Field of Classification Search
CPC ....... B65G 1/0492; B65G 1/06; B65G 1/1373
See application file for complete search history.

(56) References Cited

U.S. PATENT DOCUMENTS 5,636,966 A    6/1997  Lyon et al.
5,953,234 A *  9/1999  Singer ................. B65G 1/1378
                                        700/214
(Continued)

FOREIGN PATENT DOCUMENTS

CA    2974039    7/2016
CA    3104014    12/2019
(Continued)

OTHER PUBLICATIONS

International Search Report for application No. PCT/US22/71520 dated Jun. 21, 2022.

*Primary Examiner* — Saul Rodriguez
*Assistant Examiner* — Ashley K Romano
(74) *Attorney, Agent, or Firm* — Perman & Green, LLP

(57) ABSTRACT

A product order fulfillment system of mixed product units, the system includes a storage array, an automated transport system, with at least one asynchronous transport system, for level transport, and a lift for between level transport, communicably connected to the storage array so as to automatically retrieve and output, from an output of the storage array, product units distributed in cases in a common part of the storage array. The at least one asynchronous transport system, and the lift are configured so as to form more than one transport echelon, each echelon being communicably connected with the common part and the output, and each effecting orthogonal sortation, corresponding to the transport echelon, of the product units distributed in the common part, so that sorted mixed output product units of the corresponding transport echelon are in predetermined sequence.

30 Claims, 36 Drawing Sheets

(56) References Cited

U.S. PATENT DOCUMENTS

| | | | | |
|---|---|---|---|---|
| 5,996,316 | A * | 12/1999 | Kirschner | B65G 1/1378 53/238 |
| 7,119,689 | B2 * | 10/2006 | Mallett | B07C 7/005 705/308 |
| 8,965,559 | B2 * | 2/2015 | Pankratov | B65G 57/09 700/228 |
| 9,656,804 | B2 * | 5/2017 | Lyon | G06Q 10/0875 |
| 9,914,586 | B2 | 3/2018 | Zhu et al. | |
| 9,975,148 | B2 | 5/2018 | Zhu et al. | |
| 10,207,871 | B2 | 2/2019 | Issing | |
| 10,248,112 | B2 | 4/2019 | Zhu et al. | |
| 10,435,241 | B2 * | 10/2019 | Lert | B65G 1/0492 |
| 10,988,269 | B2 * | 4/2021 | Almogy | B65G 1/127 |
| 11,142,398 | B2 * | 10/2021 | Lert, Jr. | B65G 1/0492 |
| 11,203,486 | B2 * | 12/2021 | Lert, Jr. | B65G 1/0435 |
| 11,332,310 | B2 * | 5/2022 | Lert, Jr. | B65G 1/1378 |
| 11,348,066 | B2 * | 5/2022 | Galluzzo | B65G 1/1373 |
| 2014/0088758 | A1 | 3/2014 | Lert et al. | |
| 2014/0148944 | A1 | 5/2014 | Bailey et al. | |
| 2015/0081090 | A1 * | 3/2015 | Dong | B25J 13/08 700/230 |
| 2017/0334646 | A1 | 11/2017 | High et al. | |
| 2019/0202635 | A1 | 7/2019 | Conrad et al. | |
| 2019/0270537 | A1 | 9/2019 | Amend, Jr. et al. | |
| 2019/0375589 | A1 | 12/2019 | Gravelle et al. | |
| 2019/0389671 | A1 | 12/2019 | Cohen et al. | |

FOREIGN PATENT DOCUMENTS

| | | |
|---|---|---|
| WO | 2017036780 | 5/2017 |
| WO | 2019172966 | 9/2019 |

* cited by examiner

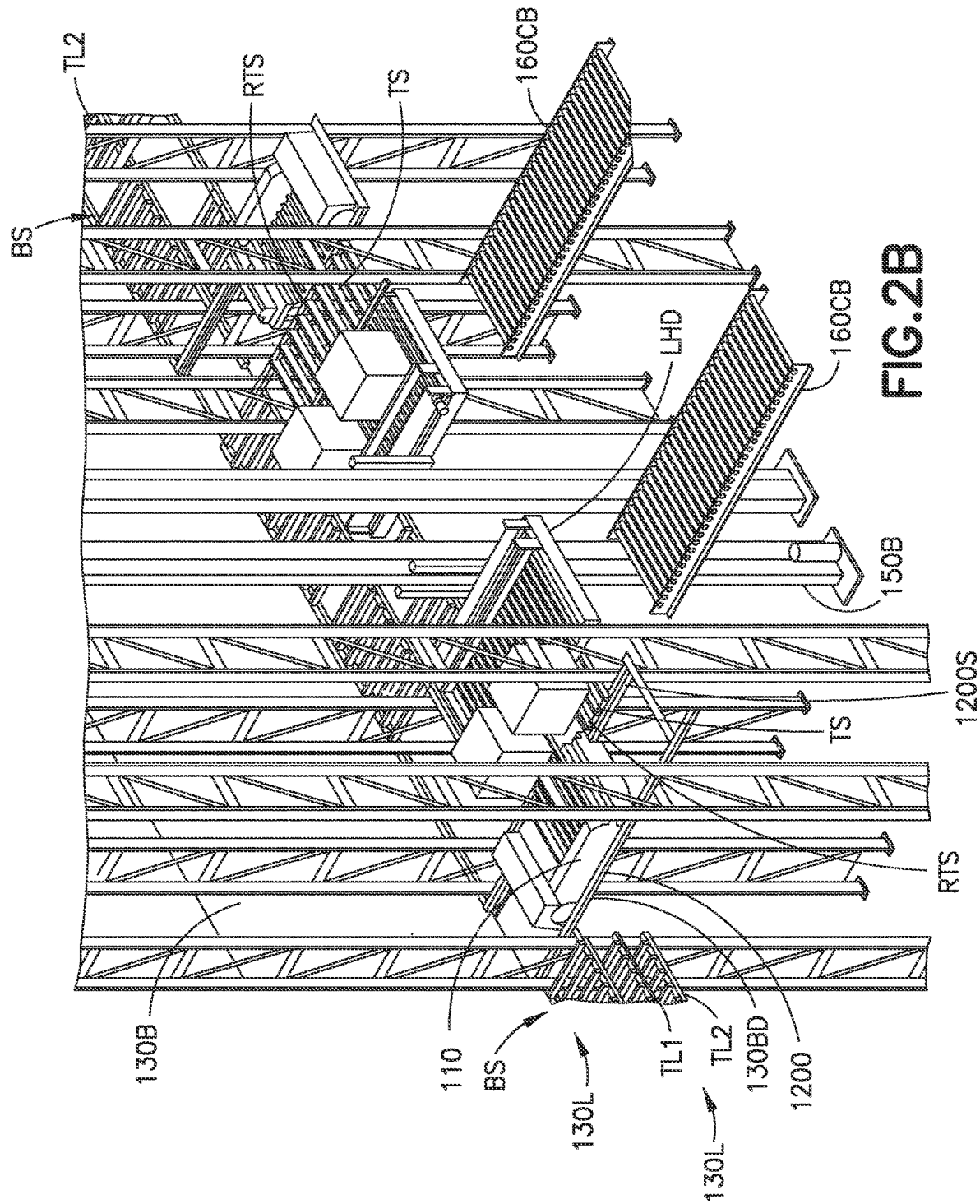

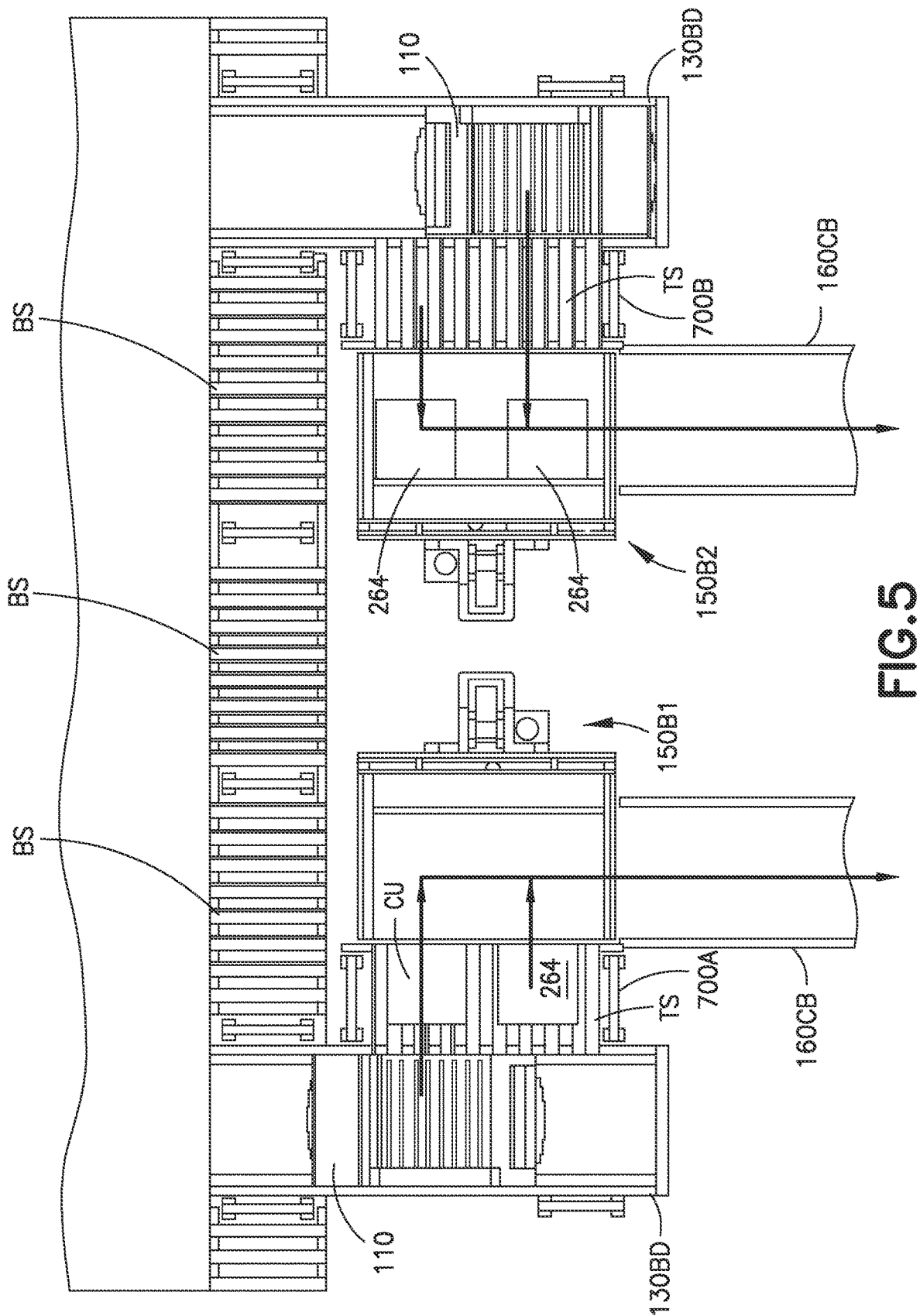

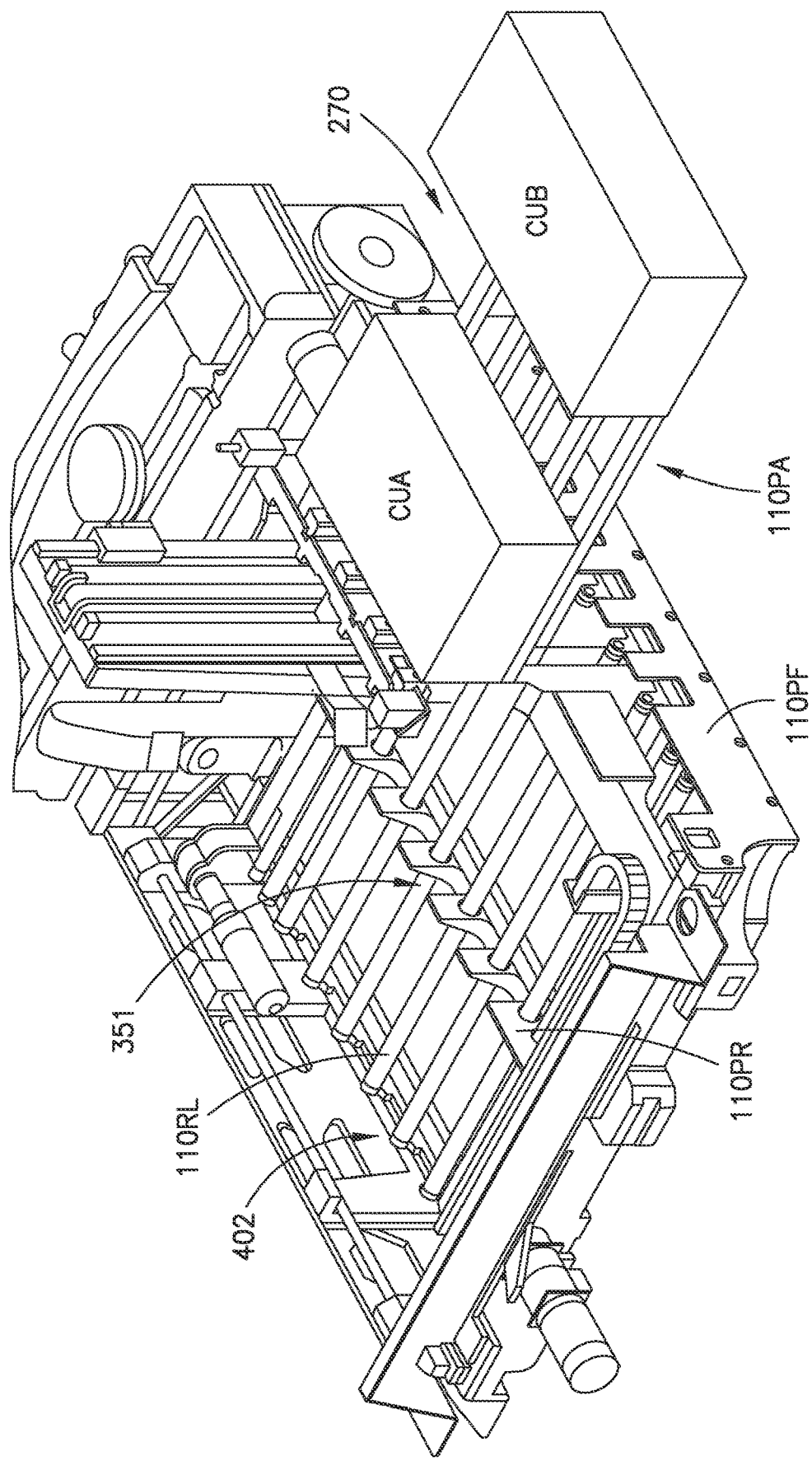

WAREHOUSING SYSTEM FOR STORING AND RETRIEVING GOODS IN CONTAINERS

CROSS-REFERENCE TO RELATED APPLICATIONS

This application is a non-provisional of and claims the benefit of U.S. provisional patent application No. 63/044,721 filed on Jun. 26, 2020, the disclosure of which is incorporated herein by reference in its entirety.

BACKGROUND

1. Field

The disclosed embodiment generally relates to material handling systems, and more particularly, to transport and storage of items within the material handling system.

2. Brief Description of Related Developments

It is well recognized that integration of automated storage and retrieval systems into a logistic chain, particularly goods to man systems, are highly advantageous throughout efficiency and cost of the logistics chain. Conventional systems, even with a high level of automated storage and retrieval system integration in a logistic facility operate generally by storing product (e.g., supply) containers, where the supply containers include cases, packs, etc. that contain a common type of goods (also referred to as products) in the supply containers. The product containers may arrive on pallets (e.g., of common supply containers) or as truck loads, and are either depalletized or unloaded from trucks, and stored in the logistics facility, distributed throughout the storage volume (e.g., in a three-dimensional array of storage racks) of the logistic facility by the automated storage and retrieval system.

Order fulfillment from the logistic facility, particularly in the event that mixed product containers are desired (e.g., wherein any given order container may have mixed/different products or product types held by a common container such as in cases of direct to consumer fulfillment, or if indirect to consumer, such as via a retail order pick up location, the ordered mix of products in the order container is generated, at least in part, at the logistic facility prior to output from the logistic facility) conventionally, generation of mixed product containers is effected with the automated storage and retrieval system goods to person configuration by the automated storage and retrieval system outputting the product/supply containers (each containing one or more goods items of a common good type, i.e. each goods item in the product container is the same or substantially similar) from storage locations throughout the three-dimensional array of storage racks to workstations, manual or automated, to pick and remove goods from the different product/supply containers, fed by the automated storage and retrieval system to the given workstation, pursuant to a given fulfillment (or fill) order, and to place the different picked goods (mixed or common if a given order contained is so filled) into order containers. Such workstations may be referred to as breakpack stations, wherein the product container is "broken" down and its contents may be placed in order containers in whole or in part, or into what may be referred to as a breakpack storage container (e.g., totes) such as where the product container is unsuitable for continued holding of remaining product items after the breakpack operation, and such remaining products (i.e., the remainder of products in the "broken" down product container) should be returned to storage in the three-dimensional array of storage racks by the automated storage and retrieval system. In order to increase efficiency, order containers may also be entered into the three-dimensional array of storage racks, and potentially to storage locations on the storage racks storing product containers, until such time as order output is desired, both entry and output from the three-dimensional array of storage racks is otherwise effected by the automated storage and retrieval system.

Conventionally, breakpack stations have been arranged on a single common level (e.g., ground level or a level common or proximate with the logistic facility fill load exits) to efficate output of order containers, filling an order, from the breakpack station to exit, or otherwise have been distributed at different levels around or within the three-dimensional array of storage racks to efficate transfer by the automated storage and retrieval system of product containers between storage locations and the breakpack station, and enter/re-enter of order containers and breakpack storage containers (collectively referred to herein as breakpack goods containers) from the breakpack station to storage locations with the automated storage and retrieval system. An example of a conventional system and method of order fulfillment by preparing storage units at a pick station is disclosed in U.S. Pat. No. 9,988,212 issued on Jun. 5, 2018. U.S. Pat. No. 9,988,212 describes a method of order fulfilling by making order and/or product units available from a storage facility in a desired sequence at a picking station. The storage facility may include a plurality of multilevel storage racks in which order and/or product units are stored, an automatic storage and retrieval device, such as a shuttle, which retrieves and stores orders and/or products units, and lifts used to transfer the order and/or products units to at least one storage-exit conveyor, wherein each lift is directly connected to a picking station in a picking level by a storage-entry conveyor and the storage-exit conveyor. Conventional system, such as the one described above, are constrained, to a limited exchange interface (defined substantially by the footprint of the breakpack station) between supply containers and breakpack goods containers. This limits throughput through the pick station to that performed in the space immediate to the breakpack operator. An improved system is desired.

BRIEF DESCRIPTION OF THE DRAWINGS

The foregoing aspects and other features of the disclosed embodiment are explained in the following description, taken in connection with the accompanying drawings, wherein:

FIGS. 2A, 2B, 2C, 2D, and 2E are schematic illustrations of portions of the storage and retrieval system in accordance with aspects of the disclosed embodiment;

FIG. 5 is a schematic illustration of a portion of the transport vehicle in accordance with aspects of the disclosed embodiment;

FIGS. 6A-6F are schematic illustrations of portions of the transport vehicle in accordance with aspects of the disclosed embodiment;

DETAILED DESCRIPTION

Figure 1:
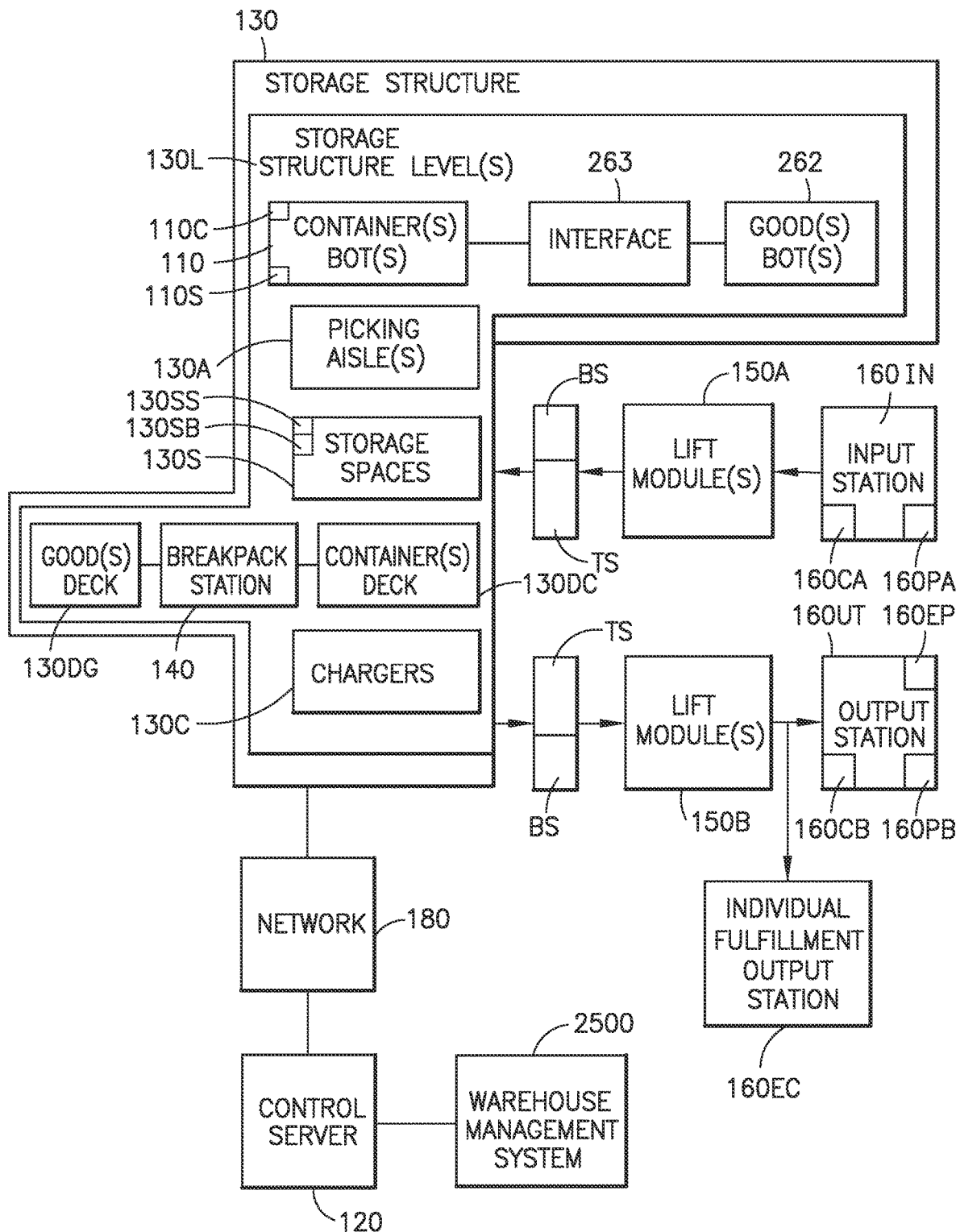
FIGS. 1 and 1A are schematic illustrations of an automated storage and retrieval system in accordance with aspects of the disclosed embodiment.

FIG. 1 is a schematic illustration of an automated storage and retrieval system (also referred to herein as a warehousing system or product order fulfillment system) 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center, warehouse, or the back of a retail store. The automated storage and retrieval system may operate to, for example, fulfill orders received from retail stores for case units such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes, in containers (such as containers of remainder goods after breakpack where the broken down case unit structure is unsuitable for transport of the remainder goods as a unit) or on pallets. In still other examples, the case units are a combination of uncontained and contained items. It is noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping or sent to a downstream logistics process (e.g., such as goods to person automation) without being palletized. In one or more aspects the case units are segmented case units that include multiple order profiles in one case unit (e.g., such as a segmented tote). Here, the segmented case unit may increase the product density within the case unit and any downstream logistics (e.g., downstream packaging solution such as the goods to person automation). It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the aspects of the disclosed embodiment the storage and retrieval system 100 described herein may be applied to any environment in which case units are stored and retrieved.

Figure 15:
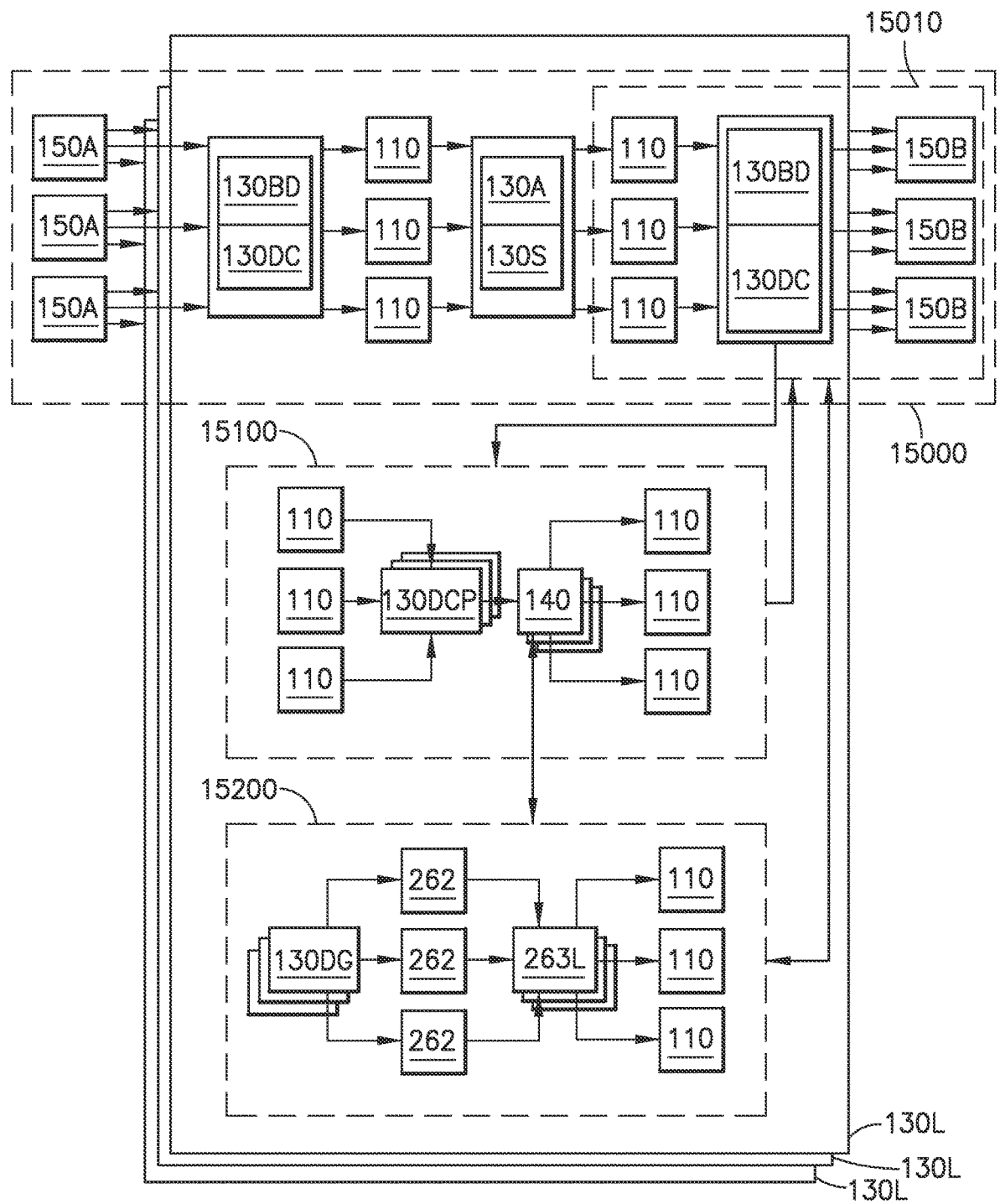
FIG. 15 is a schematic block diagram of orthogonal sortation echelons of the automated storage and retrieval system of FIGS. 1 and 1A in accordance with aspects of the disclosed embodiment.
Figure 17A:
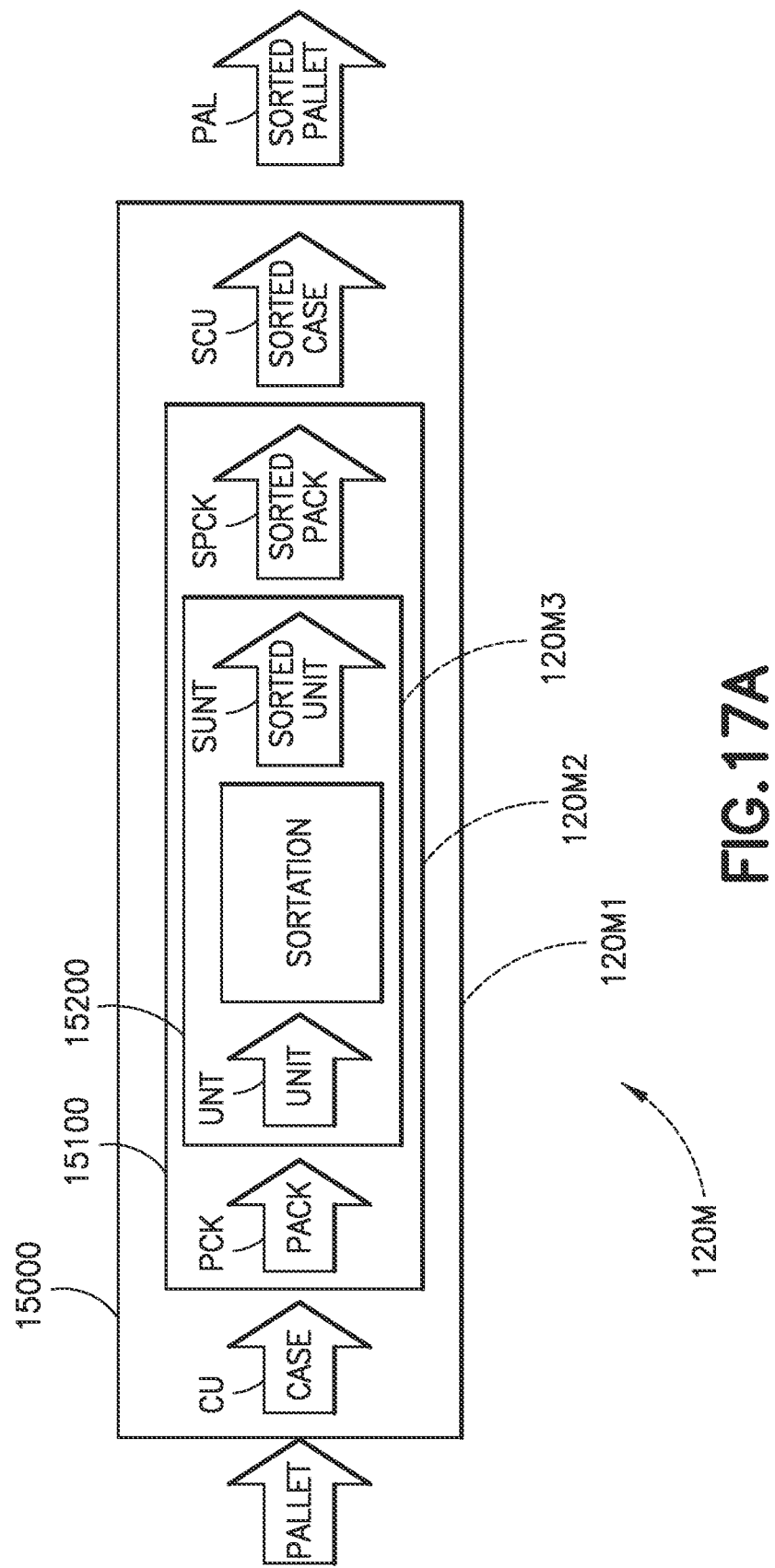
FIG. 17A is a schematic illustration representing a structural configuration of the orthogonal sortation echelons of the automated storage and retrieval system and a controller structure of the automated storage and retrieval system in accordance with aspects of the disclosed embodiment.

Referring to FIGS. 1, 15, and 17A, in accordance with the aspects of the disclosed embodiment, the automated storage and retrieval system 100 includes orthogonal sortation transport echelons 15000, 15100, 15200 (also referred to herein as sortation echelons) that discriminate sortation of goods (e.g., pallets, cases, containers, package of goods, individual (unpacked) goods (referred to herein as units or eaches), etc.). The discrimination of the sortation of the goods effects or otherwise makes sortation of the goods separate and distinct (e.g., effects a further discrimination of the sortation of goods) from the transport of the goods through the automated storage and retrieval system 100. The orthogonal sortation echelons 15000, 15100, 15200 provide for recursive sortation of goods such that sortation is effected by breaking down goods components (e.g., pallets, cases, packs, units) to the smallest necessary goods component, individually sorting the smallest necessary goods component, and then reassemble the smallest necessary goods component(s) into larger groups (e.g., reassemble into one or more of pallets, cases, packs). Each of these reassembled larger groups each sorted at each and every iteration of reassembly. As an example, referring to FIG. 17A, where the smallest necessary goods component is a unit (also referred to herein as an each), an incoming pallet is broken down into cases, a case containing the unit is broken down into packs, the pack is broken down into the units. A desired number of unit(s) is/are sorted at the unit level and reassembled into a sorted pack. A desired number of sorted packs are sorted at the pack level and reassembled into a sorted case. A desired number of sorted cases are sorted at the case level and are assembled into a sorted pallet load PAL. Here, sortation is drilled down to a desired sortation level and the sorted items are reassembled and sorted in a recursive manner to effect building of the pallet load PAL.

In accordance with aspects of the disclosed embodiment, orders for filled items (e.g., the pallets, cases, containers, package of goods, individual (unpacked) goods, etc.) may be stochastic (e.g., substantially random in the items ordered and a time the order is received) and may be fulfilled by the automated storage and retrieval system 100 as function of time (e.g., sortation of ordered goods at a predetermined scheduled time in advance of a time the order is to ship/be fulfilled or in a sortation of goods in a just-in-time manner). These stochastic orders are determinative of a pick sequence of sorted items, such as for building a pallet load or pallet PAL as described herein with respect to FIG. 1E (see also, e.g., U.S. Pat. No. 8,965,559 titled "Pallet Building System" and issued on Feb. 24, 2015, the disclosure of which is incorporated herein by reference in its entirety). While the pallet in FIG. 1E is illustrated and described as a mixed case pallet, such illustration is also representative of a pallet load having mixed cases, mixed totes, mixed packs, mixed units (or eaches) per tote, etc. Here, the sorted items are picked from a common storage array (e.g., a storage array formed by storage spaces 130S of storage structure 130). The automated storage and retrieval system 100 effects a maximum throughput of goods for each order (e.g., received for processing by the automated storage and retrieval system 100) by employing or otherwise processing the order through one or more of the orthogonal sortation echelons 15000, 15100, 15200 to a sortation level needed (e.g., e.g., the controller 120 drills/drives down through the orthogonal sortation echelons to effect the desired level of sortation needed for a given order—a case level sortation, a pack level sortation, a unit/each level sortation or a combination thereof) to effect a given order from the common storage array independent of order type (e.g., a pallet order, a case order, a pack order, mixed orders, etc.), independent of order sequence, and independent of order time.

The orthogonal sortation echelons 15000, 15100, 15200 are controlled by controller 120 to effect a maximum flexibility of order fulfillment by discriminating the sortation of goods at various levels of sortation from the transport of those goods so as to provide a maximum throughput of goods through the automated storage and retrieval system 100. Correspondingly the orthogonal sortation echelons 15000, 15100, 15200 effect a minimized fill cost for each order processed through the automated storage and retrieval system 100.

Figure 2A:
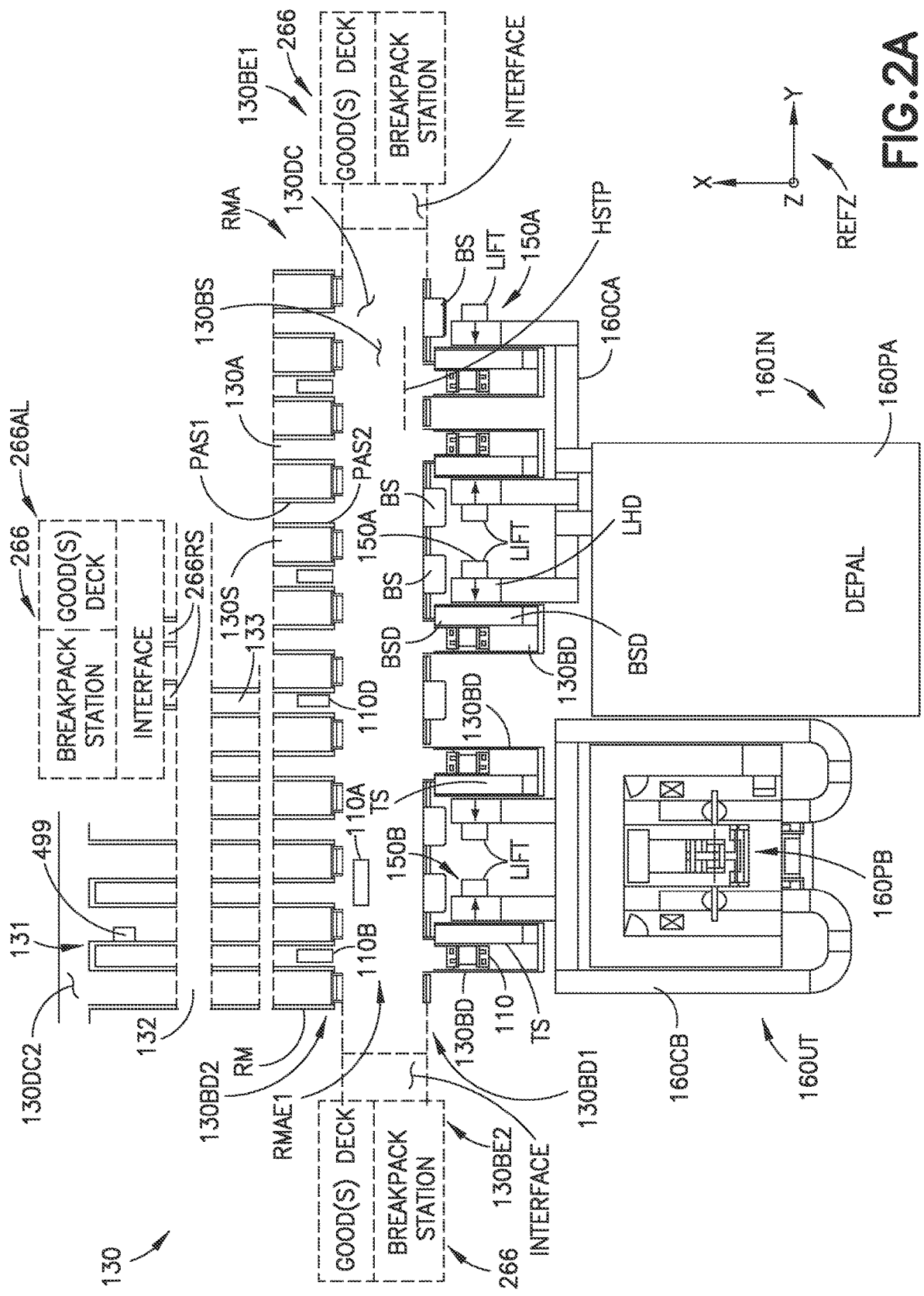
Figure 2C:
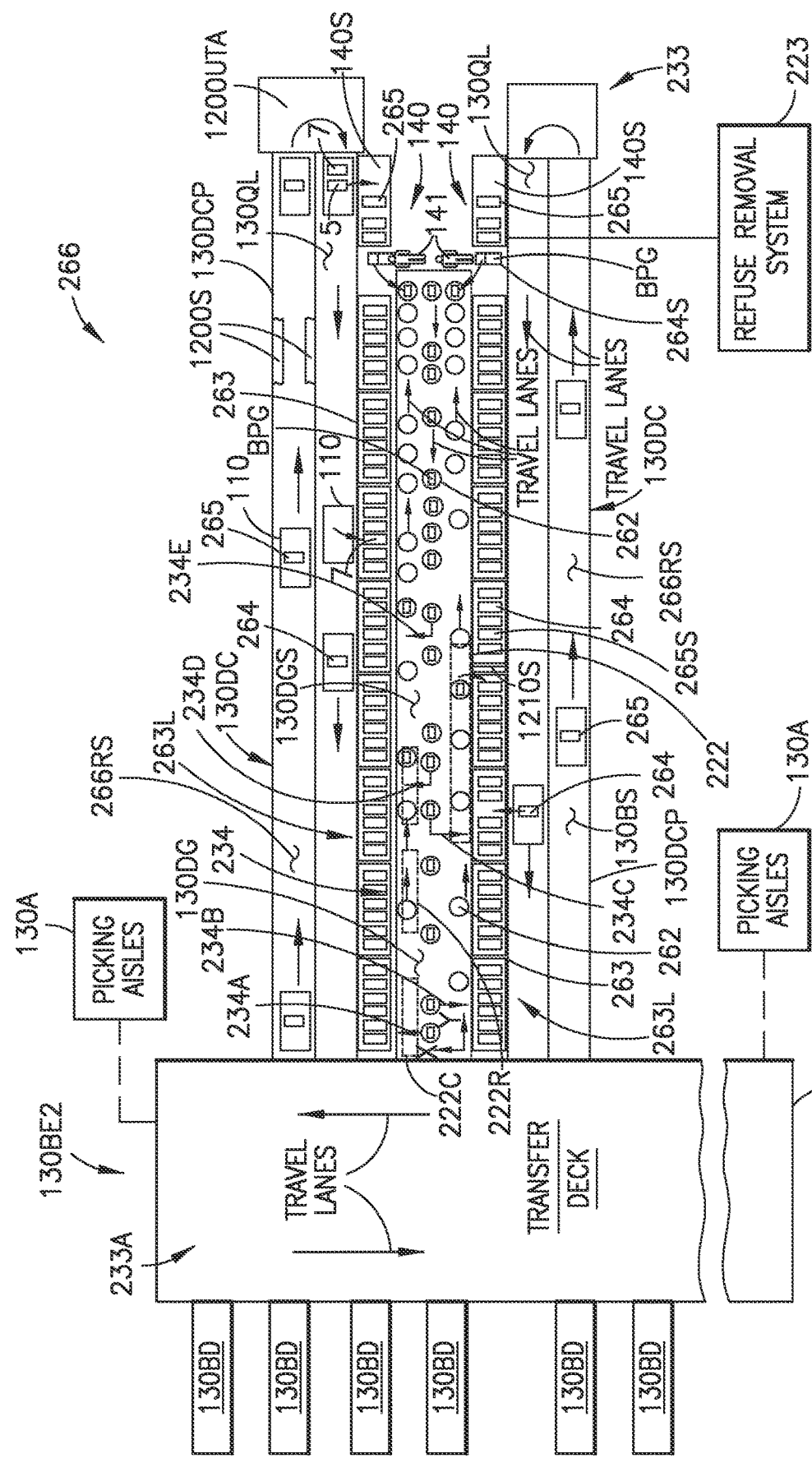

In accordance with the aspects of the disclosed embodiment, the automated storage and retrieval system 100 includes one or more breakpack modules 266 (see FIG. 2C). The breakpack modules 266 may form one or more of the orthogonal sortation echelons 15100, 15200 as described herein. The breakpack modules 266 are configured to break down product containers or case units CU into breakpack goods containers for order fulfillment as will be described further herein. In breakpack modules 266 may operate as an automated decant process for downstream logistics such as goods to person automation. One or more breakpack modules 266 may be located on a common level 130L of the automated storage and retrieval system, where one or more levels of the automated storage and retrieval system 100 include at least one breakpack module 266. The breakpack module(s) 266 may be plug and play modules that may be coupled to any suitable portion of the structure of the automated storage and retrieval system 100. For example, the breakpack module(s) may be coupled to a container transfer deck 130DC or picking (or pick) aisle(s) 130A of the automated storage and retrieval system 100 as will be described in greater detail below. The breakpack module(s) 266 may be disposed on any suitable number of stacked storage levels of the automated storage and retrieval system 100. Here, the automated storage and retrieval system 100 may be configured, such as through any suitable controller (e.g., control server 120) so that the automated storage and retrieval system 100 has selectable modes of operation. In one mode of operation the automated storage and retrieval system 100 is configured to output product cases, containers, and/or case units to a palletizer. In another mode of operation, such as with the breakpack module(s) 266 employed, the automated storage and retrieval system 100 is configured to break down product cases, product containers, and/or case units and output breakpack goods containers, product cases, containers, and/or case units to a palletizer, or in other aspects, re-enter the breakpack (order) container(s) and/or a remainder of a product cases, containers, and/or case units to a palletizer (e.g., after being broken down) into storage for later retrieval.

The controller 120, as may be realized, is configured to effect operation of a container bot 110 and a goods bot 262 (both of which form at least part of the asynchronous transport system) (see also, e.g., FIG. 2C) for assembling orders of breakpack goods BPG from supply containers 265 into breakpack goods containers 264 and outfeed of breakpack goods containers 264 through container outfeed stations TS as will be described herein. For example, the controller 120 is configured to effect operation of the container bot(s) 110 between the container storage locations 130S, the breakpack operation station 140, and a breakpack goods container 264 located along the breakpack goods transfer deck 130DG. As another example, the controller 120 is configured to effect operation of the goods bot(s) 262 so that transport of the breakpack goods BPG, by the goods bot 262 traverse on the goods transfer deck 130DG, sorts the breakpack goods BPG, e.g., in a unit/each level sortation, to corresponding breakpack goods containers 264. As a further example, the controller 120 is configured to effect operation of the container bot(s) 110 so that the container bot(s) 110 accesses corresponding breakpack goods containers 264 at the goods transfer deck 130DG and transports the breakpack goods containers 264 via traverse along the container transfer deck 130DC to at least one of a container output/transfer station TS and a corresponding container storage location 130SB of storage shelves of a corresponding level 130L of the multilevel storage array.

The controller 120 is also configured to effect operation of the container bot(s) 110 and lifts 150 (e.g., to form a container supply system) so as to introduce empty breakpack goods containers 264 into the automated storage and retrieval system so that the container bot(s) 110 transport the empty breakpack goods containers 264, along the transport loops 233, 233A of the container transfer deck(s) 130DC and into a breakpack module 266 for placement at a breakpack goods interface location(s) 263L of a breakpack goods interface 263 for transfer of breakpack goods BPG into the breakpack goods containers 264. In other aspects, empty breakpack containers 264 may be transferred to (in a manner similar to that noted above with the lifts and container bots) and stored in the storage spaces 130SB, 130S of the rack modules RM or buffered at an infeed station, where the controller 120 is configured to effect transfer of the empty breakpack goods containers 264 from the storage spaces 130SB, 130S or buffer location to the breakpack goods interface 263 in a manner similar to that described above. In one or more aspects, the controller 120 is configured to effect operation of the container bot(s) 110 and lifts 150 (e.g., forming a container supply system) so as to introduce empty supply containers 265 or standardized containers 265S (as described herein) into the automated storage and retrieval system so that the container bot(s) 110 transport the empty supply containers 265 or standardized containers 265S, along the transport loops 233, 233A of the container transfer deck(s) 130DC and to the breakpack operation station 140 of a breakpack or directly or indirectly to a downstream logistics process such as the goods to person process.

Also referring to FIG. 1E, it is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In one aspect of the disclosed embodiment, the storage and retrieval system 100 may be configured to generally include an in-feed section, a storage and sortation section (where, in one aspect, storage of items is optional) and an output section as will be described in greater detail below. As may be realized, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. As may also be realized in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases in the manner described in U.S. Pat. No. 9,856,083 issued on Jan. 2, 2018 and having application Ser. No. 14/997,920, the disclosure of which is incorporated herein by reference in its entirety.

The storage and sortation section includes, as will be described in greater detail below, a multilevel automated storage system that has an automated transport system that in turn receives or feeds individual cases into the multilevel storage array for storage in a storage area (such as storage spaces 130S of the storage structure 130). The storage and sortation section also defines outbound transport of case units from the multilevel storage array such that desired case units are individually retrieved in accordance with commands generated in accordance to orders entered into a warehouse management system, such as warehouse management system 2500, for transport to the output section. In other aspects, the storage and sortation section receives individual cases, sorts the individual cases (utilizing, for example, the buffer and interface stations described herein), e.g., in a case level sortation, and transfers the individual cases to the output section in accordance to orders entered into the warehouse management system. The sorting and grouping of cases according to order (e.g. an order out sequence) may be performed in whole or in part by either the storage and retrieval section or the output section, or both, the boundary between being one of convenience for the description and the sorting and grouping being capable of being performed any number of ways. The intended result is that the output section assembles the appropriate group of ordered cases, that may be different in SKU, dimensions, etc. into mixed case pallet loads in the manner described in, for example, U.S. patent application Ser. No. 13/654,293 filed on Oct. 17, 2012 (now U.S. Pat. No. 8,965,559) the disclosure of which is incorporated herein by reference in its entirety.

In the disclosed embodiment, the output section generates the pallet load in what may be referred to as a structured architecture of mixed case stacks. The structured architecture of the pallet load described herein is representative and in other aspects the pallet load may have any other suitable configuration. For example, the structured architecture may be any suitable predetermined configuration such as a truck bay load or other suitable container or load container envelope holding a structural load. The structured architecture of the pallet load may be characterized as having several flat case layers L121-L125, L12T as described in U.S. Pat. No. 9,856,083, previously incorporated by reference herein in its entirety.

In accordance with aspects of the disclosed embodiment, referring again to FIG. 1, the automated storage and retrieval system 100 includes a storage array (e.g., storage structure 130 having storage spaces 130S) with at least one elevated storage level 130L. It is noted that while the storage array is described as a three dimensional storage array, in other aspects the storage array may be a two dimensional storage array (e.g., single level floor), the back of a truck, or any other suitable storage array where case units may be transferred directly by the storage and retrieval system 100 (such as by the container bots 110) or indirectly (e.g., by fork trucks or other vehicle/operator placing case units on a conveyor in a predetermined sequence (grouped stock keeping units or other categorical sequencing)) to a breakpack module 266. Where the storage array is a single level (i.e., single level floor) the breakpack module 266 is located on the floor level of the storage array. Mixed product units (e.g., packs PCK and units/eaches UNT—see FIGS. 16A-16E) are input and distributed in the storage array in cases CU of product units of common kind per case CU (each case input to the system 100 holds a common kind of stock keeping unit (SKU)). For example the automated storage and retrieval system 100 includes input stations 1601N (which include depalletizers 160PA and/or conveyors 160CA for transporting items (e.g., inbound supply containers) to lift modules 150A for entry into a storage level 130L of the storage structure 130).

As will be described herein, the automated storage and retrieval system 100 includes an automated transport system (e.g., bots, breakpack modules, and other suitable level transports described herein) with at least one asynchronous transport system for transporting cases/products on a given storage structure level 130L (e.g., level transport). Here, as will be described, the storage and retrieval system 100 includes undeterministic container bots 110 that travel along one or more physical pathways of the storage and retrieval system to provide at least one level of asynchronicity. At least another level of asynchronicity is provided (as described herein) such that, for example, case/product holding locations are greater than the number of bots transporting cases/products. At least one lift 150 is provided for transporting cases/products between storage levels (e.g., between level transport) or the cases/products may be presorted an on a predetermined level before a container bot 110 retrieves the cases/products (e.g., such that the lift does not transfer the cases/products between levels for container bot 110 retrieval). The at least one lift 150B is communicably connected to the storage array as described herein so as to automatically retrieve and output, from the storage array, product units distributed in the cases in a common part (e.g., the storage locations 130S of a respective storage level 130L) of the at least one elevated storage level 130L of the storage array. The output product units being one or more of mixed singulated product units, in mixed packed groups, and in mixed cases as described herein (See FIGS. 16A-16E). As an example, the automated storage and retrieval system 100 includes output stations 160UT, 160EC (which include palletizers 160PB, operator stations 160EP and/or conveyors 160CB for transporting items (e.g., outbound supply containers and filled breakpack goods (order) containers) from lift modules 150B for removal from storage (e.g., to a palletizer (for palletizer load) or to a truck (for truck load)). Here the output station 160EC is an individual fulfillment (or e-commerce) output station where, for example, filled breakpack goods (order) containers including single goods items and/or small bunches of goods are transported for fulfilling an individual fulfillment order (such as an order placed over the Internet by a consumer). The output station 16OUT is a commercial output station where large numbers of goods are generally provided on pallets for fulfilling orders from commercial entities (e.g., commercial stores, warehouse clubs, restaurants, etc.). As may be realized, the automated storage and retrieval system 100 includes both the commercial output station 16OUT and the individual fulfillment output station 160EC; while in other aspects, the automated storage and retrieval system includes one or more of the commercial output station 16OUT and the individual fulfillment output station 160EC.

The automated storage and retrieval system 100 also includes the input and output vertical lift modules 150A, 150B (generally referred to as lift modules 150—it is noted that while input and output lift modules are shown, a single lift module may be used to both input and remove case units from the storage structure), a storage structure 130 (which may have at least one elevated storage level as noted above and in some aspects forms a multilevel storage array), and at least one autonomous container transport vehicle 110 (referred to herein as "container bots" and which for at least a part of the asynchronous transport system for level transport) which may be confined to a respective storage level of the storage structure 130 and are distinct from a transfer deck 130DC on which they travel. The lift modules 150 include any suitable transport configured to vertically raise and lower case units and are inclusive of reciprocating elevator type lifts, fork lift trucks, etc. It is noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL (FIG. 1E) for shipping. As used herein the lift modules 150, storage structure 130 and container bots 110 may be collectively referred to herein as the multilevel automated storage system (e.g. storage and sorting section) noted above so as to define (e.g. relative to e.g. a container bot 110 frame of reference REF—FIG. 4A—or any other suitable storage and retrieval system frame of reference) transport/throughput axes (in e.g. three dimensions) that serve the three dimensional multilevel automated storage system where each throughput axis has an integral "on the fly sortation" (e.g. sortation of case units during transport of the case units) so that case unit sorting and throughput occurs substantially simultaneously without dedicated sorters as described in U.S. Pat. No. 9,856,083, previously incorporated herein by reference in its entirety.

Figure 1A:
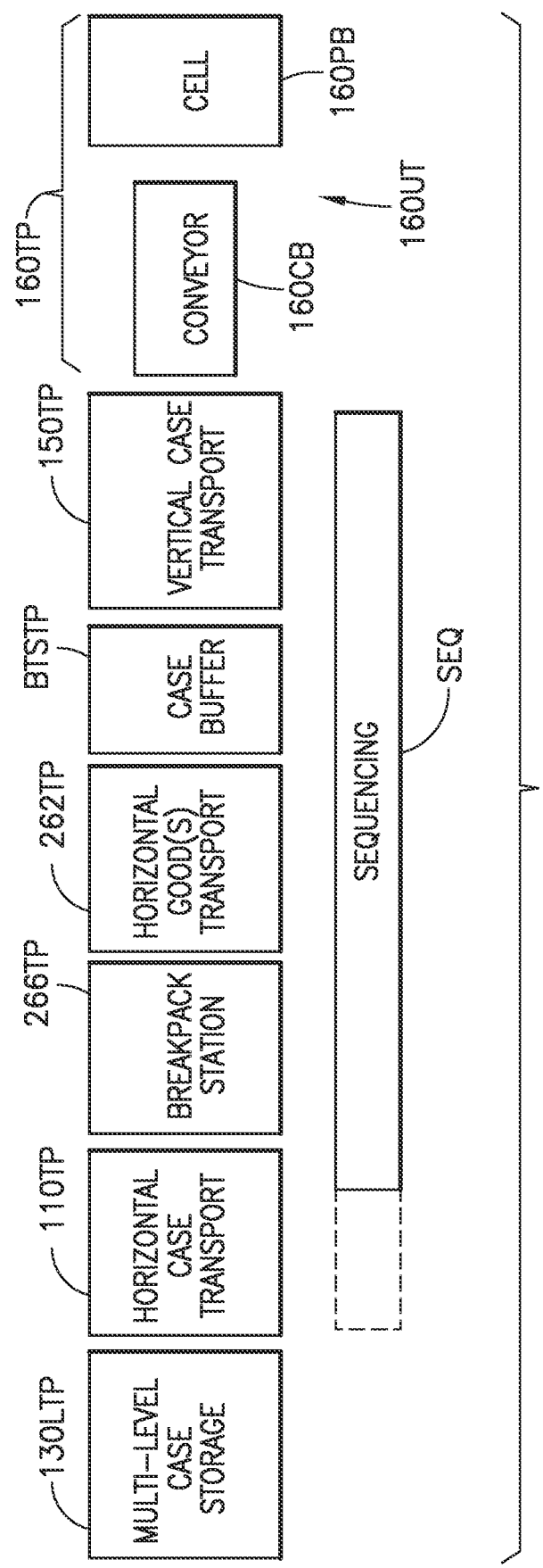

As an example of case unit or breakpack container throughput as it relates to sortation, referring also to FIG. 1A, the storage and retrieval system 100 includes several areas or regions of throughput. For example, there is multilevel case unit storage throughput 130LTP (e.g. placement of case units into storage), horizontal case unit transport throughput 110TP (e.g. a transfer of case unit(s) from storage along the picking aisles, transfer decks, and from a breakpack goods interface), breakpack station throughput 266TP (e.g., breakdown of supply cases at a breakpack operation station), horizontal goods transport throughput 262TP (e.g., transfer of breakpack goods from breakpack operation station to breakpack goods interface), case buffering throughput BTSTP (e.g. buffering of case units to facilitate transfer of the case units between storage/breakpack and vertical transport), vertical transport throughput 150TP (e.g. transfer of case units by the vertical lifts), and throughput at the output stations 160TP which includes, e.g., transport by conveyors 160CB and palletizing by palletizer 160PB. In one aspect sortation of case units, as described herein, is effected substantially coincident (e.g. "on the fly") with throughput 130LTP, 110TP, 266TP, 262TP, BTSTP, 150TP of case units along each throughput axis (e.g. the X, Y, Z axes relative to, for example, a container bot 110 and or lift 150 frame of reference) and sortation along each axis is independently selectable so that sortation is effected along one or more X, Y, Z axes.

Also referring to FIGS. 1, 1F, 2A, and 2C, the storage structure 130 may include a container autonomous transport travel loop(s) 233, 233A (e.g., formed on and along a container transfer deck 130DC), disposed at a respective level of the storage structure 130. It is noted that the lifts 150 are connected via transfer stations TS (also referred to herein as container infeed stations when the lift 150 is an inbound lift 150A or as container outfeed stations when the lift 150 is an outbound lift 150B) to the container transfer deck 130DC, and each lift is configured to lift one or both of supply containers 265 (empty or filled) (see FIG. 2C) and the breakpack goods containers 264 (empty or filled) (see FIG. 2C) into and out of the at least one elevated storage level 130L of the storage structure 130. Container storage locations (or spaces) 130S are arrayed peripherally along the container transfer deck 130DC. For example, multiple storage rack modules RM, configured in a high density three dimensional rack array RMA, are accessible by storage or deck levels 130L. As used herein the term "high density three dimensional rack array" refers to the three dimensional rack array RMA having undeterministic open shelving distributed along picking aisles 130A where, in some aspects, multiple stacked shelves are accessible from a common picking aisle travel surface or picking aisle level as described in U.S. Pat. No. 9,856,083, previously incorporated by reference herein in its entirety.

Each storage level 130L includes pickface storage/handoff spaces 130S (referred to herein as storage spaces 130S or container storage locations 130S) arrayed peripherally along the container transfer deck 130DC. At least one of the storage locations 130S is a supply container storage location 130SS, and another of the container storage locations is a breakpack goods (or order) container storage location 130SB. The storage spaces 130S are in one aspect formed by the rack modules RM where the rack modules include shelves that are disposed along storage or picking aisles 130A (that are connected to the container transfer deck 130DC) which, e.g., extend linearly through the rack module array RMA and provide container bot 110 access to the storage spaces 130S and transfer deck(s) 130B. In one aspect, the shelves of the rack modules RM are arranged as multi-level shelves that are distributed along the picking aisles 130A. As may be realized the container bots 110 travel on a respective storage level 130L along the picking aisles 130A and the container transfer deck 130DC for transferring case units between any of the storage spaces 130S of the storage structure 130 (e.g. on the level which the container bot 110 is located) and any of the lift modules 150 (e.g. each of the container bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one container transfer deck 130DC at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011 the disclosure of which is incorporated herein by reference in its entirety.

Figure 4A:
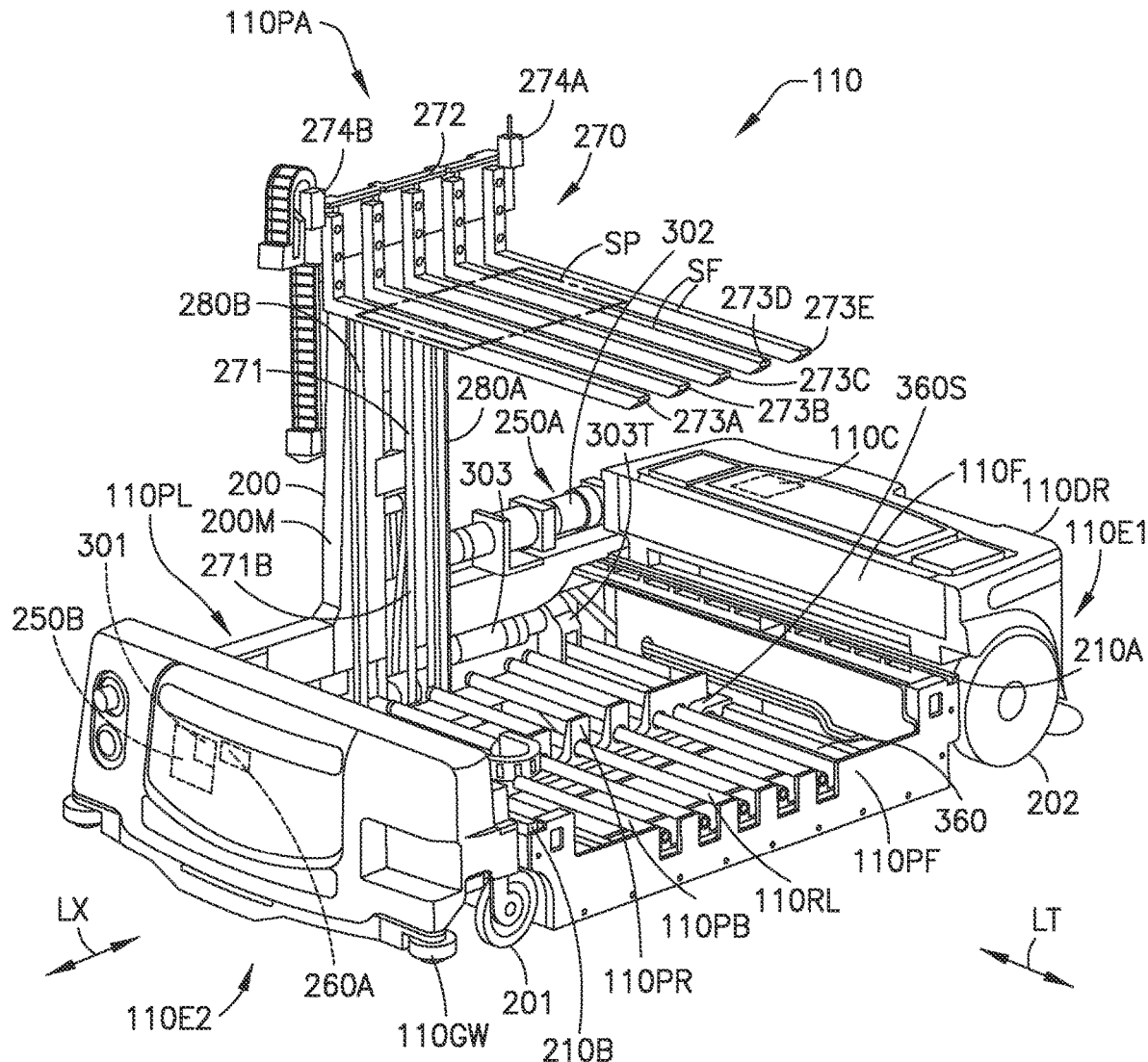
FIG. 4A is a schematic illustration of a transport vehicle in accordance with aspects of the disclosed embodiment.

The container transfer decks 130DC are substantially open and configured for the undeterministic traversal of container bots 110 along multiple travel lanes (e.g. along an X throughput axis with respect to the bot frame of reference REF illustrated in FIG. 4A) across and along the transfer decks 130B. As will be described in further detail below (and as described in U.S. Pat. No. 10,556,743 issued on Feb. 11, 2020 and having application Ser. No. 15/671,591, the disclosure of which is incorporated herein by reference in its entirety) the multiple travel lanes may be configured to provide multiple access paths or routes to each storage location 130S (e.g., pickface, case unit, container, or other items stored on the storage shelves of rack modules RM) so that container bots 110 may reach each storage location using, for example, a secondary path if a primary path to the storage location is obstructed. As may be realized, the transfer deck(s) 130B at each storage level 130L communicate with each of the picking aisles 130A on the respective storage level 130L. Container bots 110 bi-directionally traverse between the container transfer deck(s) 130DC and picking aisles 130A on each respective storage level 130L so as to travel along the picking aisles (e.g. along the X throughput axis with respect to the bot frame of reference REF illustrated in FIG. 4A) and access the storage spaces 130S disposed in the rack shelves alongside each of the picking aisles 130A (e.g. container bots 110 may access, along a Y throughput axis, storage spaces 130S distributed on both sides of each aisle such that the container bot 110 may have a different facing when traversing each picking aisle 130A, for example, referring to FIG. 4A, drive wheels 202 leading a direction of travel or drive wheels trailing a direction of travel). As may be realized, throughput outbound from the storage array in the horizontal plane corresponding to a predetermined storage or deck level 130L is effected by and manifest in the combined or integrated throughput along both the X and Y throughput axes. As noted above, the container transfer deck(s) 130DC also provides container bot 110 access to each of the lifts 150 on the respective storage level 130L where the lifts 150 feed and remove case units (e.g. along the Z throughput axis) to and/or from each storage level 130L and where the container bots 110 effect case unit transfer between the lifts 150 and the storage spaces 130S.

As described above, referring also to FIG. 2A, in one aspect the storage structure 130 includes multiple storage rack modules RM, configured in a three dimensional array RMA where the racks are arranged in aisles 130A, the aisles 130A being configured for container bot 110 travel within the aisles 130A. The container transfer deck 130DC has an undeterministic transport surface on which the container bots 110 travel where the undeterministic transport surface (also referred to herein as a deck surface) 130BS has multiple travel lanes (e.g., more than one juxtaposed travel lane (e.g. high speed bot travel paths HSTP)) for travel of the container bot 110 along the container autonomous transport travel loop(s) 233, 233A formed by the container transfer deck 130DC, where the multiple travel lanes connect the aisles 130A. The container autonomous transport travel loop 233A provides the container bot 110 with random access to any and each picking aisle 130A and random access to any and each lift 150A, 150B on the respective level 130L of the storage structure 130. At least one of the multiple travel lanes has a travel sense opposite to another travel lane sense of another of the multiple travel lanes (so as to form the container autonomous transport travel loop 233).

As may be realized, any suitable controller of the storage and retrieval system 100 such as for example, control server 120, may be configured to create any suitable number of alternative pathways for retrieving one or more case units (and/or breakpack containers) from their respective storage locations 130S when a pathway provided access to those case units is restricted or otherwise blocked. For example, the control server 120 may include suitable programming, memory and other structure for analyzing the information sent by the container 110, lifts 150A, 150B, and input/output stations 160IN, 16OUT, 160EC for planning a container bot's 110 primary or preferred route to a predetermined item within the storage structure. The preferred route may be the fastest and/or most direct route that the container bot 110 can take to retrieve the case units/pickfaces. In other aspects, the preferred route may be any suitable route. The control server 120 may also be configured to analyze the information sent by the container bots 110, the lifts 150A, 150B, and input/output stations 160IN, 16OUT, 160EC for determining if there are any obstructions along the preferred route. If there are obstructions along the preferred route the control server 120 may determine one or more secondary or alternate routes for retrieving the case units so that the obstruction is avoided and the case units can be retrieved without any substantial delay in, for example, fulfilling an order. It should be realized that the container bot route planning may also occur on the container bot 110 itself by, for example, any suitable control system, such as a controller (system) 110C onboard the container bot 110. As an example, the bot control system may be configured to communicate with the control server 120 for accessing the information from other container bots 110, the lifts 150A, 150B, and the input/output stations 160IN, 16OUT, 160EC for determining the preferred and/or alternate routes for accessing an item in a manner substantially similar to that described above. It is noted that the container bot 110 controller 110C may include any suitable programming, memory and/or other structure to effect the determination of the preferred and/or alternate routes.

Referring to FIG. 2A, as a non-limiting example, in an order fulfillment process the container bot 110A, which is traversing container transfer deck 130DC, may be instructed to retrieve item 499 from picking aisle 131. However, there may be a disabled bot 110B blocking aisle 131 such that the bot 110A cannot take a preferred (e.g. the most direct and/or fastest) path to the case unit 499. In this example, the control server 120 may instruct the container bot 110A to traverse an alternate route such as through any unreserved picking aisle (e.g. an aisle without a container bot in it or an aisle that is otherwise unobstructed) so that the container bot 110A can travel along, for example, another container transfer deck 130DC2 that is substantially similar to container transfer deck 130DC. The container bot 110A can enter the end of the picking 131, opposite the blockage, from the other container transfer deck 130DC2 so as to avoid the disabled container bot 110B for accessing the item 499. In another aspect, the storage and retrieval system 100 may include one or more bypass aisles 132 that run substantially transverse to the picking aisles 130 to allow the container bots 110 to move between picking aisles 130 in lieu of traversing the container transfer decks 130DC, 130DC2. The bypass aisles 132 may be substantially similar to travel lanes of the container transfer decks 130DC, 130DC2, as described herein, and may allow bidirectional or unidirectional travel of the container bots through the bypass aisle 132. The bypass aisle 132 may provide one or more lanes of container bot travel where each lane has a floor and suitable guides for guiding the bot along the bypass aisle 132 in a manner similar to that described herein with respect to the transfer decks 130DC, 130DC2. In other aspects, the bypass aisles 132 may have any suitable configuration for allowing the container bots 110 to traverse between the picking aisles 130. It is noted that while the bypass aisle 132 is shown with respect to a storage and retrieval system having transfer decks 130DC, 130DC2 disposed on opposite ends of the storage structure, in other aspects, a storage and retrieval system 100 having only one transfer deck may also include one or more bypass aisles 132.

In other aspects, a breakpack module 266AL may be located on a side of the container transfer deck 130DC on which the picking aisles 130 are located and one or more picking aisles 130 extend into the breakpack module 266AL so as to form container bot riding surface(s) 266RS. Here the container bot 110A is to deliver a supply container 265 to the breakpack module 266AL and the picking aisle 133 extending into the breakpack module is blocked by container bot 110D. In this aspect, the control server 120 and/or container bot controller 110C determines a secondary or bypass route for the container bot 110A to access breakpack station (either travelling along the other container transfer deck 130DC2 and/or bypass aisle 132) in a manner substantially similar to that described above with respect to item 499.

It is noted that the storage and retrieval systems shown and described herein have exemplary configurations only and in other aspects the storage and retrieval systems may have any suitable configuration and components for storing and retrieving items as described herein. For example, in other aspects, the storage and retrieval system may have any suitable number of storage sections, any suitable number of transfer decks, any suitable number of breakpack modules, and corresponding input/output stations.

As may be realized, the juxtaposed travel lanes are juxtaposed along a common undeterministic transport surface 130BS between opposing sides 130BD1, 130BD2 of the container transfer deck 130DC. As illustrated in FIG. 2A, in one aspect the aisles 130A are joined to the container transfer deck 130DC on one side 130BD2 of the container transfer deck 130DC but in other aspects, the aisles are joined to more than one side 130BD1, 130BD2 of the container transfer deck 130DC in a manner substantially similar to that described in U.S. patent application Ser. No. 13/326,674 filed on Dec. 15, 2011, the disclosure of which is previously incorporated by reference herein in its entirety. As will be described in greater detail below the other side 130BD1 of the container transfer deck 130DC may include includes deck storage racks (e.g. interface stations (also referred to as transfer stations) TS and buffer stations BS) that are distributed along the other side 130BD1 of the container transfer deck 130DC so that at least one part of the transfer deck is interposed between the deck storage racks (such as, for example, buffer stations BS or transfer stations TS) and the aisles 130A. The deck storage racks are arranged along the other side 130BD1 of the container transfer deck 130DC so that the deck storage racks communicate with the container bots 110 from the container transfer deck 130DC and with the lift modules 150 (e.g. the deck storage racks are accessed by the container bots 110 from the container transfer deck 130DC and by the lifts 150 for picking and placing pickfaces so that pickfaces are transferred between the container bots 110 and the deck storage racks and between the deck storage racks and the lifts 150 and hence between the container bots 110 and the lifts 150).

Referring again to FIG. 1, each storage level 130L may also include charging stations 130C for charging an onboard power supply of the container bots 110 on that storage level 130L such as described in, for example, U.S. patent application Ser. No. 14/209,086 filed on Mar. 13, 2014 and Ser. No. 13/326,823 filed on Dec. 15, 2011 (now U.S. Pat. No. 9,082,112), the disclosures of which are incorporated herein by reference in their entireties.

Referring to FIGS. 1, 2A, 2C, as noted above, the automated storage and retrieval system 100 includes one or more break pack modules 266. In one aspect, each breakpack module 266 has a container bot riding surface 266RS that forms a portion 130DCP of the container transfer deck 130DC, where the riding surface 2666RS is substantially similar to that of container transfer deck 130DC, while in other aspects the container bot riding surface 266RS may be substantially similar to that of the picking aisles 130A. For ease of explanation, the aspects of the disclosed embodiment will refer to the container bot riding surface 266RS within the breakpack module 266 as a portion of the container transfer deck 130DC. In aspects where the bot riding surface 266RS is formed by a portion of (or is an extension of) the container transfer deck 130DC it is noted that, while the container transfer deck 130D is illustrated in FIG. 2C a single path transport loop, in other aspects the transport loop of the breakpack module 266 may be a multilane transport loop substantially similar to container transport deck illustrated in FIG. 2A. For example, referring to FIG. 2E the container bot travel surface 266RS is an open undeterministic travel surface having multiple travel inbound and outbound lanes. For example, there are multiple inbound travel lanes TL1, TL2 where travel lane TL2 is a bypass lane for travelling around obstructions on travel lane TL1 (or vice versa). There may also be multiple outbound travel lanes TL3, TL4, TL5. Here, travel lane TL5 defines a queue lane 130QL (FIG. 2C) for the container bots 110 at the breakpack goods interface 263 while travel lanes TL4 and TL5 may be used for egress from the breakpack module 266, with travel lane TL5 being a bypass for travelling around obstructions on travel lane TL4 (or vice versa). In other aspects, case units may be transferred between the storage array and the breakpack module 266 indirectly, such as by conveyors and/or fork trucks. In one or more aspects the container bots 110 or fork trucks may deliver case units to conveyors that transport the case units to the breakpack station and from the breakpack station to the storage array or downstream logistics process.

Each of the breakpack modules 266 includes a breakpack goods autonomous transport travel loop 234 (see exemplary breakpack goods autonomous transport travel loops 234A-234E formed on and along a goods deck or goods transfer deck 130DG), at least one breakpack operation station 140, and a breakpack goods interface 263 disposed between and interfacing the goods transfer deck 130DG with the container transfer deck 130DC. Referring also to FIGS. 1 and 2A, the breakpack goods module 266 may include one or more belt sorters BST (such as cross belt sorters) that is/are configured as an interface(s) between goods bots 262 (operating on the goods deck 130DG) and the container bots 110 (operating on the container transport deck 130DC), between the container bots 110 and the breakpack operation station 140, and/or between the breakpack operation station 140 and the goods bots 262. For exemplary purposes only, the goods deck 130DG is illustrated as having three travel lanes that form the (variable length) travel loops 234A-234E; however, in other aspects the goods deck may have any suitable number of travel lanes that form any suitable number of breakpack goods autonomous transport travel loops 234. Each breakpack module 266 may be undeterministically coupled (e.g., the breakpack modules 266 maybe coupled to the automated storage and retrieval system 100 at any suitable location thereof, such as to one or more ends 130BE1, 130BE2, or centrally located between the two ends 130BE1, 130BE2 such as in place of picking aisles 130 (and storage locations) or at any other suitable location) to the automated storage and retrieval system 100 in any suitable manner (e.g., so as to form a part thereof). Though the breakpack modules 266 are coupled undeterministically to the structure of the automated storage and retrieval system 100 each component of the breakpack modules 166 is independent (e.g., self-contained as a unit) and/or independently automated in guidance and travel of the bots (e.g., goods bots 262) from the components of the automated storage and retrieval system, so that the interface between the components of the breakpack modules 266 and the components of the automated storage and retrieval system 100 is undeterministic.

The breakpack module(s) 266 may be coupled to the structure of the automated storage and retrieval system 100 at any suitable location and at any suitable level(s) 130L. For example, as noted above, a break pack module 266 may be located at one or more ends 130BE1, 130BE2 of the container transfer deck 130DC or at one or more sides 130BD1, 130BD2 of the container transfer deck 130DC (such as in lieu of storage rack modules RM/picking aisles 130A or lifts 150A, 150B, or as an extension of one or more picking aisles 130A). Each of the breakpack modules 266 is a plug and play module that is integrated with (or otherwise connected to) the container transfer deck 130DC so that the container transfer deck 130DC is communicably coupled to the container bot riding surface 266RS. In one aspect, the container transfer deck 130DC extends into the breakpack module to form the container bot riding surface 266RS (e.g.,
the breakpack module forms a modular part of the container transfer deck 130DC) so that container bots 110 traverse or move into and out of the breakpack modules 266 along the undeterministic container transfer deck 130DC, and at least one of the multiple travel lanes of the container transfer deck 130DC defines a queue lane 130QL (FIG. 2C) for the container bots 110 at the breakpack goods interface 263. In other aspects, the container bot riding surface 266RS includes rails 1200S (see FIG. 1D) that extend from the container transport deck 130DC in a manner similar to that of the picking aisles 130A, so that container bots 110 traverse or move into and out of the breakpack modules 266 along the rails 1200S, and the rails 1200S defines a queue lane 130QL (FIG. 2C) for the container bots 110 at the breakpack goods interface 263. It is noted that where the container bot riding surface 266RS is formed by rails 1200S the riding surface may include an undeterministic turn around area 1200UTA (that is similar to the open undeterministic container transfer deck 130DC) on which the container bots 110 turn to transition between different travel portions (e.g., inbound and outbound) of the breakpack goods autonomous transport travel loop 234. As can be seen in FIG. 2C, the container bot travel surface 266RS of the breakpack module 266 forms a travel loop 233 around which the container bots 110 travel to respectively transport along the container bot travel surface 266RS travel loop 233 a supply container (e.g., case unit, pickface, remainder container, etc.) between the storage locations 130S and a breakpack operation station 140 (and/or vice versa), and a breakpack goods container (also referred to as a breakpack container) 264 between the breakpack goods interface 263 and the breakpack goods container storage location 130SB or a lift 150A (and/or vice versa). The travel loop 233 provides the container bot 110 with random access to any and each breakpack goods interface locations 263L of the breakpack goods interface 263 along the bot travel surface 266RS, where the breakpack goods interface locations 263L form an asynchronous product distribution system.

The goods transfer deck 130DG forms a goods autonomous transport travel loop 234 disposed at the storage level 130L. The goods transfer deck 130DG is separate and distinct from the travel loop 233 formed by the container bot travel surface 266RS, and has the breakpack goods interface 263 coupling respective edges of the container autonomous transport travel loop 233 of the container transfer deck 130DC and the breakpack goods autonomous transport travel loop 234 of the goods transfer deck 130DG. The goods autonomous transport travel loop 234 formed by the goods transfer deck 130DG is disposed on a deck surface 130DGS of a deck (e.g., goods transfer deck 130DG) at a respective storage level 130L, and the breakpack goods autonomous transport travel loop(s) 234 of the goods transfer deck 130DG is disposed on a different deck surface 130DGS of the deck (e.g., goods transfer deck 130DG), separate and distinct from the deck surface 130BS of the container bot travel surface 266RS (formed by the container transfer deck 130DC and/or rails 1200S) where the container autonomous transport travel loop 233 is disposed. The breakpack goods autonomous transport travel loop 234 formed by the goods transfer deck 130DG (and hence the goods travel deck 130DG) is disposed to confine at least one autonomous breakpack goods transport vehicle (also referred to as goods bots, or goods transport vehicles) 262 to the respective storage level 130L. The at least one goods bot 262 is arranged or otherwise configured for transporting, along the breakpack goods autonomous transport travel loop 234 formed by the goods transfer deck 130DG, one or more breakpack goods BPG (e.g., a pack that is unpacked from the supply container in a pack level sort or a unit/each unpacked from a pack in a unit/each level sort) between the breakpack operation station 140 and the breakpack goods interface 263. The container bot(s) 110 is also configured to autonomously pick and place the breakpack goods containers 264 at the breakpack goods interface 263 as described herein. The breakpack goods interface 263 may be substantially similar to one or more of the transfer stations TS and buffer stations BS described herein and include an undeterministic surface (similar to that of the rack storage spaces 130S described herein) upon which breakpack goods containers 264 are placed so as to form an undeterministic interface between the goods transfer deck 130DG and the container transfer deck 130DC.

In one aspect, the goods transfer deck 130DG facilitates a decanting process where goods are picked from one container (such as a supply container 265 or any other suitable standardized container 265S) at the breakpack operation station 140 and consolidated with goods (generally of the same type) in another (e.g., outbound as noted below) supply container 265 or standardized container 265S at the breakpack goods interface 263, where the other supply container 265 or standardized container 265S is returned to storage. Generally, supply containers 265 inbound to the breakpack modules 266 are picked until empty but only some (not all) of the goods from the inbound supply container may be decanted. Here, what may be referred to as outbound (i.e., outbound from the breakpack modules 266) supply containers 265 or standardized containers 265S (such as totes, trays, etc.) may also be placed on the breakpack goods interface 263 by the container bot(s) 110 in a manner similar to that described herein for the breakpack goods containers 264 to facilitate the decanting process. In the decanting process, goods are removed from a supply container 265 (which may be an original product/good(s) case packaging) at the breakpack operation station 140 and consolidated into the outbound supply container(s) 265 or standardized container 265S (e.g., having the same type of goods as those being removed at the breakpack operation station 140) located on the breakpack goods interface 263. Consolidation of goods having the same type from multiple supply containers 265 into a lesser number of supply containers 265 (and then returned to storage by the container bot(s) 110) may increase the storage density of the automated storage and retrieval system 100 as the supply containers 265 stored in the storage racks can be maintained in a substantially "full" state (rather than having multiple containers that are less than full with the same type of goods therein. In some aspects, the decanted goods (in the standardized container or outbound supply container) are output from the storage and retrieval system 100 via the lifts 150 to be palletized as part of a pallet load (such as at output station 160UT) or to be shipped individually (such as at output station 160EC).

The goods bots 262 may be any suitable type of autonomously guided bot with a payload configured for holding breakpack goods, not product containers (e.g., case units, pickfaces, etc.). Each of the goods bots 262 has a payload hold configured dissimilar from a payload hold of the container bot 110. The goods bots 262 are configured to autonomously travel unconstrained along and across the breakpack goods autonomous transport travel loop(s) 234 formed by the goods deck 130DG. The goods bots 262 are configured so as to automatically unload one or more breakpack goods BPG (retrieved from the breakpack operation station 140) from the goods bot 262 to breakpack goods containers 264 at the breakpack goods interface 263. Suitable examples of goods bots 262 are those produced by Tompkins International of Raleigh, North Carolina (United States), see for example, U.S. Pat. No. 10,248,112 issued on Apr. 2, 2019. The breakpack goods autonomous transport travel loop(s) 234 formed by the goods deck 130DG has multiple travel lanes (see FIG. 2C) for travel of the goods bots 262 along the breakpack goods autonomous transport travel loop(s) 234 (see, e.g., travel loops 234A-234E) formed by the goods deck 130DG. As noted herein, three travel lanes are illustrated for exemplary purposes only and in other aspects there may be more or less than three travel lanes. At least one of the multiple travel lanes is a passing lane for the goods bot 262 travel passing an obstruction on another of the multiple travel lanes in a manner similar to that described herein with respect to the multiple travel lanes of the container transfer deck 130DC. The breakpack goods autonomous transport travel loop(s) 234 provide the goods bots 262 with random access to any and each of the breakpack goods interface locations 263L of the breakpack goods interface 263. In other aspects, the breakpack goods autonomous transport travel loop(s) 234 provide the goods bots 262 access to the belt sorter BST where the belt sorter BST sorts (and in some aspects is configured as a sorting buffer) the breakpack goods to the breakpack goods interface 263. Here the belt sorter BST operates as an interface between the goods bots 262 and container bots 110.

One or more portions of the goods transfer deck 130DG (such as adjacent the breakpack goods interface locations 263L) can be, in one or more aspects, reserved to provide an exit (or off) ramp or entrance (or on) ramp from or to a travel loop travel 234A-234E to effect a transfer of breakpack goods BPG to or from the breakpack goods container(s) 264 (or supply containers 265, 265S) at the breakpack goods interface locations 263L. Exit ramps (referred to herein as ramps 222, 222C, 222R) will be described herein but it should be understood that the entrance ramps are substantially opposite in direction to the exit ramps 222, 222C, 222R (e.g., provide access to rather than access from a travel loop). One or more ramps 222, 222C, 333R are provided depending on, for example, bot 110 kinematics (velocity, direction, etc.) and location(s) of (destination) breakpack goods interface locations 263L (e.g., near corners of the goods transfer deck 130DG, away from the corners of the goods transfer deck 130DG, etc.) being accessed by the goods bots 262. For exemplary purposes only, ramp 222 is a generic depiction of an on/off ramp that may be located anywhere on the goods transfer deck 130DG and have any suitable length. Ramp 222C is located in a corner of the goods transfer deck 130DG. Ramp 222R is a "rolling" ramp that moves to follow a path of a goods bot 262 traveling along the ramp 222R, The ramps 222, 222C, 222R (both on and off ramps) may be "closed" temporarily from general access by the goods bots 262 (e.g., only predetermined goods bots delivering breakpack goods to and from the breakpack goods interface locations 263L within the areas designated by the ramps 222, 222C, 222R have access to respective on and off ramps). Generally the ramps 222, 222C, 222R provide passage to and from a passing lane to a destination breakpack goods interface location 263L. Each ramp 222, 222C, 222R may be bidirectional (such as where a goods bot 2662 enters the ramp and travels in one direction along the ramp to pick or place a breakpack good BPG and then travels in the opposite direction along the ramp to exit from the ramp). In another aspect, the ramp may be a "counter-flow ramp" where travel along a ramp 222, 222C, 222R is in a generally opposing direction to a travel direction around one or more of the travel loop(s) 234 (e.g., a goods bot 262 exits the travel loop and travels in the generally opposing direction along the ramp 222, 222C, 222R). Where the ramp 222, 222C, 222R is an off ramp, the ramp 222, 222C, 222R may terminate at the destination breakpack goods interface location 263L. Similarly, where the ramp 222, 222C, 222R is an on ramp, the ramp 222, 222C, 222R may begin at the destination breakpack goods interface location 263L. As noted above, the ramps 222, 222C, 222R may be located anywhere on the goods transfer deck 130DG such that ramp entry locations vary in what may be referred to as a parking lane (e.g., a lane or a portion of a travel loop in which the goods bot stops to pick or place breakpack goods BPG) based on one or more of bot kinematics and locations of available breakpack goods interface locations 263L. It is noted that while the turns of the goods bots 262 to and from the ramps 222, 222C, 222R are illustrated as being substantially 90° turns, in other aspects, the turns may have an "S" shape similar to that described in U.S. patent application Ser. No. 16/144,668 filed on Sep. 27, 2018 and titled "Storage and Retrieval System", the disclosure of which is incorporated herein by reference in its entirety.

The ramps 222, 222C, 222R are dynamically generated and may be dynamically effected (e.g., a "rolling" ramp, such as ramp 222R) so that the ramp "rolls" in a progressive fashion with an initial ramp length generated from goods bot entry with adequate clearance for goods bot collision avoidance. In one or more aspects, the ramp 222, 222C 222R is initiated (at bot entry) given that the ramp to the destination breakpack goods interface location 263L is "blocked" (or otherwise obstructed) by an active goods bot 262/active breakpack goods interface location 263L but the blockage is expected to clear before the goods bot 262 traveling along the ramp reaches the blockage. In one or more aspects, if the blockage to the ramp 222, 222C, 222R clears, the ramp 222, 222C, 222R is extended to the destination breakpack goods interface location 263L; however, if the blockage does not clear the goods bot 262 travelling along the ramp 222, 222C, 222R is redirected to, for example, a passing lane and a new ramp is calculated/determined so that the goods bot 262 can place breakpack goods BPG at the destination breakpack goods interface location 263L or another destination breakpack goods interface location 263L.

Figure 13:
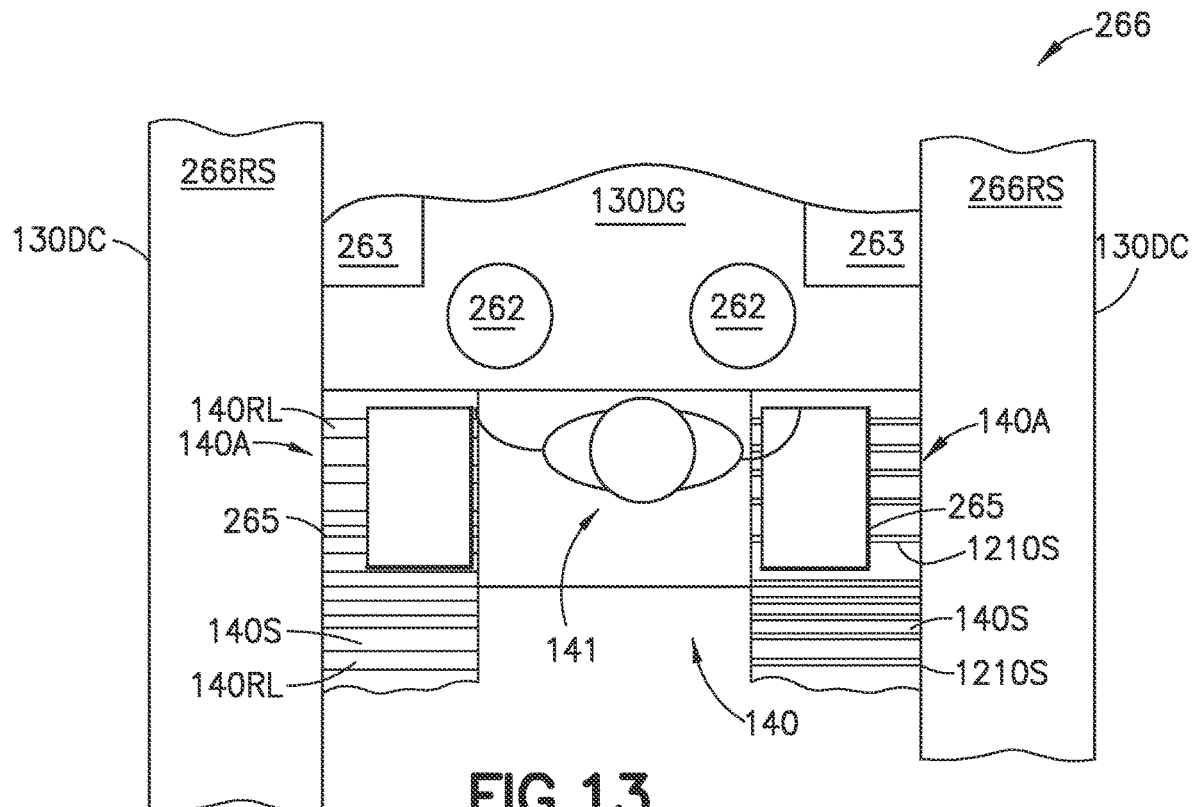
FIG. 13 is a schematic illustration of an operator station of the storage and retrieval system in accordance with aspects of the disclosed embodiment.

Referring also to FIG. 13, the breakpack operation station 140 is configured so that one or more breakpack goods BPG are unpacked from supply container(s) 265 at the breakpack operation station 140, and at least one goods bot 262 is configured so as to be loaded with the one or more breakpack goods BPG at the breakpack operation station 140. In one or more aspects, an operator at the breakpack operation station 140 places the breakpack goods BPG to the at least one goods bot 262 for transfer to the breakpack goods interface 263. In other aspects, referring to FIGS. 1 and 2A, a belt sorter BST is disposed between the breakpack operation station 140 and the goods bots 262 and forms an interface therebetween. Here the operator at the breakpack operation station places the breakpack goods BPG to the belt sorter BST where the belt sorter BST sorts (and in some aspects operates as a sorting buffer) the breakpack goods BPG to the goods bots 262. The breakpack operation station 140 includes any suitable supply container 265 support surface 140S. In one aspect, the support surface 140S is an undeterministic surface substantially similar to that of the storage shelves described herein and include slats 1210S that form the support surface 140S. In other aspects, the support surface 140S may be an undeterministic roller conveyor (powered or unpowered), having rollers 140RL with an arrangement similar to rollers 110RL (see FIGS. 4A and 4B) of the container bot 110 described herein so that tines 273A-273E of the pick head 270 of the container bot 110 (FIGS. 4A and 4B) are interdigitated with the rollers of the roller conveyor for placing (or picking) supply containers 265 to (or from) the support surface 140S. Here, the container bot 110 is configured to autonomously transfer the supply container(s) 265 from the container bot 110 to the breakpack operation station 140 (such as to the support surface 140S) in the manner described herein. In some aspects, referring to FIGS. 1 and 2A, the container bots 110 deliver the supply containers 265 to a belt sorter BST configured as an interface between the container bots 110 and the breakpack operation station 140. Here, the container bots 110 place the supply containers 265 to the belt sorter BST and the belt sorter BST sorts the supply containers 265 (and in some aspects operates as a sorting buffer) to the support surface 140S of the breakpack operation station 140. The support surface 140S may be configured so that as the supply containers 265 are placed by the container bot 110 or belt sorter BST the supply containers 265 move along the support surface 140S towards an operator 141 (e.g., a human operator or any suitable robotic operator (e.g., articulated arm, gantry, etc.)) for picking of breakpack goods BPG from the supply containers 265 and placement of the picked breakpack goods to goods bots 262 or to one or more of standardized containers 265S (such as totes, trays, etc.) and breakpack goods containers 264 located at an operator staging area 140A in any suitable manner to effect one or more of a pack level sortation of goods or a unit/each level sortation of goods. The supply containers 265 may be moved along the support surface 140S to a respective operator staging area 140A where the operator 141 picks the breakpack goods BPG from the supply containers 265 for placement in a goods bot 262 or in another container 265S, 264. In one aspects, the operator staging area 140A may be contiguous with and/or formed by the support surface 140S. As described herein, supply cases 265 with remaining goods therein after breakpack is performed may be picked by the container bots 110 from the support surface 140S or staging area 140A and returned to storage or to a lift 150. Empty supply containers 265 may be removed from the support surface 140S or staging area 140A by the operator 141 and stored at the breakpack operation station 140 for later removal in any suitable manner. In one or more aspects, container bots 110 may transport empty containers from the storage and retrieval system via the lifts 150. In one or more aspects, the breakpack operation station 140 includes any suitable refuse removal system 223 for removing refuse (or trash, e.g., shrink wrapping, packaging, boxes, etc.) from the storage and retrieval system. In one or more aspects, the refuse removal system 223 includes one or more of chutes, conveyors, lifts, or any other suitable transport configured to move refuse to a predetermined location; while in other aspects, the refuse may be placed in containers and removed from the storage and retrieval system by the container bots 110 via the lifts 150. As can be seen in FIGS. 2C and 13, the breakpack goods transfer deck 130DG joins the breakpack operation station 140 and the container transfer deck 130DC at a separate location (e.g., at the breakpack goods interface locations 263L) from each access of the container transfer deck 130DC to the breakpack operation station 140 (e.g., at the common support surface 140S) for the container bot 110.

Figure 1B:
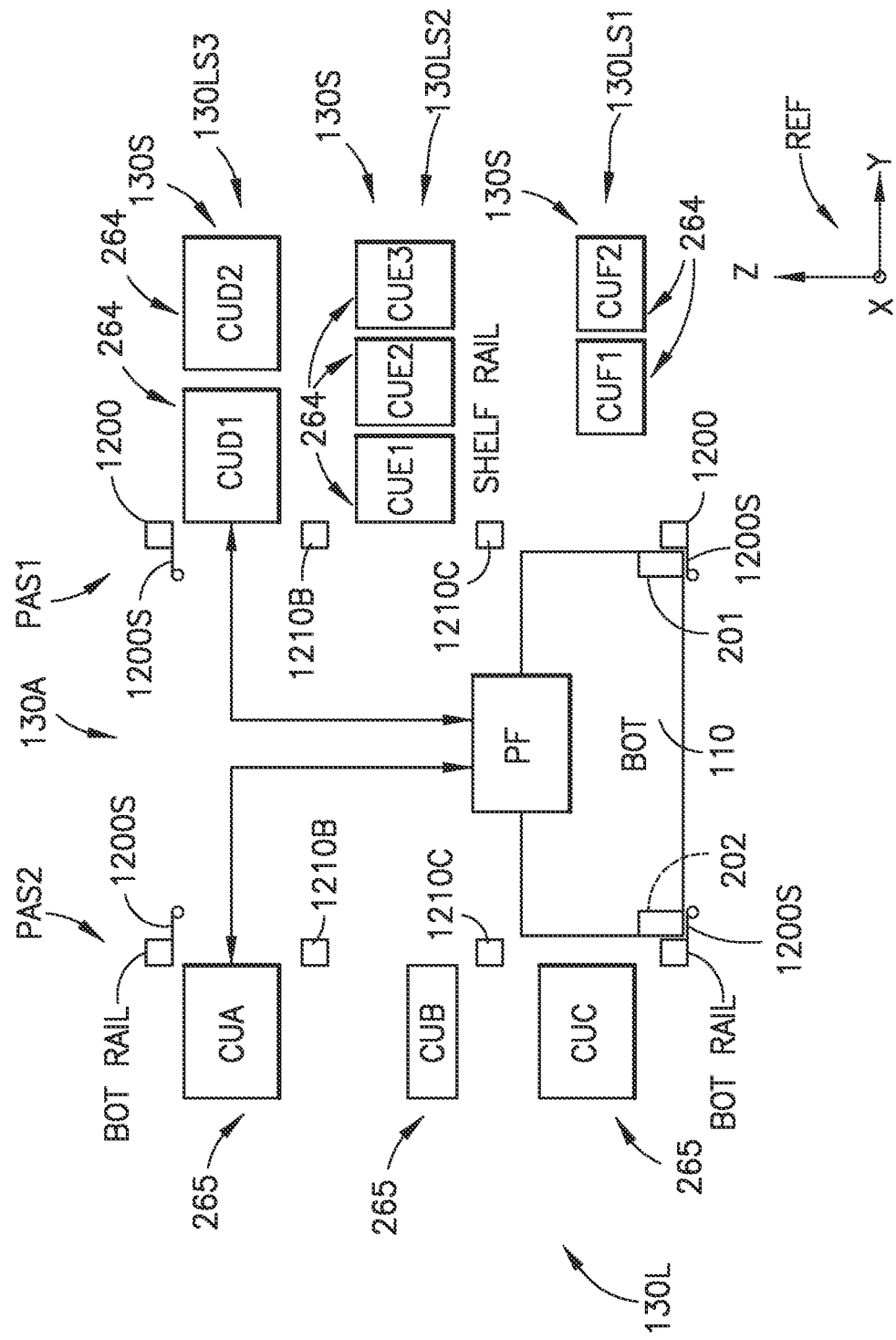
FIGS. 1B, 1C, and 1D are schematic illustrations of portions of the automated storage and retrieval system in accordance with aspects of the disclosed embodiment.
Figure 2D:
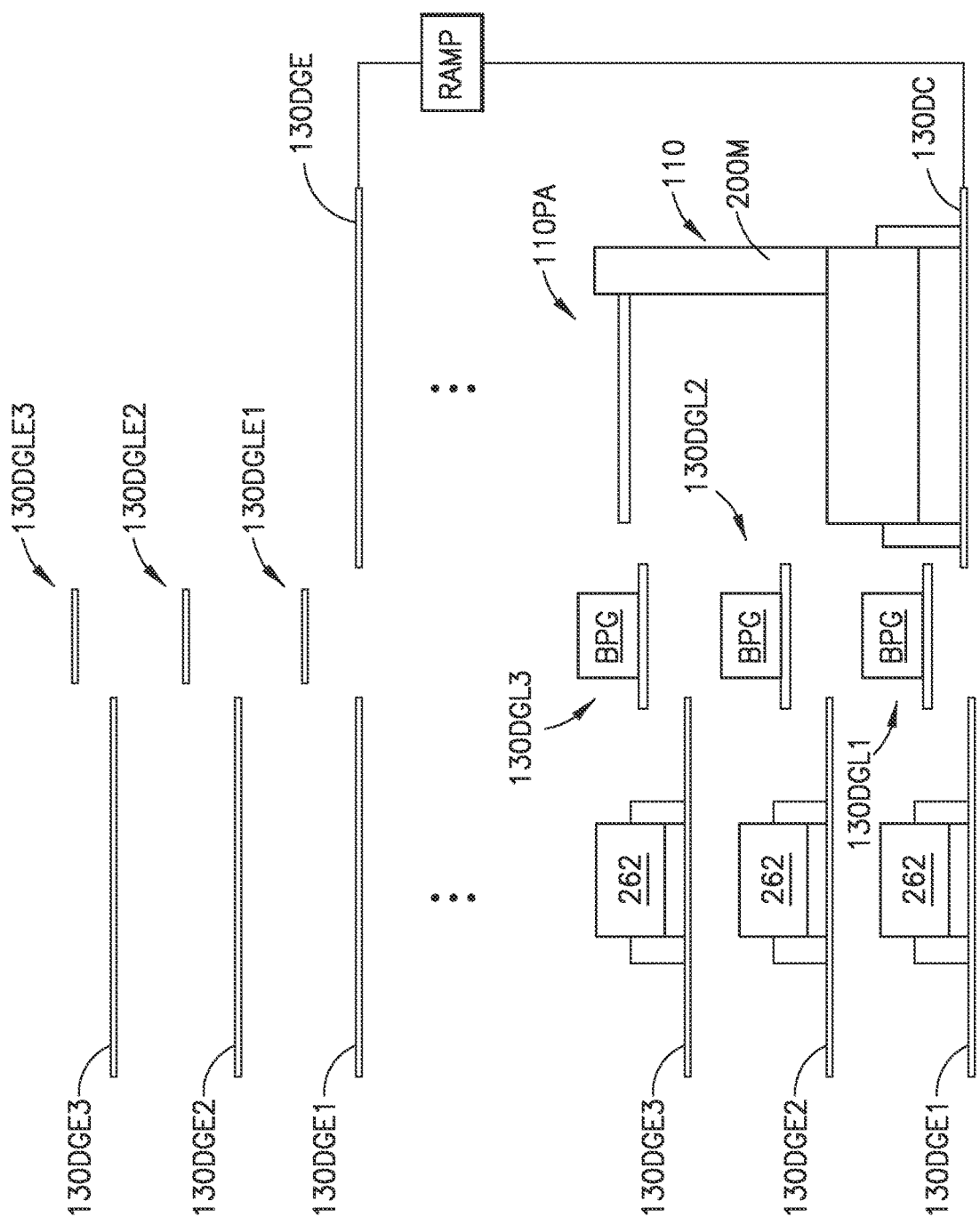
Figure 2E:
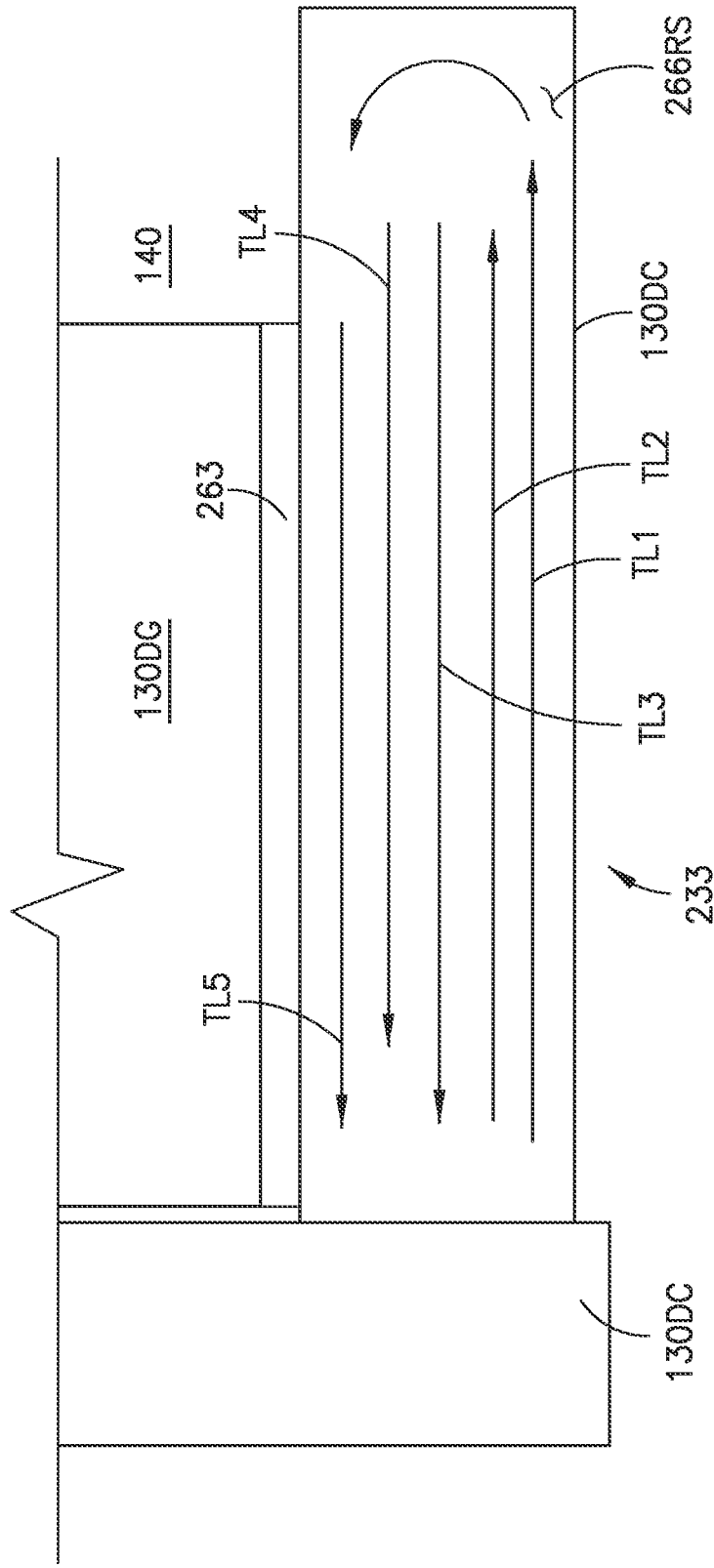
Figure 3A:
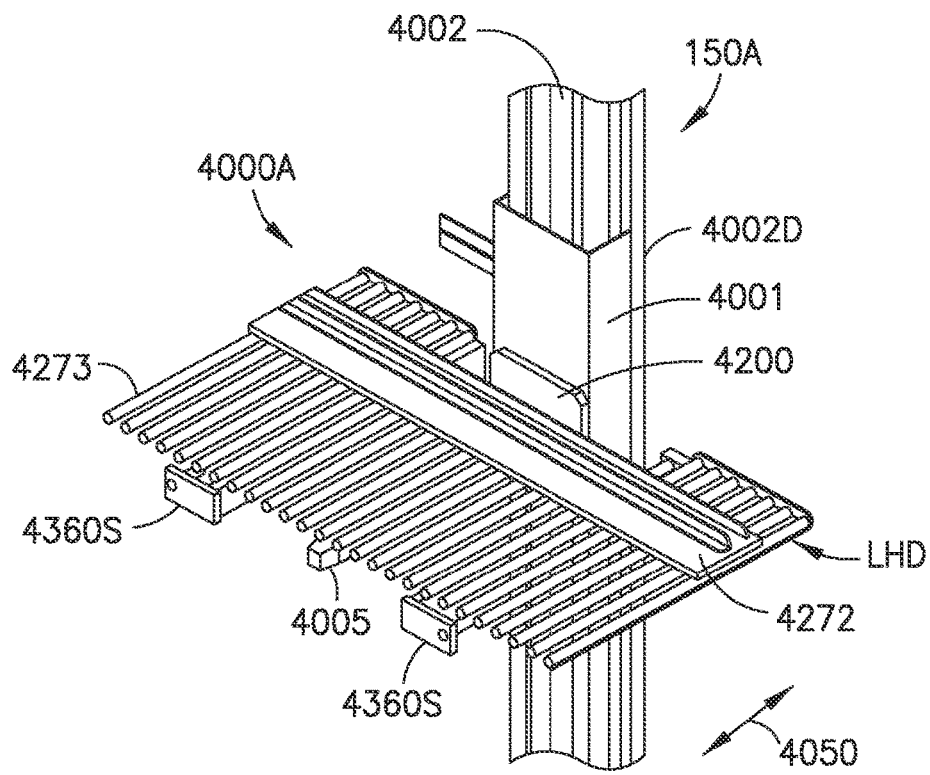
FIGS. 3A and 3B are schematic illustrations of a portion of the storage and retrieval system in accordance with aspects of the disclosed embodiment.
Figure 3B:
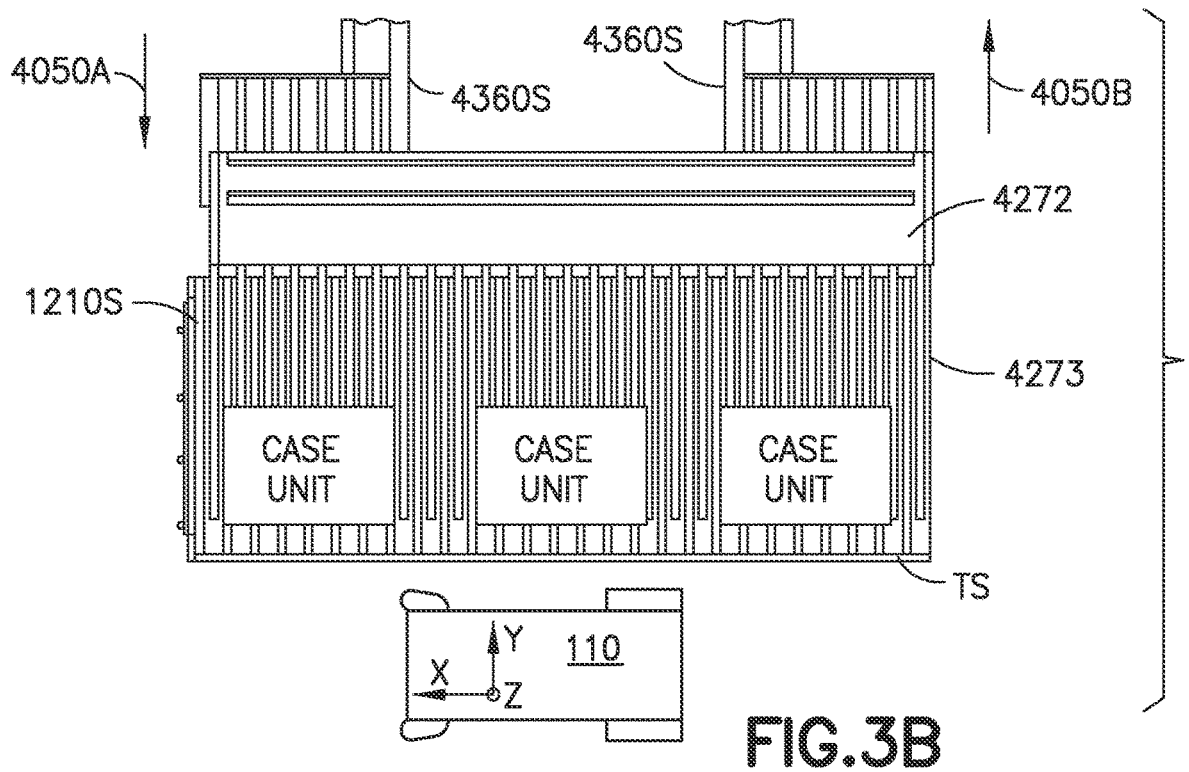
Figure 14:
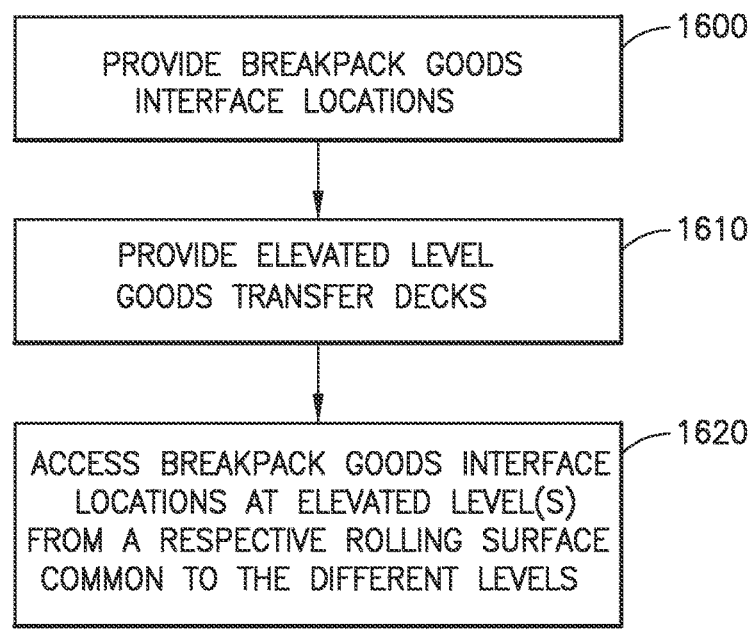
FIG. 14 is an exemplary flow diagram in accordance with aspects of the disclosed embodiment.

In one aspect, referring also to FIG. 2D, one or more of the breakpack modules 266 includes two or more (i.e., multiple levels) goods transfer decks 130DG1-130DG3 stacked one above the other; however, in other aspects the breakpack module(s) may have a single level where an elevated level of at least one breakpack module is connected to a container transfer deck level. Here the breakpack goods interface 263 may be substantially similar to the racks as shown in FIG. 1B and include multilevel levels 130DGL1-130DGL3 that are each accessible from a common (level) container transfer deck 130DC. Here, also referring to FIG. 14, in accordance with aspects of the disclosed embodiment, breakpack goods interface locations 263L are provided and arrayed on at least one level of the breakpack goods interface 263 along one or more edges of the goods transfer deck 130DG (FIG. 14, Block 1600) in a manner substantially similar to that described herein (again, the breakpack station is illustrated with three levels but in other aspects at least one elevated level is provided). The at least one elevated level of goods transfer decks 130DG1-130DG3 is/are also provided (FIG. 14, Block 1610), where the elevated level deck(s) define a rolling surface for a goods bot 262 at each level of the multiple level goods transfer decks 130DG1-130DG3. As noted above, the breakpack goods interface locations 263L of the at least one elevated levels 130DGL1-130DGL3 of the breakpack goods interface 263 are accessed from a respective rolling surface of the container transfer deck 130DC that is common to the multiple levels 130DGL1-130DGL3 (FIG. 14, Block 1620) (or the container transfer deck corresponding to the at least one elevated level), where the breakpack goods interface locations 263L are disposed along at least edge of the goods transfer deck 130DG at each level 130DGL1-130DGL3 of the multiple level goods transfer decks 130DG1-130DG3.

The container bots 110 may be any suitable independently operable autonomous transport vehicles that carry and transfer case units along the X and Y throughput axes throughout the storage and retrieval system 100. In one aspect the container bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010 (now U.S. Pat. No. 8,425,173); U.S. patent application Ser. No. 13/326,423 filed on Dec. 15, 2011; U.S. patent application Ser. No. 13/326,447 filed on Dec. 15, 2011 (now U.S. Pat. No. 8,965,619); U.S. patent application Ser. No. 13/326,505 Dec. 15, 2011 (now U.S. Pat. No. 8,696,010); U.S. patent application Ser. No. 13/327,040 filed on Dec. 15, 2011 (now U.S. Pat. No. 9,187,244); U.S. patent application Ser. No. 13/326,952 filed on Dec. 15, 2011; U.S. patent application Ser. No. 13/326,993 filed on Dec. 15, 2011; U.S. patent application Ser. No. 14/486,008 filed on Sep. 15, 2014; and U.S. Provisional Patent Application No. 62/107,135 filed on Jan. 23, 2015, the disclosures of which are incorporated by reference herein in their entireties. The container bots 110 (described in greater detail below) may be configured to place case units, such as the above described retail merchandise, into picking stock in the one or more levels of the storage structure 130 and then selectively retrieve ordered case units. As may be realized, in one aspect, the throughput axes X and Y (e.g. pickface transport axes) of the storage array are defined by the picking aisles 130A, at least one container transfer deck 130DC, the container bot 110 and the extendable end effector (as described herein) of the container bot 110 (and in other aspects the extendable end effector of the lifts 150 also, at least in part, defines the Y throughput axis).

The pickfaces (which in one aspect include supply containers 265) are transported between an inbound section of the storage and retrieval system 100, where pickfaces inbound to the array are generated (such as, for example, input station 1601N) and a load fill section of the storage and retrieval system 100 (such as for example, output station 16OUT or output station 160EC), where outbound pickfaces from the array are arranged to fill a load in accordance with a predetermined load fill order sequence or an individual fulfillment order(s) in accordance with a predetermined individual fulfillment order sequence. In another aspect, pickfaces (e.g., of supply containers 265) are transported between the storage spaces 130S and a load fill section of the storage and retrieval system 100 (such as for example, output station 16OUT or output station 160EC) to fill a load in accordance with a predetermined load fill order sequence or an individual fulfillment order(s) in accordance with a predetermined individual fulfillment order sequence. In still other aspects, breakpack goods container(s) 264 (which, in one aspect, multiple breakpack goods containers may be arranged in and transported as a pickface) are transported between the storage spaces 130S and the load fill section and/or between the breakpack goods interface 263 of the breakpack module(s) 266 and the load fill section of the storage and retrieval system 100 (such as for example, output station 16OUT or output station 160EC) to fill a load in accordance with a predetermined load fill order sequence or an individual fulfillment order(s) in accordance with a predetermined individual fulfillment order sequence. The control server 120 may operate the automated storage and retrieval system 100 in different modes of operation so that the pickfaces (e.g., of supply containers 265) and breakpack goods containers 264 are transferred in accordance with the aspects disclosed herein to the load fill section to fill a load with one or more of pickfaces (e.g., of supply containers 265) and break pack containers 264 having goods that were sorted through one or more of the orthogonal sortation echelons 15000, 15100, 15200.

In one aspect, the storage rack modules RM and the container bots 110 are arranged so that in combination the storage rack modules RM and the container bots 110 effect the on the fly sortation of mixed case pickfaces coincident with transport on at least one (or in other aspects on at least one of each of the more than one) of the throughput axes so that two or more pickfaces are picked from one or more of the storage spaces and placed at one or more pickface holding locations (such as, for example, the buffer and transfer stations BS, TS), that are different than the storage spaces 130S, according to the predetermined load fill order sequence.

The container bots 110, lift modules 150 and other suitable features of the storage and retrieval system 100 are controlled in any suitable manner such as by, for example, one or more central system control computers (e.g. control server) 120 through, for example, any suitable network 180. In one aspect the network 180 is a wired network, a wireless network or a combination of wireless and wired networks using any suitable type and/or number of communication protocols. In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. The control server 120 may, in one aspect, be configured to control the features of the storage and retrieval system in the manner described herein. For simplicity and ease of explanation the term "case unit(s)" is generally used herein for referring to both individual case units and pickfaces (a pickface is formed of multiple case units that are moved as a unit). Referring also to FIG. 17A, with respect to the recursive sortation of goods through the orthogonal sortation echelons 15000, 15100, 15200, the configuration of the controller 120 (e.g., the non-transitory computer program code therein) mimics the physical structure of the orthogonal sortation echelons 15000, 15100, 15200 so that the controller 120 approaches a solution to the recursive sortation in the same manner that solution is effected by the physical components of the orthogonal sortation echelons 15000, 15100, 15200. For example, the controller 120 includes a case level sortation echelon control module 120M1, a pack level sortation echelon control module 120M2, and a unit/each level sortation echelon control module 120M3 that alone or in combination (e.g., depending on a level of sortation needed to effect order fulfillment) effect a break down of larger goods unit(s) into smaller goods units and a subsequent recursively sorted assembly of the sorted smaller goods units into sorted larger goods units as described herein.

Figure 1C:
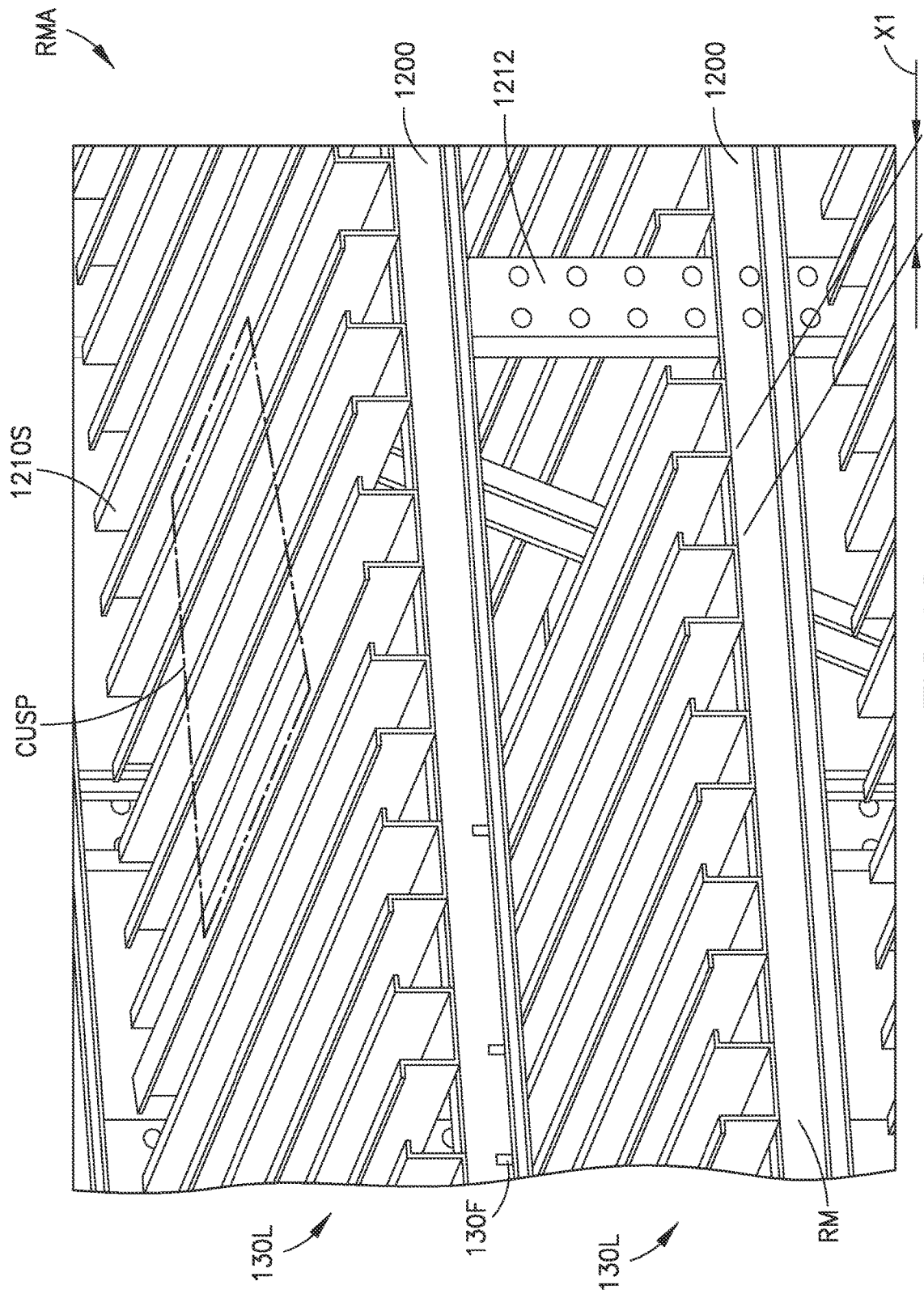

Referring also to FIGS. 1B and 1C the rack module array RMA of the storage structure 130 includes vertical support members 1212 and horizontal support members 1200 that define the high density automated storage array as will be described in greater detail below. Rails 1200S may be mounted to one or more of the vertical and horizontal support members 1212, 1200 in, for example, picking aisles 130A and be configured so that the container bots 110 ride along the rails 1200S through the picking aisles 130A. At least one side of at least one of the picking aisles 130A of at least one storage level 130L may have one or more storage shelves (e.g. formed by rails 1210, 1200 and slats 1210S). In one aspect the one or more shelves may be provided at differing heights so as to form multiple shelf levels 130LS1-130LS3 between the storage or deck levels 130L defined by the transfer decks 130B (and the rails 1200S which form an aisle deck). Accordingly, there are multiple rack shelf levels 130LS1-130LS3, corresponding to each storage level 130L, extending along one or more picking aisles 130A communicating with the container transfer deck 130DC of the respective storage level 130L. As may be realized, the multiple rack shelf levels 130LS1-130LS3 effect each storage level 130L having stacks of stored case units/supply containers 265 (or case layers) and/or stacks of stored breakpack goods containers 264 (or breakpack layers) that are accessible from a common deck 1200S of a respective storage level 130L (e.g. the stacks of stored cases are located between storage levels).

As may be realized, container bots 110 traversing a picking aisle 130A, at a corresponding storage level 130L, have access (e.g. for picking and placing case units and/or breakpack goods containers) to each storage space 130S that is available on each shelf level 130LS1-130LS3, where each shelf level 130LS1-130LS3 is located between adjacent vertically stacked storage levels 130L on one or more side(s) PAS1, PAS2 (see e.g. FIG. 2A) of the picking aisle 130A. As noted above, each of the storage shelf levels 130LS1-130LS3 is accessible by the container bot 110 from the rails 1200 (e.g. from a common picking aisle deck 1200S that corresponds with a container transfer deck 130DC on a respective storage level 130L). As can be seen in FIGS. 1B and 1C there are one or more intermediate shelf rails 1210B, 1210C vertically spaced (e.g. in the Z direction) from one another (and from rails 1200) to form multiple stacked storage spaces 130S each being accessible by the container bot 110 from the common rails 1200S. As may be realized, the horizontal support members 1200 also form shelf rails (in addition to shelf rails 1210) on which case units are placed.

Each stacked shelf level 130LS1-130LS3 (and/or each single shelf level as described below) of a corresponding storage level 130L defines an open and undeterministic two dimensional storage surface (e.g. having a case unit/breakpack container support plane CUSP as shown in FIG. 1C) that facilitates a dynamic allocation of pickfaces (e.g., supply containers 265) and/or breakpack goods containers 264 both longitudinally (e.g. along a length of the aisle or coincident with a path of bot travel defined by the picking aisle) and laterally (e.g. with respect to rack depth, transverse to the aisle or the path of bot travel). Dynamic allocation of the pickfaces and case units that make up the pickfaces is provided, for example, in the manner described in U.S. Pat. No. 8,594,835 issued on Nov. 26, 2013, the disclosure of which is incorporated by reference herein in its entirety. While supply containers 265 are illustrated in FIG. 1B as being stored on side PAS2 of picking aisle 130A and breakpack goods containers 264 are shown stored on side PAS1 of picking aisle 130A, in other aspects, there may be a mix of supply containers 265 and breakpack goods containers 264 stored on a common side PAS1, PAS2 (e.g., either one or both of sides PAS1, PAS2) of the picking aisle 130A and/or a mix of supply containers 265 and breakpack goods containers 264 stored on a common shelf surface.

Figure 1D:
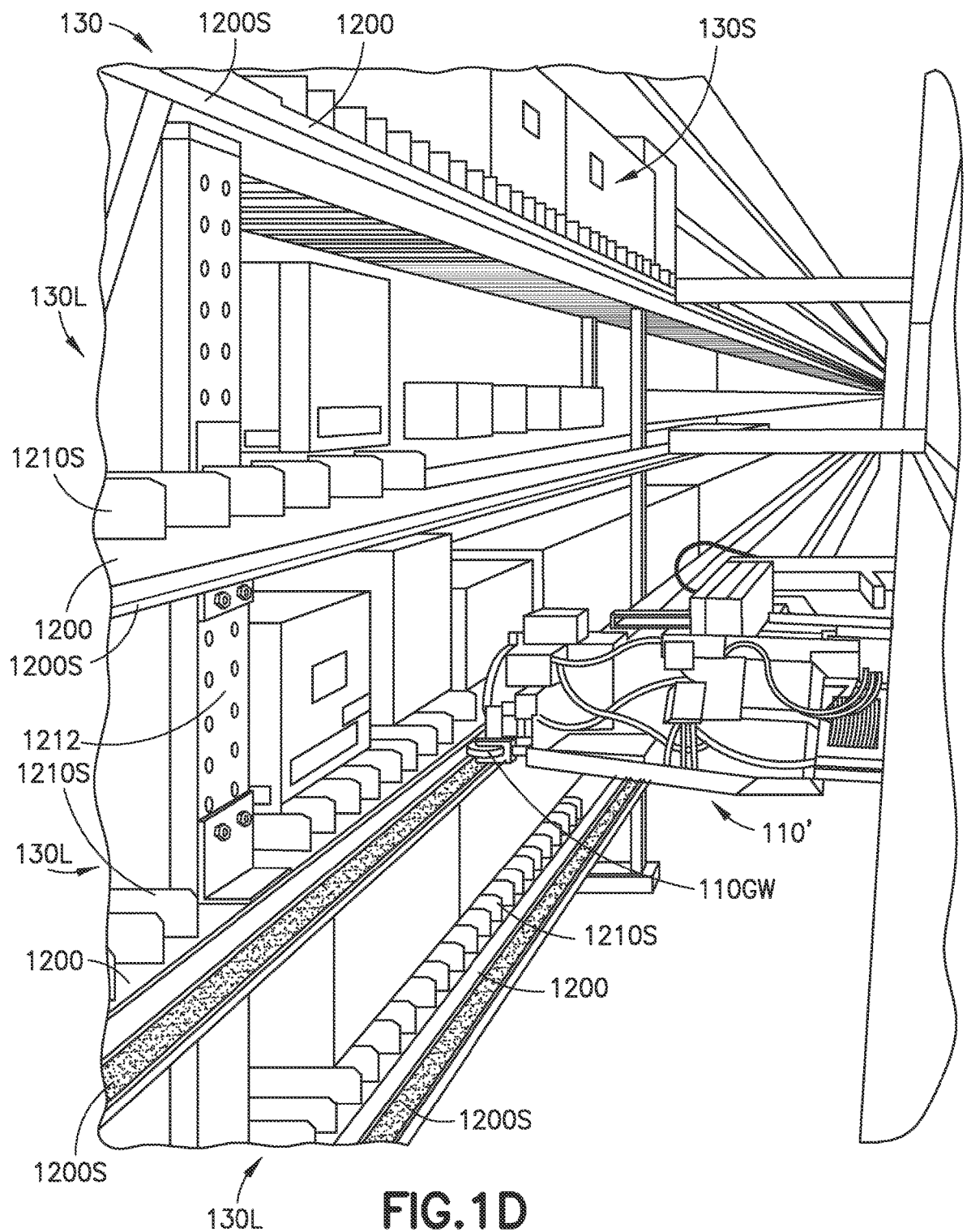
Figure 1E:
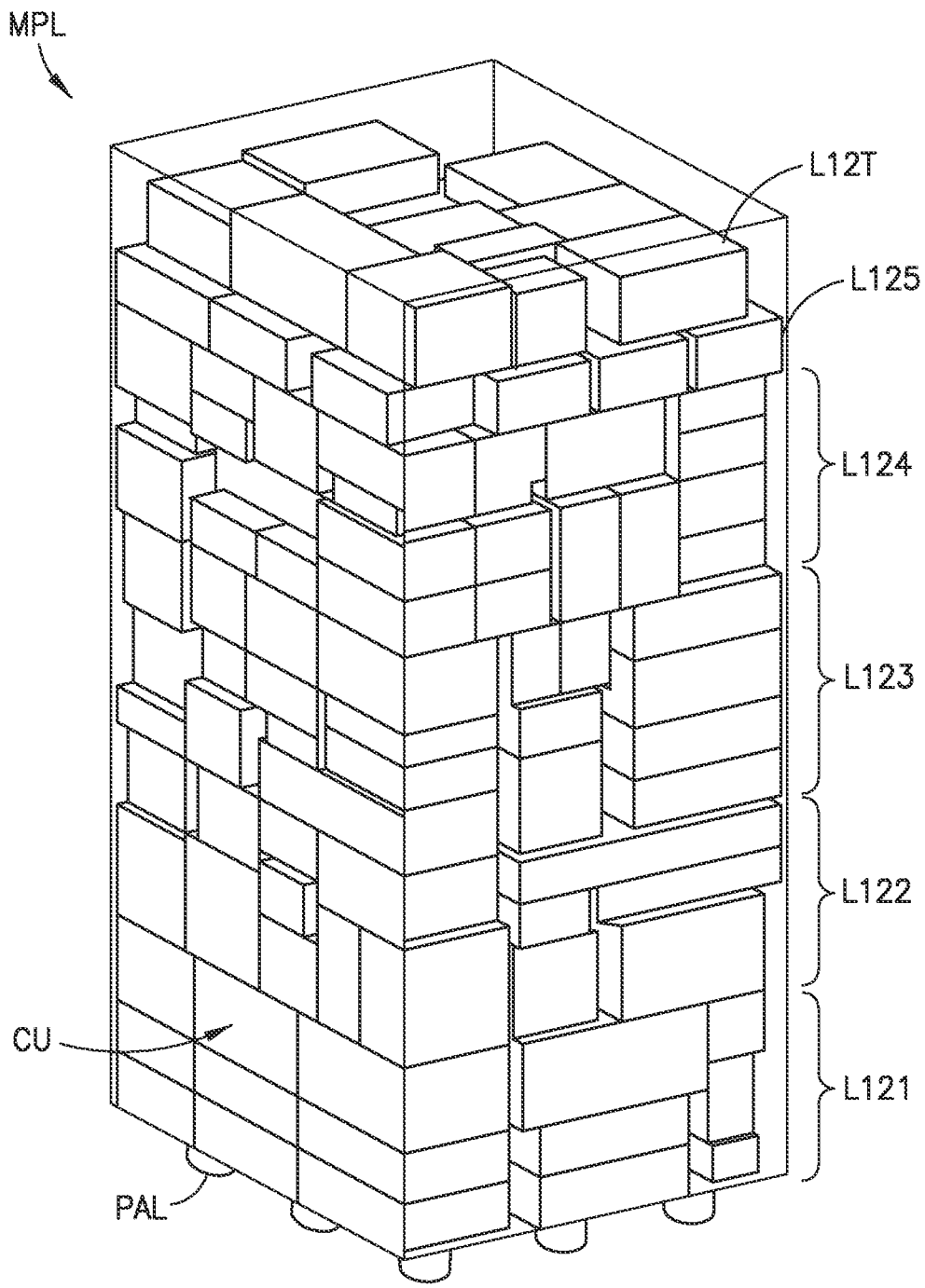
FIG. 1E is a schematic illustration of a mixed pallet load formed by the automated storage and retrieval system in accordance with aspects of the disclosed embodiment.
Figure 1F:
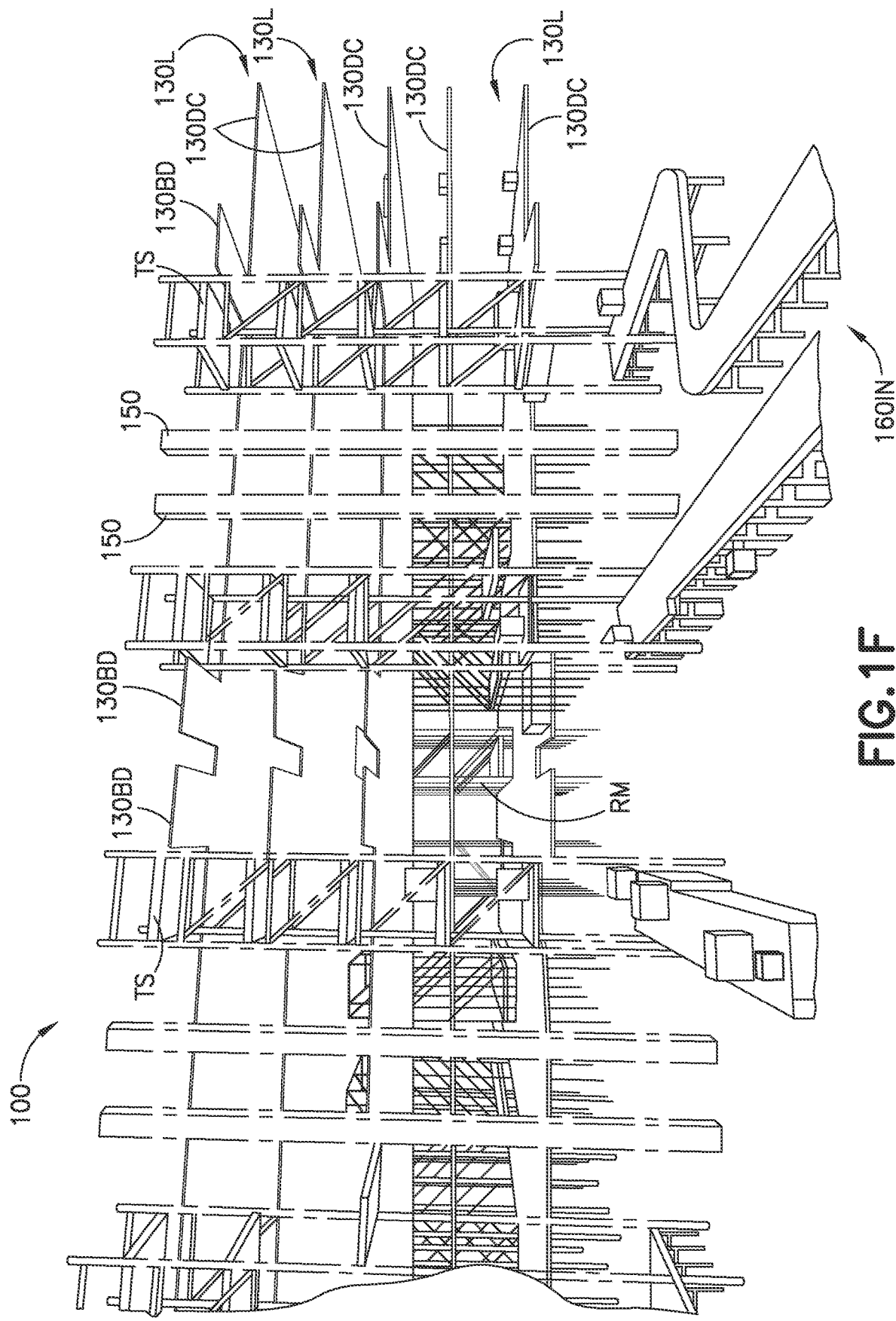
FIG. 1F is a schematic illustration of a portion of the automated storage and retrieval system in accordance with aspects of the disclosed embodiment.
Figure 4B:
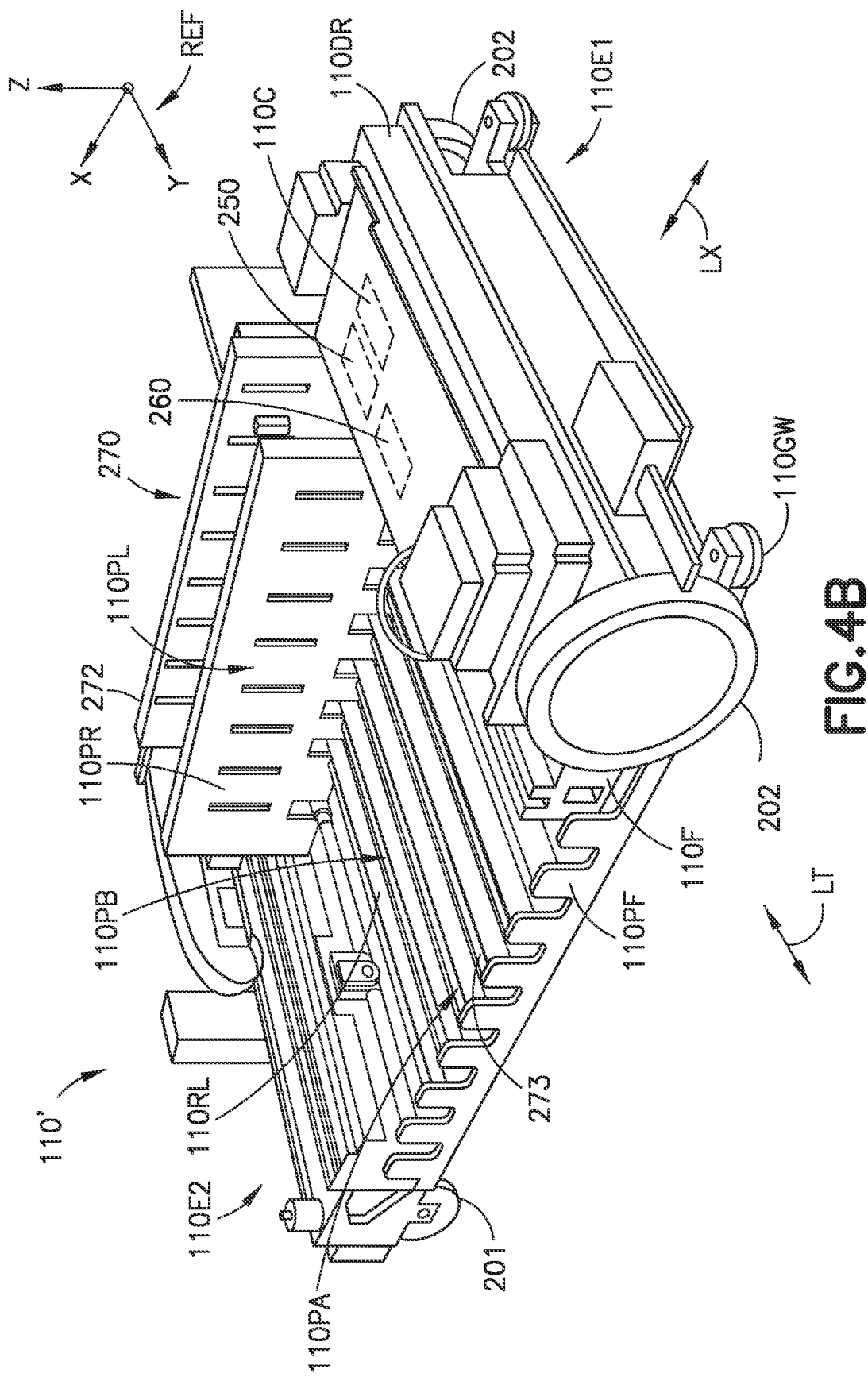
FIG. 4B is a schematic illustration of a transport vehicle in accordance with aspects of the disclosed embodiment.

In one aspect, referring to FIGS. 1D and 4B each of the storage levels 130L includes a single level of storage shelves to store a single level of case units (e.g. each storage level includes a single case unit support plane CUSP) and the container bots 110 are configured to transfer case units to and from the storage shelves of the respective storage level 130L. For example, the container bot 110' illustrated in FIG. 4B is substantially similar to container bot 110 described herein however, the container bot 110' is not provided with sufficient Z-travel of the transfer arm 110PA for placing case units on the multiple storage shelf levels 130LS1-130LS3 (e.g. accessible from a common rail 1200S) as described above. Here the transfer arm drive 250 (which may be substantially similar to one or more of drive 250A, 250B) includes only sufficient Z-travel for lifting the case units from the case unit support plane CUSP of the single level of storage shelves, for transferring the case units to and from the payload area 110PL and for transferring the case units between the fingers 273 of the transfer arm 110PA and the payload bed 110PB. Suitable examples of container bots 110' can be found in, for example, U.S. patent application Ser. No. 13/326,993 filed on Dec. 15, 2011, the disclosure of which is incorporated herein by reference in its entirety.

Referring again to FIG. 2A each container transfer deck 130DC or storage level 130L includes one or more lift pickface interface/handoff stations TS (referred to herein as interface stations TS) where case unit(s) (e.g. individual case units, pickfaces, supply containers, etc.), totes and/or breakpack goods containers 264 are transferred between the lift load handling devices LHD and container bots 110 on the container transfer deck 130DC. The interface stations TS are located at a side of the container transfer deck 130DC opposite the picking aisles 130A and rack modules RM, so that the container transfer deck 130DC is interposed between the picking aisles and each interface station TS. As noted above, each container bot 110 on each picking level 130L has access (via a respective container transfer deck 130DC) to each storage location 130S, each picking aisle 130A and each lift 150 on the respective storage level 130L, as such each container bot 110 also has access to each interface station TS on the respective level 130L. In one aspect the interface stations are offset from high speed bot travel paths HSTP along the container transfer deck 130DC so that container bot 110 access to the interface stations TS is undeterministic to bot speed on the high speed travel paths HSTP. As such, each container bot 110 can move a case unit(s) (e.g. individual case units, pickfaces (built by the bot), supply containers, etc.), totes and/or breakpack goods containers 264 from every interface station TS to every storage space 130S corresponding to the deck level 130L and vice versa.

In one aspect the interface stations TS are configured for a passive transfer (e.g. handoff) of case units (e.g. individual case units, pickfaces, supply containers, etc.), totes and/or breakpack goods containers 264 between the container bot 110 and the load handing devices LHD of the lifts 150 (e.g. the interface stations TS have no moving parts for transporting the case units) which will be described in greater detail below. For example, also referring to FIG. 2B the interface stations TS and/or buffer stations BS include one or more stacked levels TL1, TL2 of transfer rack shelves RTS (e.g. so as to take advantage of the lifting ability of the container bot 110 with respect to the stacked rack shelves RTS) which in one aspect are substantially similar to the storage shelves described above (e.g. each being formed by rails 1210, 1200 and slats 1210S) such that container bot 110 handoff (e.g. pick and place) occurs in a passive manner substantially similar to that between the container bot 110 and the storage spaces 130S (as described herein) where the case units or totes are transferred to and from the shelves. In one aspect the buffer stations BS on one or more of the stacked levels TL1, TL2 also serve as a handoff/interface station with respect to the load handling device LHD of the lift 150. In one aspect, where the bots, such as container bots 110', are configured for the transfer of case units (e.g. individual case units, pickfaces, supply containers, etc.), totes and/or breakpack goods containers 264 to a single level 130L of storage shelves, the interface stations TS and/or buffer stations BS also include a single level of transfer rack shelves (which are substantially similar to the storage rack shelves of the storage levels 130L described above with respect to, for example, FIG. 1C). As may be realized, operation of the storage and retrieval system with container bots 110' serving the single level storage and transfer shelves is substantially similar to that described herein. As may also be realized, load handling device LHD (or lift) handoff (e.g. pick and place) of case units (e.g. individual case units, pickfaces, supply containers, etc.), totes and/or breakpack goods containers 264 to the stacked rack shelves RTS (and/or the single level rack shelves) occurs in a passive manner substantially similar to that between the container bot 110 and the storage spaces 130S (as described herein) where the case units, totes and/or breakpack goods containers 264 are transferred to and from the shelves. In other aspects the shelves may include transfer arms (substantially similar to the container bot 110 transfer arm 110PA shown in FIG. 4A, although Z direction movement may be omitted when the transfer arm is incorporated into the interface station TS shelves) for picking and placing case units, totes and/or breakpack goods containers 264 from one or more of the container bot 110 and load handling device LHD of the lift 150. Suitable examples of an interface station with an active transfer arm are described in, for example, U.S. patent application Ser. No. 12/757,354 filed on Apr. 9, 2010, the disclosure of which is incorporated by reference herein in its entirety.

In one aspect, the location of the container bot 110 relative to the interface stations TS occurs in a manner substantially similar to bot location relative to the storage spaces 130S. For example, in one aspect, location of the container bot 110 relative to the storage spaces 130S and the interface stations TS occurs in a manner substantially similar to that described in U.S. patent application Ser. No. 13/327,035 filed on Dec. 15, 2011 (now U.S. Pat. No. 9,008,884) and Ser. No. 13/608,877 filed on Sep. 10, 2012 (now U.S. Pat. No. 8,954,188), the disclosures of which are incorporated herein by reference in their entireties. For example, referring to FIGS. 1 and 1C, the container bot 110 includes one or more sensors 110S that detect the slats 1210S or a locating feature 130F (such as an aperture, reflective surface, RFID tag, etc.) disposed on/in the rail 1200. The Slats and/or locating features 130F are arranged so as to identify a location of the container bot 110 within the storage and retrieval system, relative to e.g. the storages spaces and/or interface stations TS. In one aspect the container bot 110 includes a controller 110C that, for example, counts the slats 1210S to at least in part determine a location of the container bot 110 within the storage and retrieval system 100. In other aspects the location features 130F may be arranged so as to form an absolute or incremental encoder which when detected by the container bot 110 provides for a container bot 110 location determination within the storage and retrieval system 100.

As may be realized, referring to FIG. 2B, the transfer rack shelves RTS at each interface/handoff station TS define multi-load stations (e.g. having one or more storage case unit holding locations for holding a corresponding number of case units or totes) on a common transfer rack shelf RS. As noted above, each load of the multi-load station is a single case unit/tote/breakpack container or a multi-case pickface (e.g. having multiple case units/totes/breakpack goods containers that are moved as a single unit) that is picked and paced by either the container bot 110 or load handling device LHD. As may also be realized, the bot location described above allows for the container bot 110 to position itself relative to the multi-load stations for picking and placing the case units/totes and pickfaces from a predetermined one of the holding locations of the multi-load station. The interface/handoff stations TS define multi-place buffers (e.g. buffers having one or more case holding location—see FIG. 4B—arranged along, for example, the X axis of the container bot 110 as the container bot 110 interfaces with the interface station TS) where inbound and/or outbound case units/totes/breakpack goods containers and pickfaces are temporarily stored when being transferred between the container bots 110 and the load handling devices LHD of the lifts 150.

In one aspect one or more peripheral buffer/handoff stations BS (substantially similar to the interface stations TS and referred to herein as buffer stations BS) are also located at the side of the container transfer deck 130DC opposite the picking aisles 130A and rack modules RM, so that the container transfer deck 130DC is interposed between the picking aisles and each buffer station BS. The peripheral buffer stations BS are interspersed between or, in one aspect as shown in FIGS. 2A and 2B, otherwise in line with the interface stations TS. In one aspect the peripheral buffer stations BS are formed by rails 1210, 1200 and slats 1210S and are a continuation of (but a separate section of) the interface stations TS (e.g. the interface stations and the peripheral buffer stations are formed by common rails 1210, 1200). As such, the peripheral buffer stations BS, in one aspect, also include one or more stacked levels TL1, TL2 of transfer rack shelves RTS as described above with respect to the interface stations TS while in other aspects the buffer stations include a single level of transfer rack shelves. The peripheral buffer stations BS define buffers where case units/totes/breakpack goods containers and/or pickfaces are temporarily stored when being transferred from one container bot 110 to another different container bot 110 on the same storage level 130L as will be described in greater detail below. As maybe realized, in one aspect the peripheral buffer stations are located at any suitable location of the storage and retrieval system including within the picking aisles 130A and anywhere along the container transfer deck 130DC.

Still referring to FIGS. 2A and 2B in one aspect at least the interface stations TS are located on an extension portion or pier 130BD that extends from the container transfer deck 130DC, although in other aspects a length of the interface stations TS may be arranged and extend along the container transfer deck. In one aspect, the pier 130BD is similar to the picking aisles where the container bot 110 travels along rails 1200S affixed to horizontal support members 1200 (in a manner substantially similar to that described above). In other aspects, the travel surface of the pier 130BD may be substantially similar to that of the container transfer deck 130DC. Each pier 130BD is located at the side of the container transfer deck 130DC, such as a side that is opposite the picking aisles 130A and rack modules RM, so that the container transfer deck 130DC is interposed between the picking aisles and each pier 130BD. The pier(s) 130BD extends from the transfer deck at a non-zero angle relative to at least a portion of the high speed bot transport path HSTP. In other aspects the pier(s) 130BD extend from any suitable portion of the container transfer deck 130DC including the ends 130BE1, 130BE2 of the container transfer deck 130DCD. As may be realized, peripheral buffer stations BSD (substantially similar to peripheral buffers stations BS described above) may also be located at least along a portion of the pier 130BD.

Referring now to FIGS. 3A, 3B, 4B and 5, as described above, in one aspect the interface stations TS are passive stations and as such the load transfer device LHD of the lifts 150A, 150B have active transfer arms or pick heads 4000A. In one aspect the inbound lift modules 150A and the outbound lift modules 150B have different types of pick heads (as described in U.S. Pat. No. 9,856,083 previously incorporated by reference herein in its entirety) while in other aspects the inbound lift modules 150A and the outbound lift modules 150B have the same type of pick head similar to pick head 4000A. The pick heads of the lifts 150A, 150B may, at least in part, define the Y throughput axis as described herein. In one aspect, both the inbound and outbound lift modules 150A, 150B have a vertical mast 4002 along which a slide 4001 travels under the motive force of any suitable lift drive unit (e.g. connected to, for example, control server 120) configured to lift and lower the slide (and the pick head 4000A mounted thereto). The inbound lift module(s) 150A include a pick head 4000A mounted to the slide 4001 so that as the slide moves vertically the pick head 4000A moves vertically with the slide 4001. In this aspect the pick head 4000A includes one or more tines or fingers 4273 mounted to a base member 4272. The base member 4272 is movably mounted to one or more rail 4360S of frame 4200 which in turn is mounted to the slide 4001. Any suitable drive unit 4005, such as a belt drive, chain drive, screw drive, gear drive, etc. (which is substantially similar in form but may not be similar in capacity to drive 4002D as the drive 4005 may be smaller than drive 4002D) is mounted to the frame 4200 and coupled to the base member 4272 for driving the base member 4272 (with the finger(s)) in the direction of arrow 4050 (e.g., extension direction 4050A and retraction direction 4050B). The outbound lift module(s) 150B may be substantially similar to inbound lift module(s) 150A.

As may be realized, the lift modules 150A, 150B are under the control of any suitable controller, such as control server 120, such that when picking and placing case unit(s) and/or breakpack goods containers the pick head 4000A is raised and/or lowered to a predetermined height corresponding to an interface station TS at a predetermined storage level 130L. As may be realized, the lift modules 150A, 150B provide the Z throughput axis (relative to both the bot frame of reference REF and the rack frame of reference REF2) of the storage and retrieval system where the output lift modules 150B form a part of the case level sortation echelon 15000 and are configured to sort case units on the fly for delivery to the output stations 160US as will be described herein and/or in a manner substantially similar to that described in U.S. Pat. No. 10,947,060 titled "Vertical Sequencer for Product Order Fulfillment" issued on Mar. 16, 2021, the disclosure of which is incorporated herein by reference in its entirety. At the interface stations TS the pick head 4000A or individual portion thereof (e.g. effector or load handling device LHD), corresponding to one or more case unit holding location(s) of the interface station TS from which one or more case unit(s) are being picked, is extended so that the fingers 4273 are interdigitated between the slats 1210S (as illustrated in FIG. 4B) underneath the case unit(s) being picked. The lift 150A, 150B raises the pick head 4000A to lift the case unit(s) from the slats 1210S and retracts the pick head 4000A for transport of the case unit(s) and/or breakpack container to another level of the storage and retrieval system, such as for transporting the case unit(s) to one or more of output stations 160UT, 160EC. Similarly, to place one or more case unit(s) the pick head 4000A or individual portion thereof (e.g. effector or load handling device LHD), corresponding to one or more case unit holding location(s) of the interface station TS from which one or more case unit(s) are being placed, is extended so that the fingers 4273 are above the slats. The lift 150A, 150B lowers the pick head 4000A to place the case unit(s) on the slats 1210S and so that the fingers 4273 are interdigitated between the slats 1210S underneath the case unit(s) being picked.

Referring now to FIG. 4A, as noted above, the container bot 110 includes a transfer arm 110PA that effects the picking and placement of case units from the stacked storage spaces 130S, interface stations TS and peripheral buffer stations BS, BSD defined at least in part, in the Z direction) by one or more of the rails 1210A-1210C, 1200 (e.g. where the storage spaces, interface stations and/or peripheral buffer stations may be further defined in the X and Y directions, relative to either of the rack frame of reference REF2 or the bot frame of reference REF, through the dynamic allocation of the case units as described above). As may be realized, the bot defines the X throughput axis and, at least in part, the Y throughput axis (e.g. relative to the bot frame of reference REF) as will be described further below.

The container bots 110, as noted above, transport case units between each lift module 150 and each storage space 130S on a respective storage level 130L. The container bots 110 include a frame 110F having a drive section 110DR and a payload section 110PL. The drive section 110DR includes one or more drive wheel motors each connected to a respective drive wheel(s) 202 for propelling the container bot 110 along the X direction (relative to the bot frame of reference REF so as to define the X throughput axis). As may be realized, the X axis of bot travel is coincident with the storage locations when the container bot 110 travels through the picking aisles 130A. In this aspect the container bot 110 includes two drive wheels 202 located on opposite sides of the container bot 110 at end 110E1 (e.g. first longitudinal end) of the container bot 110 for supporting the container bot 110 on a suitable drive surface however, in other aspects any suitable number of drive wheels are provided on the container bot 110. In one aspect each drive wheel 202 is independently controlled so that the container bot 110 may be steered through a differential rotation of the drive wheels 202 while in other aspects the rotation of the drive wheels 202 may be coupled so as to rotate at substantially the same speed. Any suitable wheels 201 are mounted to the frame on opposite sides of the container bot 110 at end 110E2 (e.g. second longitudinal end) of the container bot 110 for supporting the container bot 110 on the drive surface. In one aspect the wheels 201 are caster wheels that freely rotate allowing the container bot 110 to pivot through differential rotation of the drive wheels 202 for changing a travel direction of the container bot 110. In other aspects the wheels 201 are steerable wheels that turn under control of, for example, a bot controller 110C (which is configured to effect control of the container bot 110 as described herein) for changing a travel direction of the container bot 110. In one aspect the container bot 110 includes one or more guide wheels 110GW located at, for example, one or more corners of the frame 110F. The guide wheels 110GW may interface with the storage structure 130, such as guide rails (not shown) within the picking aisles 130A, on the container transfer deck 130DC and/or at interface or transfer stations for interfacing with the lift modules 150 for guiding the container bot 110 and/or positioning the container bot 110 a predetermined distance from a location to/from which one or more case units are placed and/or picked up as described in, for example, U.S. patent application Ser. No. 13/326,423 filed on Dec. 15, 2011 the disclosure of which is incorporated herein by reference in its entirety.

As noted above, the container bots 110 may enter the picking aisles 130A having different facing directions for accessing storage spaces 130S located on both sides of the picking aisles 130A. For example, the container bot 110 may enter a picking aisle 130A with end 110E2 leading the direction of travel or the bot may enter the picking aisle 130A with end 110E1 leading the direction of travel.

The payload section 110PL of the container bot 110 includes a payload bed 110PB, a fence or datum member 110PF, a transfer arm 110PA and a pusher bar or member 110PR. In one aspect the payload bed 110PB includes one or more rollers 110RL that are transversely mounted (e.g. relative to a longitudinal axis LX of the container bot 110) to the frame 110F so that one or more case units and/or breakpack goods containers carried within the payload section 110PL can be longitudinally moved (e.g. justified with respect to a predetermined location of the frame/payload section and/or a datum reference of one or more case units) along the longitudinal axis of the bot, e.g., to position the case unit and/or breakpack goods containers at a predetermined position within the payload section 110PL and/or relative to other case units and/or breakpack goods containers within the payload section 110PL (e.g. longitudinal forward/aft justification of case units). In one aspect the rollers 110RL may be driven (e.g. rotated about their respective axes) by any suitable motor for moving the case units and/or breakpack goods containers within the payload section 110PL. In other aspects the container bot 110 includes one or more longitudinally movable pusher bar (not shown) for pushing the case units and/or breakpack goods containers over the rollers 110RL for moving the case unit(s) and/or breakpack container(s) to the predetermined position within the payload section 110PL. The longitudinally movable pusher bar may be substantially similar to that described in, for example, U.S. patent application Ser. No. 13/326,952 filed on Dec. 15, 2011, the disclosure of which was previously incorporated by reference herein in its entirety. The pusher bar 110PR is movable in the Y direction, relative to the container bot 110 reference frame REF to effect, along with the fence 110PF and or pick head 270 of the transfer arm 110PA, a lateral justification of case unit(s) and/or breakpack container(s) within the payload area 110PL in the manner described in U.S. Provisional Patent Application No. 62/107,135 filed on Jan. 23, 2015, previously incorporated herein by reference in their entireties.

Still referring to FIG. 4A, the case units and/or breakpack goods containers are placed on the payload bed 110PB and removed from the payload bed 110PB with the transfer arm 110PA along the Y throughput axis. The transfer arm 110PA includes a lift mechanism or unit 200 located substantially within the payload section 110PL as described in, for example, U.S. Provisional Patent Application No. 62/107,135 filed on Jan. 23, 2015, previously incorporated herein by reference in their entireties. The lift mechanism 200 provides both gross and fine positioning of pickfaces (which may include either case units or breakpack goods containers, or both case units and breakpack goods containers) carried by the container bot 110 which are to be lifted vertically into position in the storage structure 130 for picking and/or placing the pickfaces and/or individual case units to the storage spaces 130S (e.g. on a respective storage level 130L on which the container bot 110 is located). For example, the lift mechanism 200 provides for picking and placing case units at the multiple elevated storage shelf levels 130LS1-130LS3, TL1, TL2 accessible from the common picking aisle or interface station deck 1200S (see e.g. FIGS. 1B, 2B and 2B).

The lift mechanism 200 is configured so that combined robot axis moves are performed (e.g. combined substantially simultaneous movement of the pusher bar 110PR, lift mechanism 200, pick head extension and fore/aft justification mechanism(s) such as, e.g., the longitudinally movable pusher bar described above), so that different/multi-sku or multi-pick payloads are handled by the container bot 110. In one aspect, the actuation of the lifting mechanism 200 is independent of actuation of the pusher bar 110PR as will be described below. The decoupling of the lift mechanism 200 and pusher bar 110PR axes provides for combined pick/place sequences effecting a decreased pick/place cycle time, increased storage and retrieval system throughput and/or increased storage density of the storage and retrieval system as described above. For example, the lift mechanism 200 provides for picking and placing case units at multiple elevated storage shelf levels accessible from a common picking aisle and/or interface station deck 1200S as described above.

The lifting mechanism may be configured in any suitable manner so that a pick head 270 of the container bot 110 bi-directionally moves along the Z axis (e.g. reciprocates in the Z direction—see FIG. 4A). In one aspect, the lifting mechanism includes a mast 200M and the pick head 270 is movably mounted to the mast 200M in any suitable manner. The mast is movably mounted to the frame in any suitable manner so as to be movable along the lateral axis LT of the container bot 110 (e.g. in the Y direction so as to define the Y throughput axis). In one aspect the frame includes guide rails 210A, 210B to which the mast 200 is slidably mounted. A transfer arm drive 250A, 250B may be mounted to the frame for effecting at least movement of the transfer arm 110PA along the lateral axis LT (e.g. Y axis) and the Z axis. In one aspect the transfer arm drive 250A, 250B includes an extension motor 301 and a lift motor 302. The extension motor 301 may be mounted to the frame 110F and coupled to the mast 200M in any suitable manner such as by a belt and pulley transmission 260A, a screw drive transmission (not shown) and/or a gear drive transmission (not shown). The lift motor 302 may be mounted to the mast 200M and coupled to pick head 270 by any suitable transmission, such as by a belt and pulley transmission 271, a screw drive transmission (not shown) and/or a gear drive transmission (not shown). As an example, the mast 200M includes guides, such as guide rails 280A, 280B, along which the pick head 270 is mounted for guided movement in the Z direction along the guide rails 280A, 280B. In other aspects the pick head is mounted to the mast in any suitable manner for guided movement in the Z direction. With respect to the transmissions 271, a belt 271B of the belt and pulley transmission 271 is fixedly coupled to the pick head 270 so that as the belt 271 moves (e.g. is driven by the motor 302) the pick head 270 moves with the belt 271 and is bi-directionally driven along the guide rails 280A, 280B in the Z direction. As may be realized, where a screw drive is employed to drive the pick head 270 in the Z direction, a nut may be mounted to the pick head 270 so that as a screw is turned by the motor 302 engagement between the nut and screw causes movement of the pick head 270. Similarly, where a gear drive transmission is employed a rack and pinion or any other suitable gear drive may drive the pick head 270 in the Z direction. In other aspects any suitable linear actuators are used to move the pick head in the Z direction. The transmission 260A for the extension motor 301 is substantially similar to that described herein with respect to transmission 271.

Still referring to FIG. 4A the pick head 270 of the container bot 110 transfers case units between the container bot 110 and a case unit and/or breakpack goods container pick/place location such as, for example, the storage spaces 130S, peripheral buffer stations BS, BSD, interface stations TS (see FIGS. 2A-2B), breakpack operation station 140 (see FIGS. 1 and 2C), and/or breakpack goods interface 263 (see FIGS. 1 and 2C), and in other aspects substantially directly between the container bot 110 and a lift module(s) 150. In one aspect, the pick head 270 includes a base member 272, one or more tines or fingers 273A-273E and one or more actuators 274A, 274B. The base member 272 is mounted to the mast 200M, as described above, so as to ride along the guide rails 280A, 280B. The one or more tines 273A-273E are mounted to the base member 272 at a proximate end of the tines 273A-273E so that a distal end of the tines 273A-273E (e.g. a free end) is cantilevered from the base member 272. Referring again to FIG. 1C, the tines 273A-273E are configured for insertion between slats 1210S that form the case unit support plane CUSP of the storage shelves (and similar slats of the peripheral buffer stations BS, BSD, interface stations TS, breakpack operation station 140, and/or breakpack goods interface 263).

One or more of the tines 273A-273E is movably mounted to the base member 272 (such as on a slide/guide rail similar to that described above) so as to be movable in the Z direction. In one aspect any number of tines are mounted to the base member 272 while in the aspect illustrated in the figures there are, for example, five tines 273A-273E mounted to the base member 272. Any number of the tines 273A-273E are movably mounted to the base member 272 while in the aspect illustrated in the figures, for example, the outermost (with respect to a centerline CL of the pick head 270) tines 273A, 273E are movably mounted to the base member 272 while the remaining tines 273B-273D are immovable relative to the base member 272.

In this aspect the pick head 270 employs as few as three tines 273B-273D to transfer smaller sized case units (and/or groups of case units) to and from the container bot 110 and as many as five tines 273A-273E to transfer larger sized case units (and/or groups of case units) to and from the container bot 110. In other aspects, less than three tines are employed (e.g. such as where more than two tines are movably mounted to the base member 272) to transfer smaller sized case units. For example, in one aspect all but one tine 273A-273E is movably mounted to the base member so that the smallest case unit being transferred to and from the container bot 110 without disturbing other case units on, for example, the storage shelves has a width of about the distance X1 between slats 1210S (see FIG. 1C).

The immovable tines 373B-373D define a picking plane SP of the pick head 270 and are used when transferring all sizes of case units, breakpack goods containers (and/or pickfaces of case units and/or breakpack goods containers) while the movable tines 373A, 373E are selectively raised and lowered (e.g. in the Z direction with the actuators 274A, 274B) relative to the immovable tines 373B-373D to transfer larger case units (and/or pickfaces). Still referring to FIG. 4A an example is shown where all of the tines 273A-273E are positioned so that a case unit support surface SF of each tine 273A-273E is coincident with the picking plane SP of the pick head 270 however, as may be realized, the two end tines 273A, 273E are movable so as to be positioned lower (e.g. in the Z direction) relative to the other tines 273B-273D so that the case unit support surface SF of tines 273A, 273E is offset from (e.g. below) the picking plane SP so that the tines 273A, 273E do not contact the one or more case units or breakpack goods containers (and/or pickfaces of case units and/or breakpack goods containers) carried by the pick head 270 and do not interfere with any unpicked case units or breakpack goods containers positioned in storage spaces 130S on the storage shelves or any other suitable case unit/breakpack goods container holding location.

The movement of the tines 273A-273E in the Z direction is effected by the one or more actuators 274A, 274B mounted at any suitable location of the transfer arm 110PA. In one aspect, the one or more actuators 274A, 274B are mounted to the base member 272 of the pick head 270. The one or more actuators are any suitable actuators, such as linear actuators, capable of moving one or more tines 273A-273E in the Z direction. In the aspect illustrated in, for example, FIG. 4A there is one actuator 274A, 274B for each of the movable tines 273A, 273E so that each moveable tine is independently movable in the Z direction. In other aspects one actuator may be coupled to more than one movable tine so that the more than one movable tine move as a unit in the Z direction.

As may be realized, movably mounting one or more tines 273A-273E on the base member 272 of the pick head 270 provides for full support of large case units, breakpack goods containers, and/or pickfaces (e.g., of case units and/or breakpack goods containers) on the pick head 270 while also providing the ability to pick and place small case units or breakpack goods containers without interfering with other case units or breakpack goods containers positioned on/at, for example, the storage spaces, interface stations, peripheral buffer stations, breakpack operation stations, and/or breakpack goods interfaces. The ability to pick and place variably sized case units without interfering with other case units on/at the storage spaces, interface stations, peripheral buffer stations, breakpack operation stations, and/or breakpack goods interfaces reduces a size of a gap GP (see FIG. 1B) between case units on the storage shelves thereof. As may be realized, because the tines 273B-273D are fixed to the base member 272 there is no duplicative motion when picking/placing case units as the lifting and lowering of case units and/or pickfaces to and from the case unit holding location is effected solely by the lift motor 301, 301A.

Referring again to FIG. 4A, it is again noted that the pusher bar 110PR is movable independent of the transfer arm 110PA. The pusher bar 110PR is movably mounted to the frame in any suitable manner such as by, for example, a guide rod and slide arrangement and is actuated along the Y direction (e.g. in a direction substantially parallel to the extension/retraction direction of the transfer arm 110PA). In one aspect at least one guide rod 360 is mounted within the payload section 110PL so as to extend transversely relative to the longitudinal axis LX of the frame 110F. The pusher bar 110PR may include at least one slide member 360S configured to engage and slide along a respective guide rod 360. In one aspect, at least the guide rod/slide arrangement holds the pusher bar 110PR captive within the payload section 110PL. The pusher bar 110PR is actuated by any suitable motor and transmission, such as by motor 303 and transmission 303T. In one aspect the motor 303 is a rotary motor and the transmission 303T is a belt and pulley transmission. In other aspects the pusher bar 110PR may be actuated by a linear actuator having substantially no rotary components.

Figure 6A:
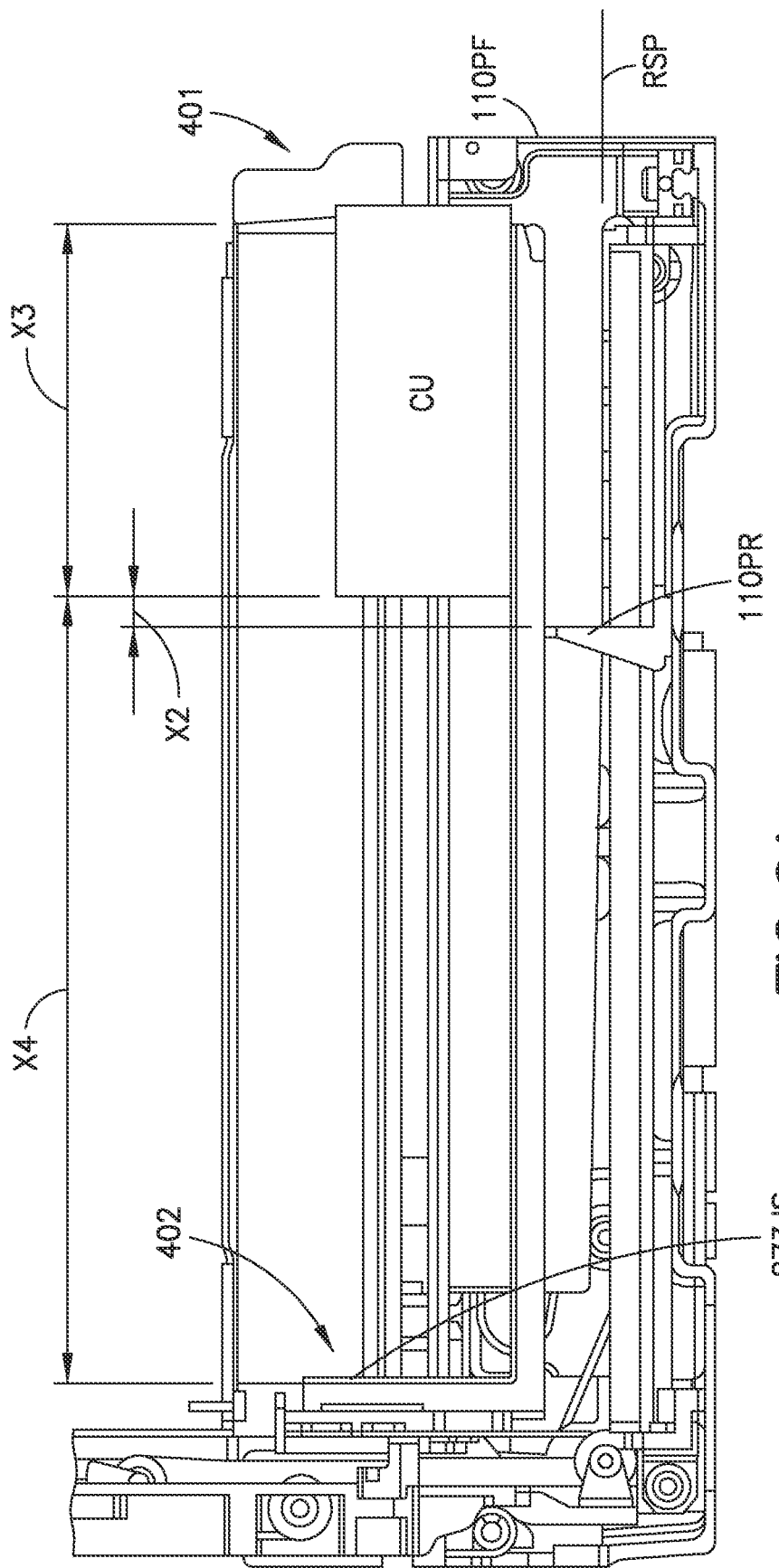
Figure 6B:
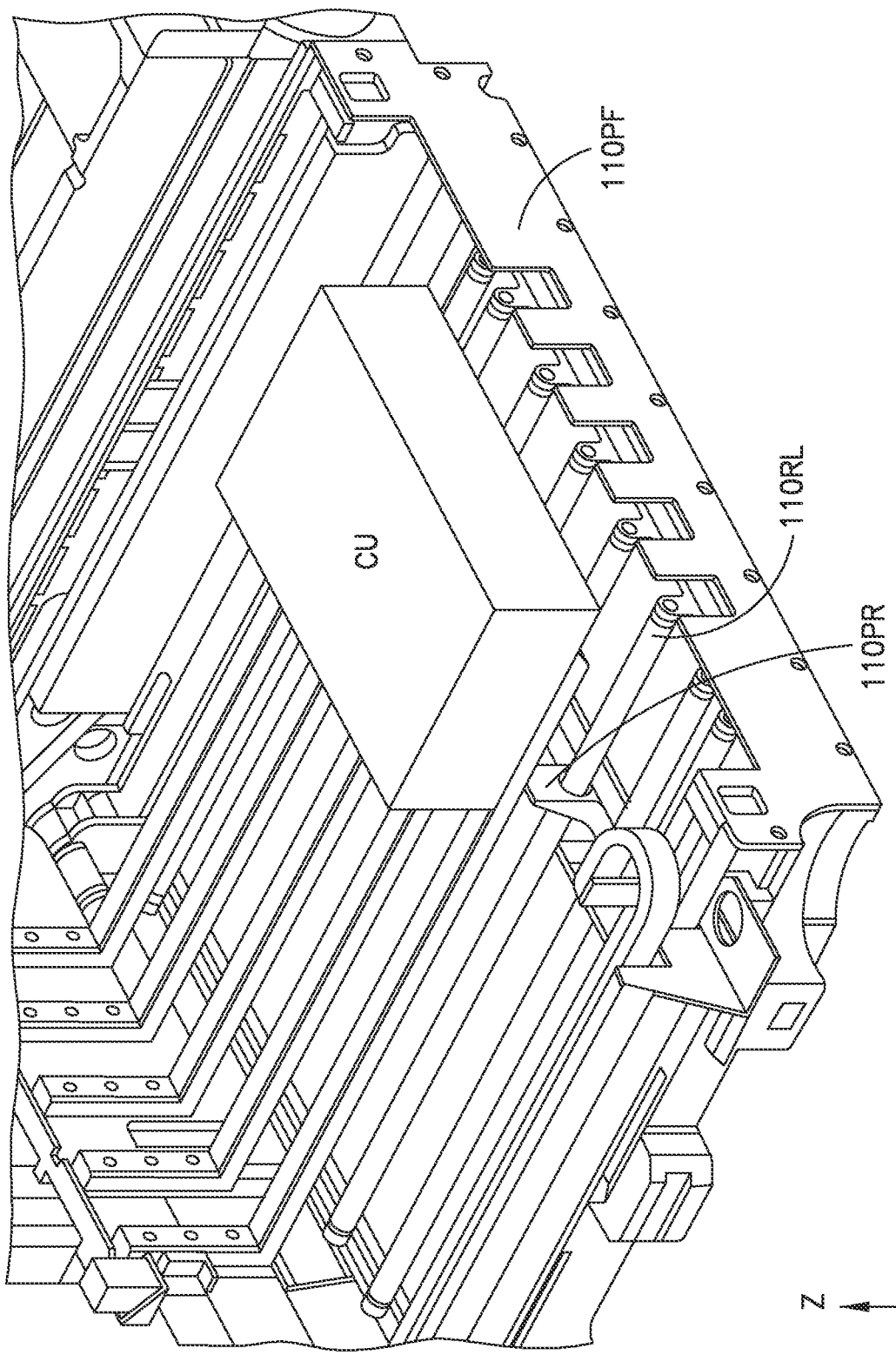
Figure 6C:
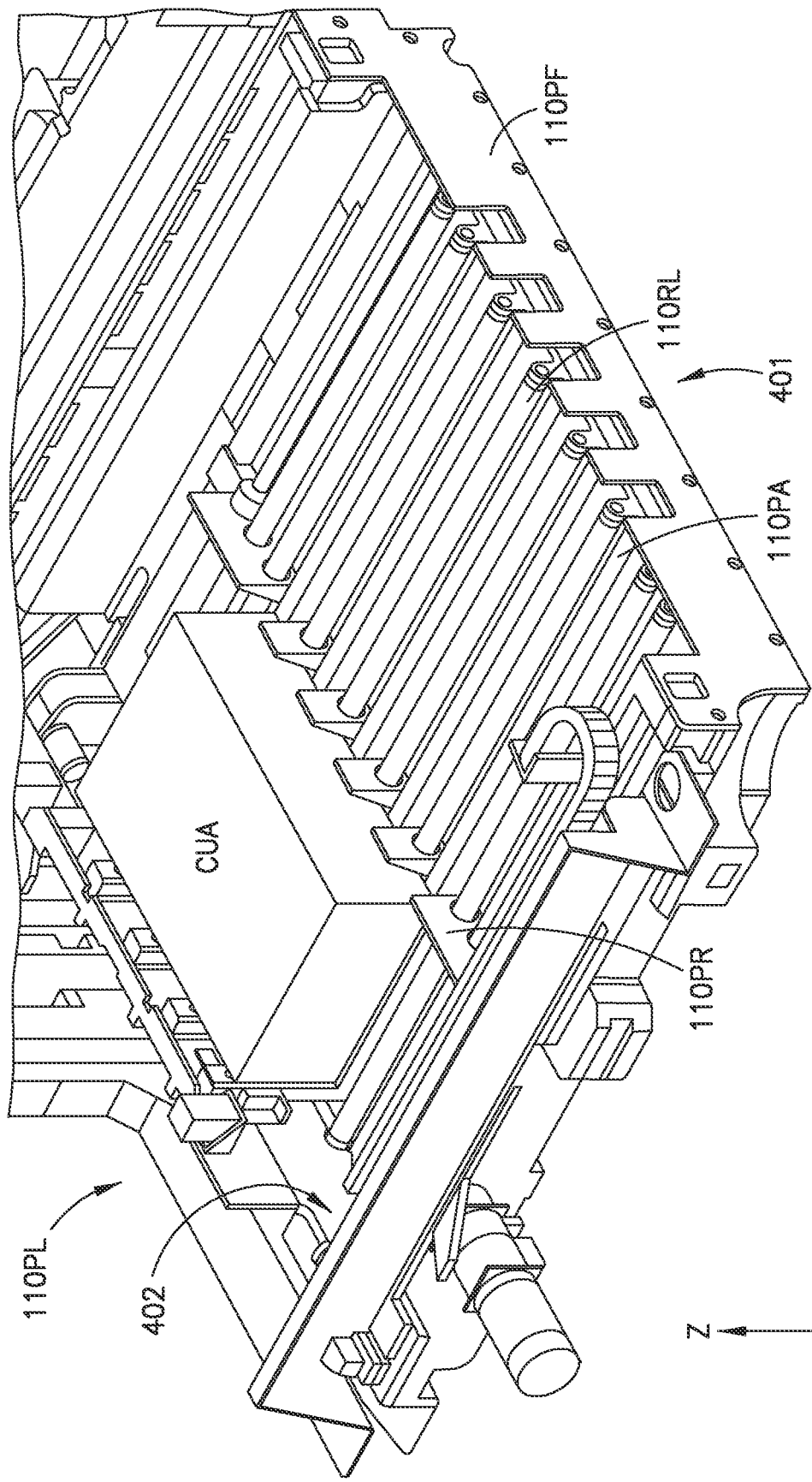
Figure 6E:
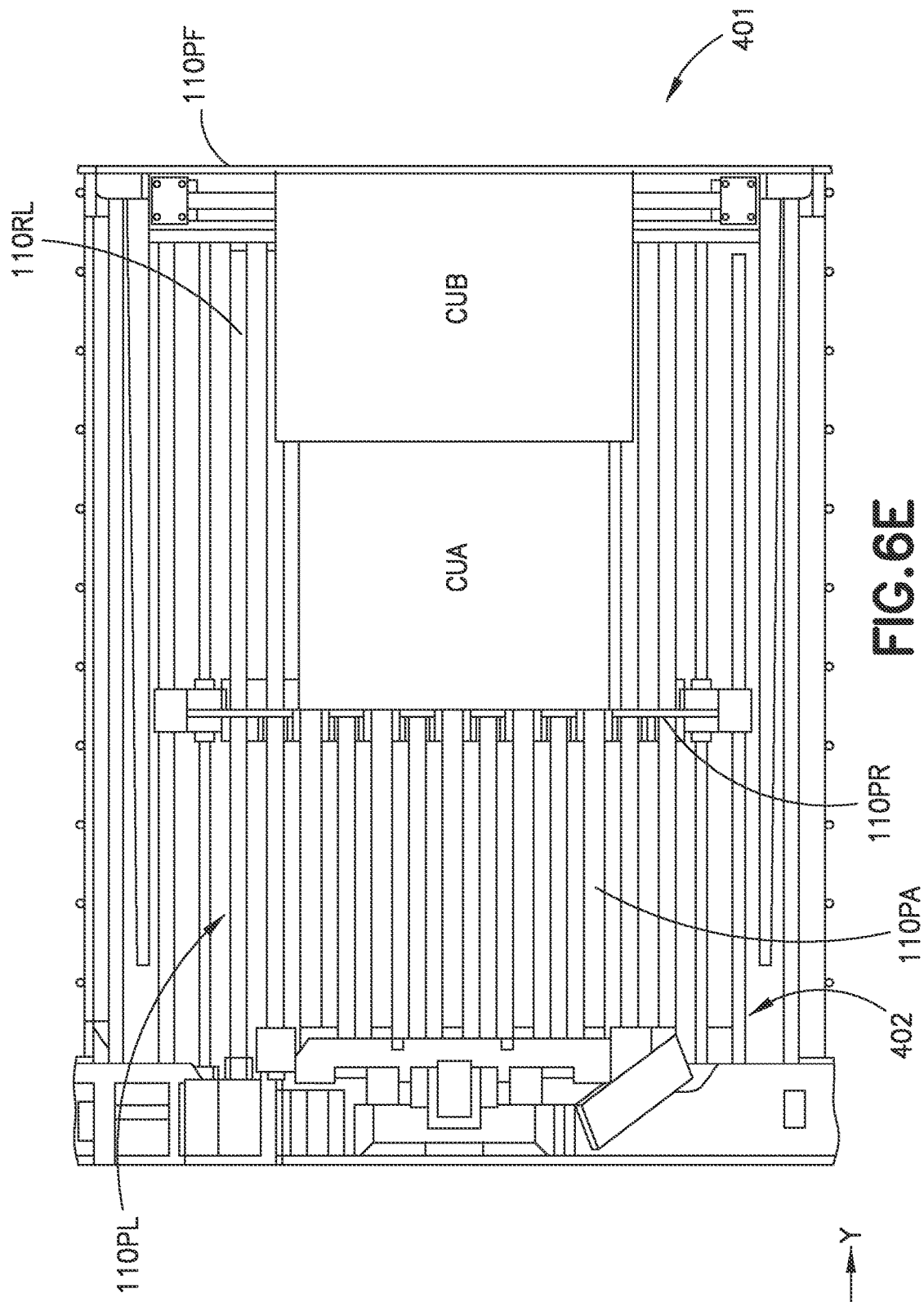
Figure 6F:
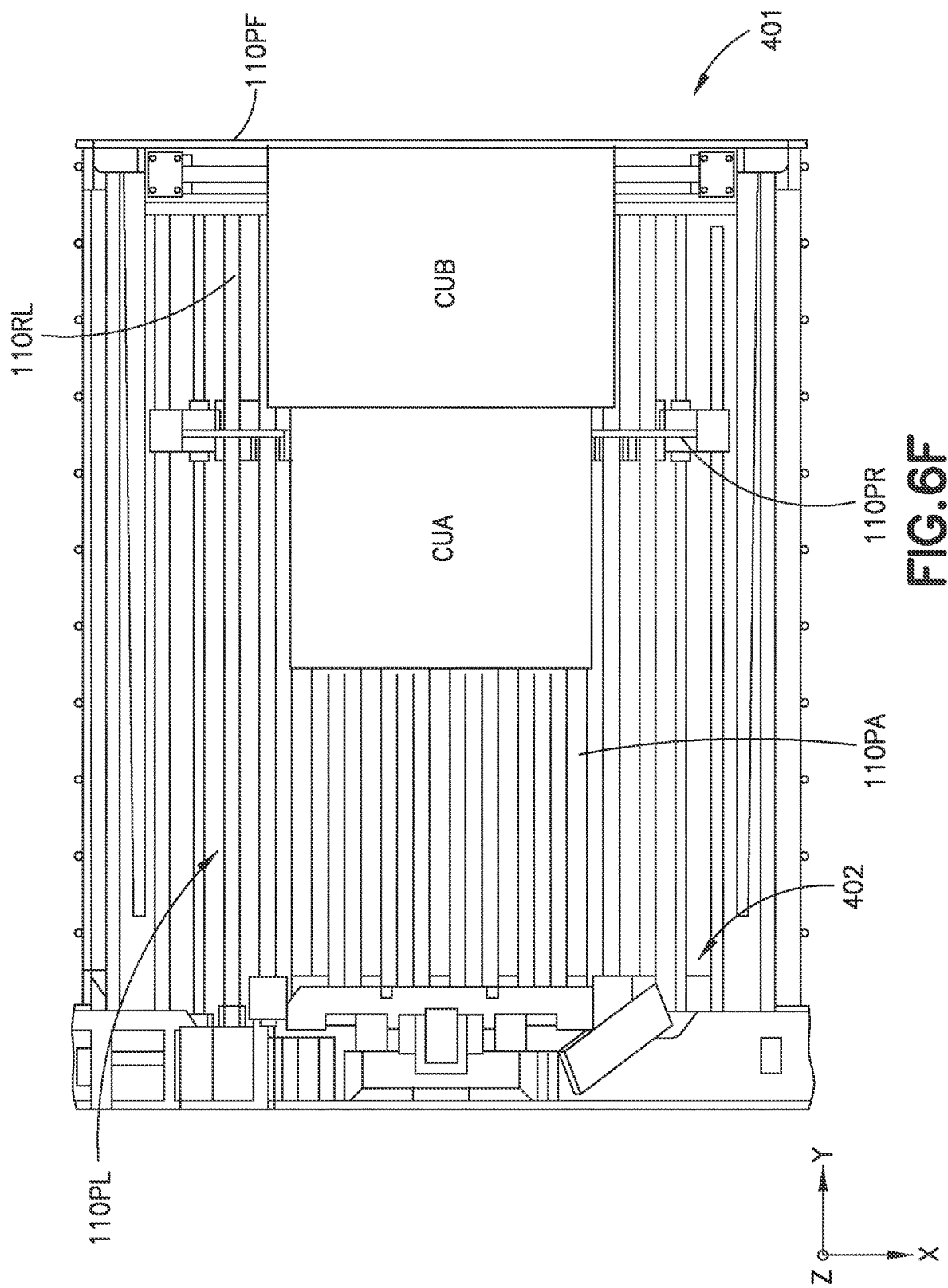

The pusher bar 110PR is arranged within the payload section 110PL so as to be substantially perpendicular to the rollers 110RL and so that the pusher bar 110PR does not interfere with the pick head 270. As can be seen in FIG. 6C, the container bot 110 is in a transport configuration where at least one case unit would be supported on the rollers 110RL (e.g. the rollers collectively form the payload bed). In the transport configuration the tines 273A-273E of the pick head 270 are interdigitated with the rollers 110RL and are located below (along the Z direction) a case unit support plane RSP (see FIG. 6A) of the rollers 110RL. The pusher bar 110PR is configured with slots 351 (FIG. 6D) into which the tines 273A-273E pass where sufficient clearance is provided within the slots 351 to allow the tines to move below the case unit support plane RSP and to allow free movement of the pusher bar 110PR without interference from the tines 273A-273E. The pusher bar 110PR also includes one or more apertures through which the rollers 110RL pass where the apertures are sized to allow free rotation of the rollers about their respective axes. As may be realized, the independently operable pusher bar 110PR does not interfere with the rollers 110PR, extension of the transfer arm 110PA in the transverse direction (e.g. Y direction) and the lifting/lowering of the pick head 270.

Figure 7:
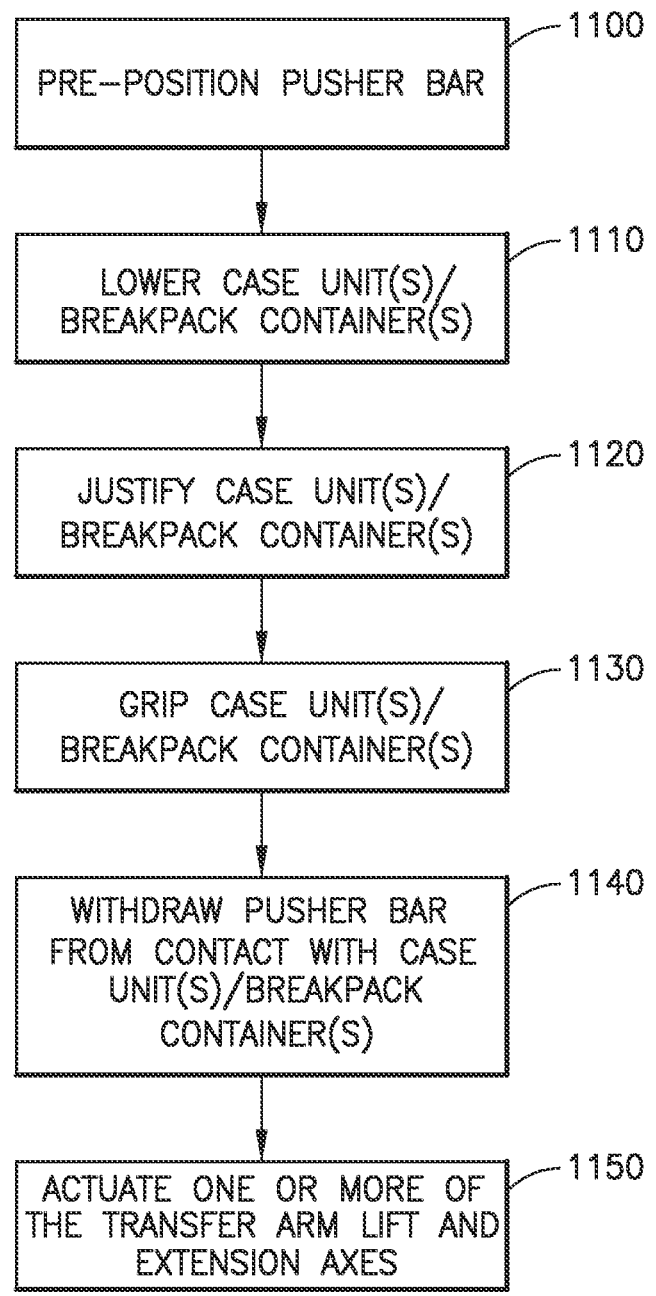
FIGS. 7-10 are exemplary flow diagrams in accordance with aspects of the disclosed embodiment.

As noted above, because the pusher bar 110PR is a separate, standalone axis of the container bot 110 that operates free of interference from the pick head 270 extension and lift axes, the pusher bar 110PR can be operated substantially simultaneously with the lifting and/or extension of the transfer arm 110PA. The combined axis moves (e.g. the simultaneous movement of the pusher bar 110PR with the transfer arm 110PA extension and/or lift axes) provides for increased payload handling throughput in along the Y throughput axis and effects an ordered (e.g. according to a breakpack sequence, which may be based at least in part on the predetermined load out sequence) multi-pick of two or more case units and/or breakpack goods containers from a common picking aisle, in one common pass of the picking aisle for transfer to breakpack operation station 140. For example, referring to FIGS. 6A-6B during a transfer arm 110PA multi-pick/place sequence the pusher bar 110PR is prepositioned (as the case unit(s), breakpack goods container(s), and/or pickface is/are being picked and transferred into the payload section 110PL) to a location that is a predetermined distance X2 away from the contact depth X3 (e.g. the depth of the tines occupied by the case unit(s), breakpack goods container(s), and/or pickface CU when being picked/placed from a storage space or other holding location) (FIG. 7, Block 1100). The distance X2 is a minimized distance that only allows sufficient clearance between pusher bar 110PR and the case unit(s)/breakpack goods container(s) to allow the case unit(s)/breakpack goods container(s) to be seated on the rollers 110RL. As the case unit(s) CU and/or breakpack goods container(s) 264 are lowered onto the rollers 110RL (FIG. 7, Block 1110) the distance travelled by the pusher bar 110PR to contact the case unit(s) CU and/or breakpack goods container(s) 264 is a shorter distance X2 when compared to moving from a back side 402 (relative to the lateral direction and an access side 401 of the payload section 110PL) of the payload section 110PL a distance X4 as with conventional transport vehicles. When the case unit(s) CU and/or breakpack goods container(s) 264 are lowered by the transfer arm 110PA and transferred to the rollers 110RL so as to be solely supported by the rollers 110RL, the pusher bar 110PR is actuated to forward (relative to the lateral direction and an access side 401 of the payload section 110PL) justify the case unit(s) CU and/or breakpack goods container(s) 264 (FIG. 7, Block 1120). For example, the pusher bar 110PR may push the case unit(s) CU and/or breakpack goods container(s) 264 laterally in the Y direction so that the case unit(s) contact the fence 110PF (which is located at the access side 401 of the payload section 110PL so that a case unit reference datum may be formed through contact between the case unit(s) CU/breakpack goods container(s) 264 and the fence 110PF. In one aspect the pusher bar 110PR may engage or otherwise grip the case unit(s) CU and/or breakpack goods container(s) 264 during transport of the case units/breakpack goods containers (e.g. so as to hold the case unit(s) and/or breakpack goods container(s) 264 against the fence 110PF) for maintaining the case unit(s) CU and/or breakpack goods container(s) 264 in a predetermined spatial relationship with each other and a reference frame REF (FIG. 4A) of the container bot 110 (FIG. 7, Block 1130). When placing the case unit(s) and/or breakpack goods container(s) 264 the pusher bar 110PR, after justifying the case unit(s) CU and/or breakpack goods container(s) 264 against the fence 110PF, is withdrawn (e.g. in the Y direction) from contact with the case unit(s) CU and/or breakpack goods container(s) 264 (FIG. 7, Block 1140). Substantially immediately after the pusher bar 110PR disengages the case unit(s) CU and/or breakpack goods container(s) 264 one or more of the lift axis (e.g. in the Z direction) and extension axis (e.g. in the Y direction) of the transfer arm 110PA are actuated substantially simultaneously with the withdrawing movement of the pusher bar 110PR (FIG. 7, Block 1150). In one aspect both the lift and extension axes are actuated when the pusher bar is withdrawn from contact with the case unit(s) CU and/or breakpack goods container(s) 264 while in other aspect one of the lift and extension axes is actuated. As may be realized, the simultaneous movement of the transfer arm 110PA lift axis and/or extension axis with the withdrawal of the pusher bar 110PR as well as the decreased distance the pusher moves to justify the case unit(s) CU and/or breakpack goods container(s) 264 decreases the time needed to transfer case unit(s) CU and/or breakpack goods container(s) 264 to and from the container bot 110 and increases throughput of the storage and retrieval system 100.

As an example of case manipulation on the container bot 110, referring also to FIGS. 6C-6F, container(s) CUA (which may be a supply container 265 (e.g., a pickface, case unit(s), etc.) or a breakpack goods container 264) may be picked from a holding location (e.g. such as storage spaces 130S in a common picking aisle for effecting the ordered multi-pick, and in other aspects from a lift interface station TS, and/or a case unit buffer station BS located in a picking aisle or on the transfer deck) and transferred into the payload section 110PL. As the container(s) CUA is being transferred into the payload section 110PL the pusher bar 110PR may be pre-positioned adjacent the fence 110PF so that the pusher bar 110PR is positioned between the container (s) CUA and the fence 110PF when the container(s) CUA is lowered for transfer to the rollers 110RL. The pusher bar 110PR is actuated to push the container (s) CUA (resting on the rollers 110RL) in the Y direction towards the back (e.g. rear) 402 of the payload section 110PL so that the container(s) CUA contacts a justification surface 273JS (FIG. 6A) of the tines 273A-273E and is justified to the back 402 of the payload section 110PL.

In one aspect, the container bot 110 continues to traverse the common picking aisle in the same direction XC (e.g. so that all of the case units in the ordered multi-pick are picked in the common pass of the picking aisle with the container bot 110 travelling in a single direction) and stops at another predetermined storage space 130S according to the predetermined breakpack sequence (which breakpack sequence may at least in part be determined by an order out sequence of goods from the automated storage and retrieval system 100 for order fulfillment). As noted above, the pusher bar 110PR remains in contact with (e.g. grips) the container(s) CUA during transport of the case unit(s) between case unit holding locations so that the container(s) CUA remains in a predetermined location at the back 402 of the payload section 110PL (and/or at a predetermined location longitudinally) relative to the reference frame REF of the container bot 110. To pick subsequent containers, from for example, the another storage space of the common picking aisle the pusher bar 110PR is moved in the Y direction to disengage the container(s) CUA and the lift and extension axes of the transfer arm 110PA are actuated to retrieve another container(s) CUB from the other storage space 130S2 (or in other aspects from e.g. a lift/handoff interface station TS and/or a buffer/handoff station BS as noted above). While the container(s) CUB are being picked the pusher bar 110PR is positioned in the Y direction adjacent the back 402 of the payload section 110PL so as to be located between the container(s) CUA and the justification surface 273JS of the tines 273A-273E. The container(s) CUB are transferred into the payload section and lowered/placed on the rollers 110RL so that the containers CUA, CUB are arranged relative to each other along the Y axis. The pusher bar 110PR is actuated in the Y direction to push the containers CUA, CUB towards the fence 110PF to forward justify the containers CUA, CUB and grip/hold the containers CUA, CUB for transport to a breakpack module 266. As may be realized, in one aspect the containers CUA, CUB are placed at a holding location together as a unit while in other aspects the containers CUA, CUB are sorted, e.g. transported to and placed at separate positions of a common holding location, such as at a common support surface 140S of breakpack operation station 140 or at different case unit holding locations, such as for example, placement of container CUB at breakpack operation station 140 and container CUA at a lift 150B or other holding location (such as another breakpack operation station 140 of another breakpack module 266. For example, referring also to FIGS. 2A, 2C, and 5, the container bot 110 carrying the multi-pick payload transfers the containers CUA, CUB of the multi-pick payload to one or more interface stations TS (which include buffer shelves) corresponding to output lifts 150B.

Figure 8:
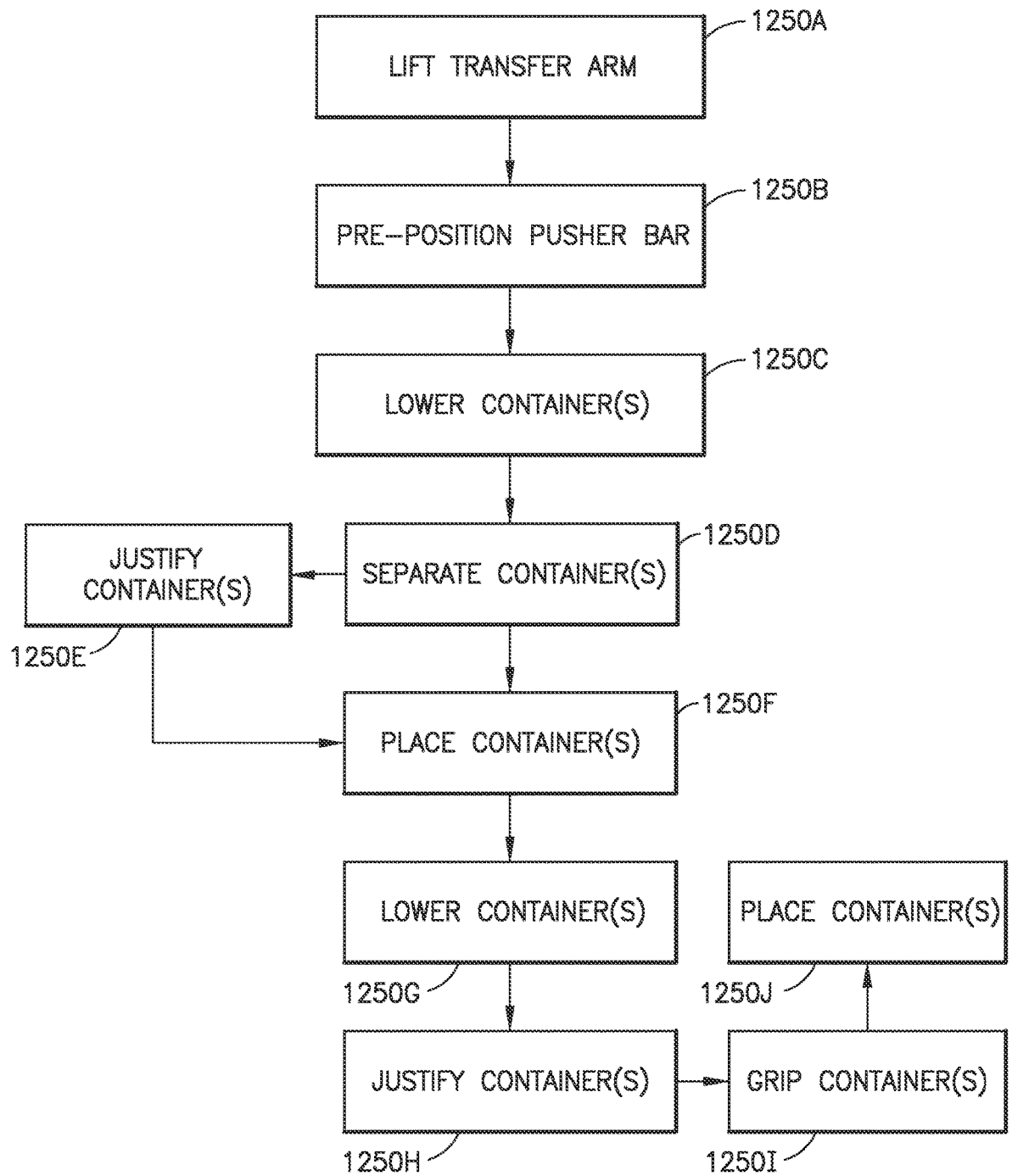

As may be realized, in one aspect where the container bots 110 turn into a pier 130BD (FIG. 5) the spacing between bots travelling on the high speed bot travel path HSTP of the container transfer deck 130DC (FIG. 2A) is such that the bot interfacing with the interface station TS is able to slow down and turn into the interface station TS substantially without interference from and/or interference with another container bot 110 travelling along the container transfer deck 130DC. In other aspects, the container bots 110 travelling on the container transfer deck 130DC may drive around the container bots 110 turning into the interface stations TS as the container transfer deck 130DC is substantially open and configured for the undeterministic traversal of container bots 110 across and along the container transfer deck 130DC as described above. Where the containers CUA, CUB of the multi-pick are placed at different positions of, for example, a common buffer shelf BS of interface/handoff station 7000A, 7000B of the lifts 150B1, 150B2 the container bot 110 places a first one of the containers CUB in a first position of the buffer shelf 7000A and places the second one of the containers CUA in a second position of the buffer shelf 7000A. Where the containers of the multi-pick are placed at a common container holding location the container bot 110 places both containers CUA, CUB as a unit (e.g. a pickface) at for example, a common position of buffer shelf 7000A.

Where the containers CUA, CUB are sorted for placement at separate positions of a common holding location or at different holding locations (such as described in U.S. Pat. No. 9,856,083 previously incorporated by reference herein in its entirety), the containers CUA, CUB are separated from each other in the payload section 110PL. For example, referring also to FIGS. 4A, 4B, and 6A-6F, the pick head 270 of the transfer arm 110PA may be moved in the Z direction to lift the containers CUA, CUB from the rollers 110RL by an amount sufficient to allow the pusher bar 110PR to pass beneath the containers (FIG. 8, Block 1250A). As the containers CUA, CUB are lifted the pusher bar 110PR is positioned along the Y direction so as to be located between the containers CUA, CUB (see FIG. 6F) (FIG. 8, Block 1250B). The pick head 270 is lowered so that the containers CUA, CUB are transferred to the rollers 110RL and so that the pusher bar is inserted between the containers CUA, CUB (FIG. 8, Block 1250C). The pusher bar 110PR is moved in the Y direction (e.g. to separate the containers) to move container CUA towards the back 402 of the payload section 110PL (e.g. against the justification surface 273JS of the tines 273A-273E or any other suitable position) while the container CUB remains at the front of the payload section 110PL adjacent the fence 110PF (e.g. as shown in FIG. 6D)

(FIG. 8, Block 1250D). As may be realized, where the containers are held against the justification surface 273JS of the tines during transport, the pusher bar is moved in the Y direction (e.g. to separate the containers) to move container CUB towards the front 401 of the payload section 110PL (e.g. against the fence 110PF or any other suitable position) while the container CUA remains at the back of the payload section 110PL adjacent the justification surface 273JS. The pusher bar 110PR may also be moved in the Y direction to re-justify the container CUB against the fence 110PF to position the container on the tines 273A-273E for placement at a container holding location (FIG. 8, Block 1250E). As may be realized, with the container CUA being positioned substantially against the justification surface 273JS of the tines 273A-273E (e.g. of the pick head 270) the container CUB can be placed at a container holding location substantially without interference from the container CUA (FIG. 8, Block 1250F), e.g. the container CUA is free from contacting other containers disposed at the container holding location. The container CUA is lowered/transferred back into the payload section 110PL (e.g. by retracting and lowering the transfer arm 110PA) (FIG. 8, Block 1250G). The pusher bar 110PR, which is pre-positioned between the justification surface 273JS and the container CUA, pushes the container CUA, which is disposed on the rollers 110RL, against the fence 110PF to forward justify the container CUA for placement at another container holding location (e.g. different than the holding location that container CUB was placed) (FIG. 8, Block 1250H). The pusher bar 110PR remains against the container CUA for gripping (e.g. with the fence) the container during transport to the other container holding location (FIG. 8, Block 1250I). The pusher bar 110PR moves away from the container CUA and the transfer arm is actuated to lift and extend the pick head 270 for placing the container CUA at the other container holding location (FIG. 8, Block 1250J).

Similarly, referring to FIGS. 1, 2A, and 2C, in one aspect where the container bots 110 turn into a breakpack module 266 from the transfer deck (see FIG. 2A) the spacing between bots travelling on the high speed bot travel path HSTP of the container transfer deck 130DC (FIG. 2A) is such that the bot interfacing with the interface station TS is able to slow down and turn into the interface station TS substantially without interference from and/or interference with another container bot 110 travelling along the container transfer deck 130DC. In other aspects, the container bots 110 travelling on the container transfer deck 130DC may drive around the container bots 110 turning into the breakpack module 266 as the container transfer deck 130DC is substantially open and configured for the undeterministic traversal of container bots 110 across and along the container transfer deck 130DC as described above. Where the containers CUA, CUB of the multi-pick are placed at different positions of, for example, a common support surface 140S of the breakpack operator station 140 the container bot 110 places a first one of the containers CUB in a first position of the support surface 140S and places the second one of the containers CUA in a second position of the support surface 140S. Where the containers of the multi-pick are placed at a common container holding location the container bot 110 places both containers CUA, CUB as a unit (e.g. a pickface) at for example, a common position of support surface 140S.

Where the containers CUA, CUB are sorted for placement at separate positions of a common holding location or at different holding locations (such as described in U.S. Pat. No. 9,856,083 previously incorporated by reference herein in its entirety), the containers CUA, CUB are separated from each other in the payload section 110PL. For example, referring also to FIGS. 4A, 4B, and 6A-6F, the pick head 270 of the transfer arm 110PA may be moved in the Z direction to lift the containers CUA, CUB from the rollers 110RL by an amount sufficient to allow the pusher bar 110PR to pass beneath the containers (FIG. 8, Block 1250A). As the containers CUA, CUB are lifted the pusher bar 110PR is positioned along the Y direction so as to be located between the containers CUA, CUB (see FIG. 6F) (FIG. 8, Block 1250B). The pick head 270 is lowered so that the containers CUA, CUB are transferred to the rollers 110RL and so that the pusher bar is inserted between the containers CUA, CUB (FIG. 8, Block 1250C). The pusher bar 110PR is moved in the Y direction (e.g. to separate the containers) to move container CUA towards the back 402 of the payload section 110PL (e.g. against the justification surface 273JS of the tines 273A-273E or any other suitable position) while the container CUB remains at the front of the payload section 110PL adjacent the fence 110PF (e.g. as shown in FIG. 6D) (FIG. 8, Block 1250D). As may be realized, where the containers are held against the justification surface 273JS of the tines during transport, the pusher bar is moved in the Y direction (e.g. to separate the containers) to move container CUB towards the front 401 of the payload section 110PL (e.g. against the fence 110PF or any other suitable position) while the container CUA remains at the back of the payload section 110PL adjacent the justification surface 273JS. The pusher bar 110PR may also be moved in the Y direction to re-justify the container CUB against the fence 110PF to position the container on the tines 273A-273E for placement at a container holding location (FIG. 8, Block 1250E). As may be realized, with the container CUA being positioned substantially against the justification surface 273JS of the tines 273A-273E (e.g. of the pick head 270) the container CUB can be placed at a container holding location of the support surface 140S of the breakpack operator station 140 substantially without interference from the container CUA (FIG. 8, Block 1250F), e.g. the container CUA is free from contacting other containers disposed at support surface 140S. The container CUA is lowered/transferred back into the payload section 110PL (e.g. by retracting and lowering the transfer arm 110PA) (FIG. 8, Block 1250G). The pusher bar 110PR, which is pre-positioned between the justification surface 273JS and the container CUA, pushes the container CUA, which is disposed on the rollers 110RL, against the fence 110PF to forward justify the container CUA for placement at another container holding location (e.g. different than the holding location that container CUB was placed) of the support surface 140S of the same breakpack operator station 140 or at another support surface 140S of another breakpack operator station 140 (FIG. 8, Block 1250H). The pusher bar 110PR remains against the container CUA for gripping (e.g. with the fence) the container during transport to the other container holding location (FIG. 8, Block 1250I). The pusher bar 110PR moves away from the container CUA and the transfer arm is actuated to lift and extend the pick head 270 for placing the container CUA at the other container holding location (FIG. 8, Block 1250J).

As can be seen in FIG. 2C, the breakpack goods interface 263 has more than one breakpack goods interface locations 263L arrayed at least along a substantially whole edge of the breakpack goods autonomous transport travel loop(s) 234 (e.g., of the goods deck 130DG), where each breakpack goods interface location 263L is configured to hold a respective breakpack goods container 264. As the container bot 110 transfers one or more (supply) containers to a breakpack operator station 140, the container bot 110 may opportunistically (i.e., in the sense that the container bot 110 was not scheduled to retrieve the breakpack goods container 264 but happened to travelling by the breakpack goods container 264, an in the interest of efficiency the control server 120 may send commands to the container bot 110 to opportunistically retrieve the breakpack goods container 264) pick a breakpack goods container 264 (designated for transfer to storage or an outbound lift 150B) from a respect breakpack goods interface location 263L. In other aspects, a breakpack goods container 264 in storage may be located in the same picking aisle 130A as a supply container 265, where both the breakpack goods container 264 and the supply container 265 are designated (e.g., by control server 120) for transfer to the same breakpack module 266. A container bot 110 previously commanded to pick supply container 265 may be commanded by control server 120 to opportunistically pick breakpack goods container 264 while travelling along the same picking aisle (such as where the breakpack goods container 264 was designated for transfer after initial commands were issued to the container bot 110). Here the container bot 110 may travel with both the breakpack goods container 264 and the supply container 265 and transfer the supply container 265 to an breakpack operation station 140 of the breakpack module 266 and then transfer the breakpack goods container 264 to a predetermined breakpack goods interface location 263L of the same breakpack module 266.

Figure 9:
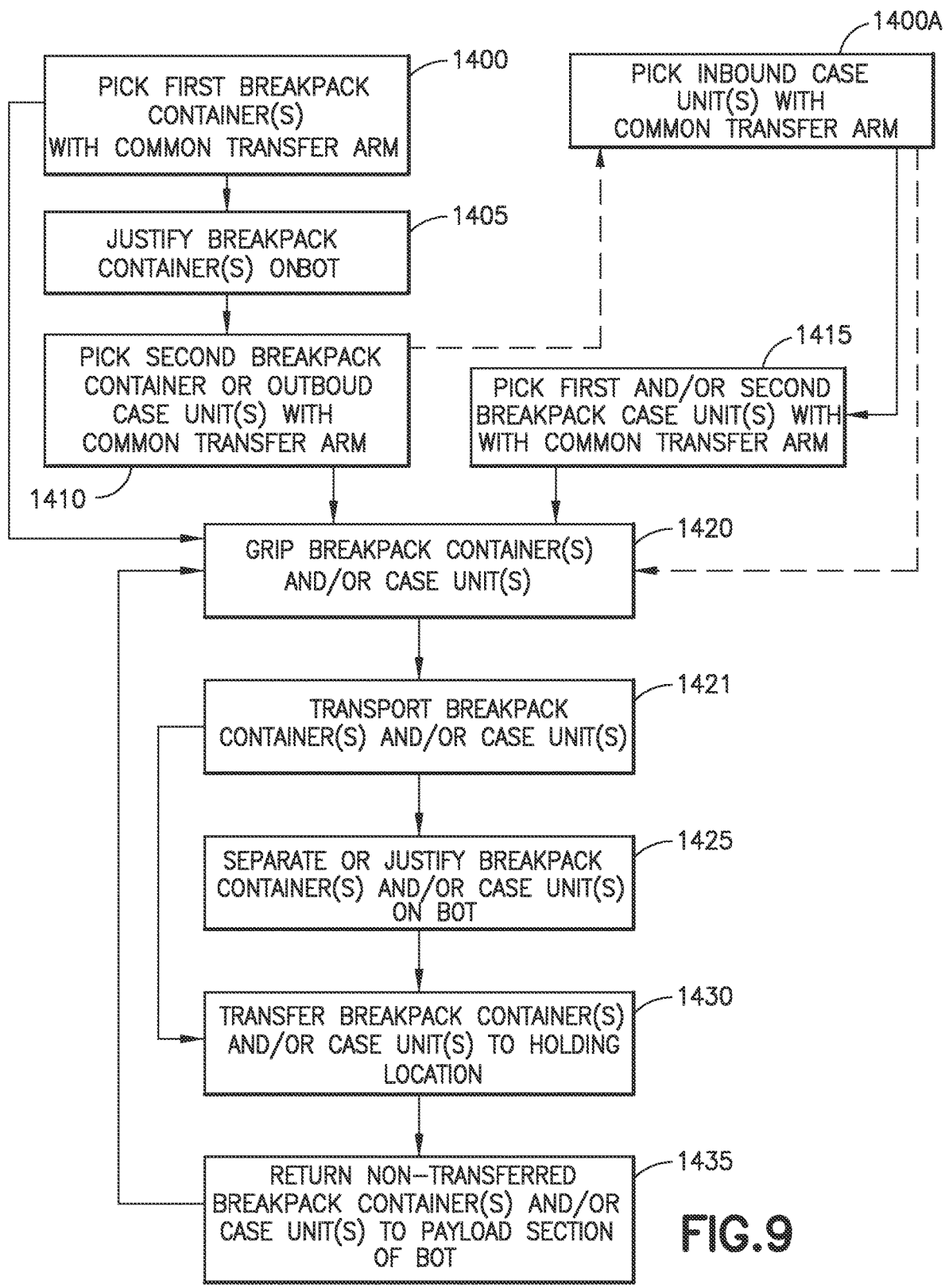
Figure 11:
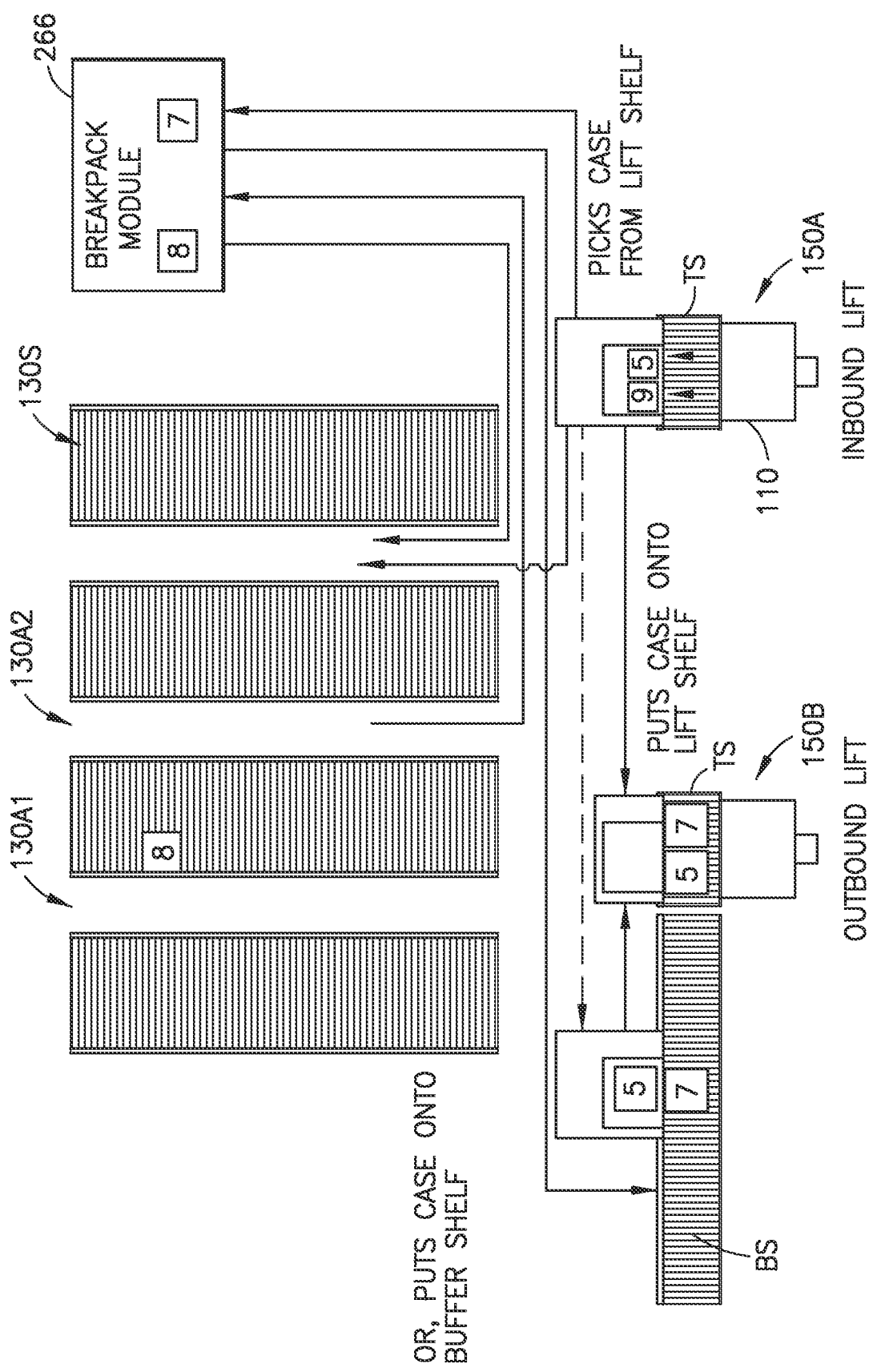
FIG. 11 is a schematic illustration of a portion of the storage and retrieval system in accordance with aspects of the disclosed embodiment.

An example of a container bot 110 case unit(s) transfer transaction including a case unit(s) multi-pick and place operation with on the fly sortation of the case units for creating a mixed pallet load MPL (as shown in FIG. 1E) and/or to fill the predetermined order sequence of picked items in one or more bag(s), tote(s) or other container(s) (e.g., supply containers 265) according to a predetermined order out sequence will be described with respect to FIGS. 9 and 11 in accordance with an aspects of the disclosed embodiment. For example, referring to FIG. 11 a customer order may require case unit(s) 5 to be delivered to from an input lift 150A to an output lift 150B or the breakpack module 266 (e.g., bypassing storage), and require breakpack goods container(s) 7 to be delivered from storage or breakpack module 266 to output lift 150B. In other aspects, it is noted that customer orders may require case units/breakpack goods containers carried by a common container bot 110 to be delivered to any suitable combination of different locations including but not limited to different output lifts 150, to an output lift 150 and a breakpack module 266, to an output lift and a storage location 130S, to a storage location 130S and a breakpack module 266, and between different breakpack modules 266 such that the transfer of the case units carried by the common container bot 110 to different locations occurs in a manner substantially similar to that described herein).

In the aspects of the disclosed embodiment described herein the output lift 150B (e.g. each of the output lifts 150B of the automated storage and retrieval system/order fulfillment system 100) defines a fulfillment course or pathway (also referred to as a stream) of mixed case pickfaces outbound from the storage array to a load fill where the mixed case pickfaces enter and exit the fulfillment course in substantially the same order. As may be realized, while the input and output lifts 150A, 150B are described as vertically reciprocating lifts it should be understood that in other aspects the input and output lifts 150A, 150B are any suitable transport modules for transporting case pickfaces and/or breakpack goods containers to and from the storage structure 130 (e.g. between a respective pickface interface station, such as transfer station TS or buffer station BS, and a respective one of an input station 160IN, e.g. an input cell, and an output station 160UT, 160EC, e.g. a load fill section/cell), and/or between different storage levels 130L. For example, in other aspects the lift modules 150A, 150B are one or more of vertically reciprocating lifts, any suitable automated material handling systems, conveyors, bots, turntables, roller beds, multilevel vertical conveyor (e.g. paternoster conveyor) that operate synchronously or asynchronously.

In one aspect, the container bot(s) 110 is configured to transport the breakpack goods containers 264 from the breakpack goods interface 263 to the container outfeed station TS, for outfeed of the breakpack goods containers 264, and to transport other breakpack goods containers 264 from the breakpack goods interface 263 to the container storage locations 130S that are breakpack goods container storage locations 130SB for storage. In one aspect, the breakpack goods container(s) and the other breakpack goods container(s) are carried simultaneously by the container bot 110; while in other aspects the breakpack goods container(s) and the other container(s) are carried separately by the container bot 110. The container bot 110 is also configured to transport the supply containers 265 between the supply container storage location 130S and the container outfeed station TS. As an example of the above, a container bot 110 picks a first breakpack goods container 7, from a storage space 130S, from breakpack goods interface 263 (See FIG. 2C), or from any suitable holding location with a common transfer arm 110PA of the container bot 110 (FIG. 9, Block 1400). The container bot 110 justifies the first breakpack container 7 on the bot (FIG. 9, Block 1405), in a manner substantially similar to that described herein in preparation for placement of the first breakpack container 7 at a holding location or for picking of a subsequent container with the common transfer arm 110PA. In one aspect, the container bot 110 picks a second breakpack goods container 8 with the common transfer arm 110PA (FIG. 9, Block 1410) from the same location as or a different location from the location from which the first breakpack goods container 7 was picked. Where the second breakpack goods container 8 is picked from a different location the container bot 110 grips the first breakpack goods container 7 and travels to the location of the second breakpack goods container 8, which may be another storage location 130S, another location of the breakpack goods interface 263, or any other suitable location. Here, both the first breakpack goods container 7 and the second breakpack goods container 8 are held on the common transfer arm 110PA.

In another aspect, after picking the first breakpack goods container 7, the container bot 110 picks an outbound case unit(s) 5 with the common transfer arm 110PA (FIG. 9, Block 1410) from the same location as or a different location from the location from which the first breakpack goods container 7 was picked. Where the outbound case unit(s) is picked from a different location the container bot 110 grips the first breakpack goods container 7 and travels to the location of the outbound case unit(s), which may be another storage location 130S, an input lift 150A, or any other suitable location.

In yet another aspect, the first breakpack goods container 7 and/or the second breakpack goods container 8 may be held on the common transfer arm 110PA with an inbound case unit(s) 9. For example, the container bot 110 may pick inbound case unit(s) with the common transfer arm 110PA (FIG. 9, Block 1400A) before the first breakpack goods container 7 and/or second breakpack goods container 8 is/are picked with the common transfer arm 110PA (FIG. 9, Block 1415). In another aspect, the container bot 110 may pick inbound case unit(s) with the common transfer arm 110PA (FIG. 9, Block 1400A) with the first breakpack goods container 7 and/or second breakpack goods container 8 is/are held on the common transfer arm 110PA.

With any suitable combination of breakpack goods containers and/or case units held on the common transfer arm 110PA, the container bot 110 grips the breakpack goods container(s) and/or case unit(s) (FIG. 9, Block 1420) and transports the breakpack goods container(s) and/or case unit(s) (FIG. 9, Block 1421) to a predetermined place/holding location (e.g., such as a buffer station BS, transfer station TS, output lift 150B, breakpack operation station 140, breakpack goods interface 263, etc.). For placement of one or more of the breakpack goods container(s) and/or case unit(s) at the predetermined holding location, the container bot 110 separates or justifies the breakpack goods container(s) and/or case unit(s) (FIG. 9, Block 1425) in the manner described herein so that one or more of the breakpack goods container(s) and/or case unit(s) can be placed at the predetermined holding location with the common transfer arm 110PA free from interference of the breakpack goods container(s) and/or case unit(s) remaining on the common transfer arm 110PA. The container bot 110 extends the common transfer arm 110PA to transfer one or more of the breakpack goods container(s) and/or case unit(s) to the predetermined holding location (FIG. 9, Block 1430). For example, first breakpack goods container 7 and case unit 5 may be held (or otherwise supported by) on the common transfer arm 110PA, where the case unit (supply container) 5 is to be placed at support surface 140S of breakpack operation station 140 at breakpack module 266 (see FIGS. 2C and 11) and the first breakpack goods container 7 is to be placed at a breakpack goods interface location 263L of the breakpack goods interface 263. The container bot 110 travels along the container transfer deck 130DC so as to position itself relative to a holding location of the support surface 140S. The first breakpack goods container 7 and the case unit 5 are justified so that the first breakpack goods container 7 is towards the back side 402 (FIG. 6A) of the container bot 110 payload area and the case unit 5 is positioned adjacent the fence 110PF (FIGS. 4A and 4B). The container bot 110 extends the common transfer arm 110PA to place the case unit 5 on the support surface 140S and, after placement of the case unit 5, retracts the common transfer arm 110PA to return the non-transferred breakpack goods container(s) and/or case unit(s) (in this example, the first breakpack good container 7) to the payload section of the container bot 110 (FIG. 9, Block 1435). The first breakpack good container 7 is gripped (FIG. 9, Block 1420) and transported (FIG. 9, Block 1421) to the predetermined breakpack goods interface location 263L where the first breakpack goods container 7 is transferred to the predetermined breakpack goods interface location 263L (FIG. 9, Block 1430) with the common transfer arm 110PA.

Figure 10:
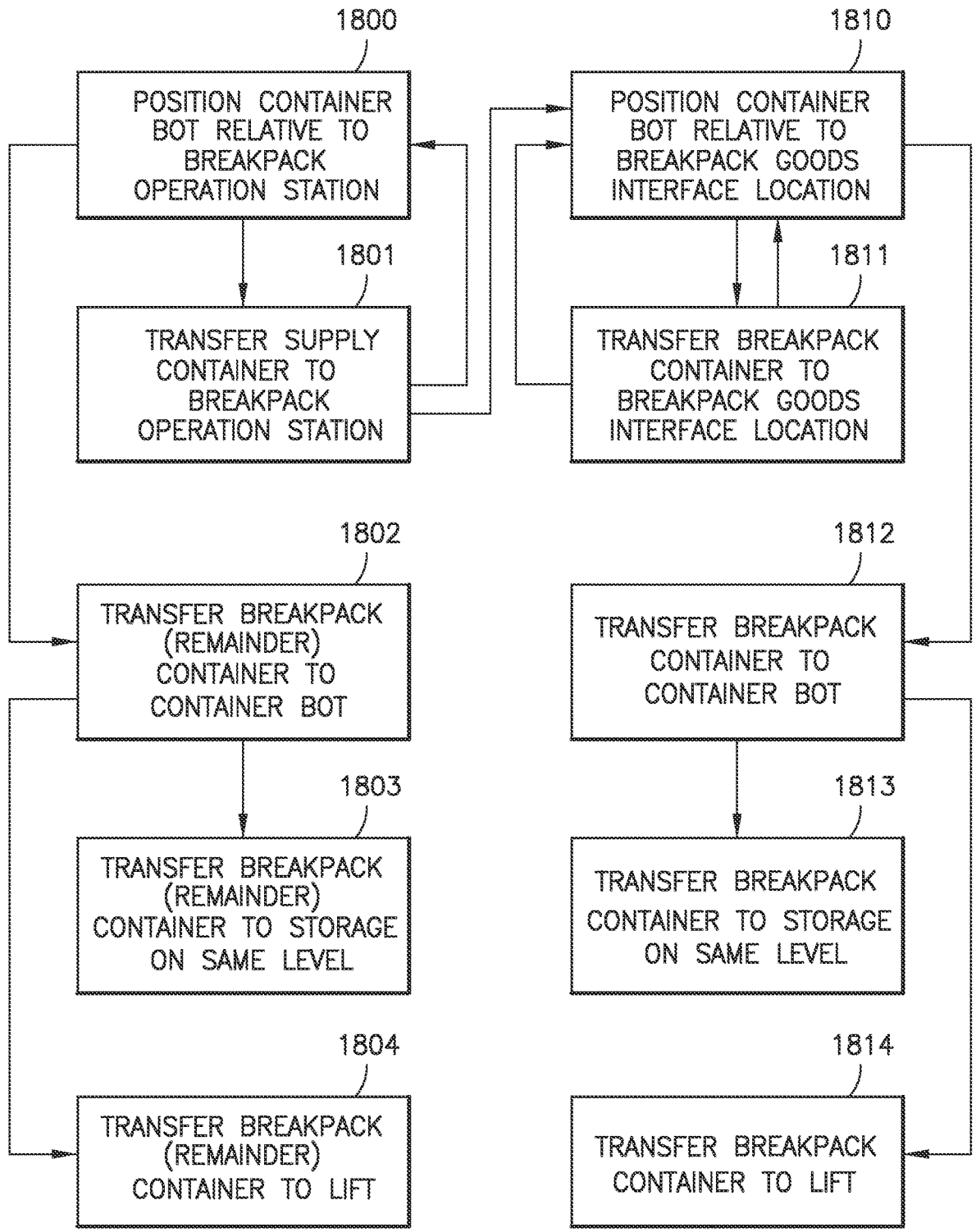

In the examples described herein the transfer of case units between the container bots 110 and the lifts 150 occurs passively through the interface stations TS as described above. Also in the examples described herein, referring to FIGS. 2C, 10, and 13, the transfer of breakpack goods containers 264, supply containers 265, and what may be referred to as breakpack remainder containers 264S to and from the breakpack operation station 140 and to and from the breakpack goods interface 263 occurs passively in a manner similar to that described herein. As an example of the transfers that occur at the breakpack module(s) 266 the container bot 110, carrying supply container(s) 265) is positioned relative to the support surface 140S of the breakpack operation station 140 in a manner similar to that described above with respect to the slats 1210S and/or a locating features 130F (FIG. 10, Block 1800). The transfer arm 110PA (e.g. end effector) of the container bot 110 extends to transfer the supply container(s) 265 to the support surface 140S where the fingers or tines 273A-273E of the transfer arm 110PA interface with, for example, the slats 1210S (or rollers 140RL) of the support surface 140S (FIG. 10, Block 1801) in a manner substantially similar to that described herein.

In another, aspect and as described above, breakpack remainder containers 264S may be generated at the breakpack operation station 140 as breakpack goods BPG are removed from supply containers 265. Where breakpack remainder containers 264S are generated the container bot 110 may position itself relative to the operator staging area 140A of the breakpack operation station (FIG. 10, Block 1800) in a manner similar to that described above (where the operator staging area 140A may include container supports substantially similar to support surface 140S). The transfer arm 110PA (e.g. end effector) of the container bot 110 extends to transfer the breakpack remainder container 264S to the payload area of the container bot 110 where the fingers or tines 273A-273E of the transfer arm 110PA interface with, for example, the slats 1210S (or rollers 140RL) of the operator staging area 140A (FIG. 10, Block 1802) in a manner substantially similar to that described herein. With the breakpack remainder container(s) 264S held by the container bot 110, the container bot 110 may transfer remainder container(s) 264S to storage on same level to which the container bot 110 is confined (FIG. 10, Block 1803). In another aspect, the breakpack remainder container(s) 264S may be transferred, by the container bot 110, to a lift (FIG. 10, Block 1804) for storage on another level 130L of the automated storage and retrieval system 100, or for transfer to an output station 160US (FIG. 1) for order fulfilment.

In another aspect, the container bot 110 may position itself relative to a predetermined one of the breakpack goods interface locations 163L of the breakpack goods interface 263 (FIG. 10, Block 1810) in a manner similar to that described above with respect to the with respect to the slats 1210S and/or a locating features 130F for placing of a breakpack goods container(s) 264 that was retrieved from storage so that additional breakpack goods BPG may be placed into the breakpack goods container 264 by the goods bots 262 for order fulfillment. Here, the breakpack goods container 264 is transferred to a predetermined breakpack goods interface location 263L through extension of the transfer arm 110PA (e.g. end effector) of the container bot 110 to place the breakpack goods container 264 predetermined breakpack goods interface location 263L where the fingers or tines 273A-273E of the transfer arm 110PA interface with, for example, the slats 1210S (or rollers 140RL) of the operator staging area 140A (FIG. 10, Block 1802) in a manner substantially similar to that described herein.

In another aspect, the container bot 110 may position itself relative to a predetermined one of the breakpack goods interface locations 163L of the breakpack goods interface 263 (FIG. 10, Block 1810) in a manner similar to that described above with respect to the with respect to the slats 1210S and/or a locating features 130F for picking of a breakpack goods container(s) 264 that was filled by the goods bots 262 with breakpack goods BPG from the breakpack operation station 140 (i.e., the goods bots 262 retrieve breakpack goods BPG from the breakpack goods operation station 140 and transfer the breakpack goods BPG to one or more predetermined breakpack goods containers 264 at the breakpack goods interface 263 according to a predetermined order fill instructions). The transfer arm 110PA (e.g. end effector) of the container bot 110 extends to transfer the breakpack goods container(s) 264 to the payload area of the container bot 110 where the fingers or tines 273A-273E of the transfer arm 110PA interface with, for example, the slats 1210S of the (FIG. 10, Block 1812) in a manner substantially similar to that described herein. With the breakpack goods container(s) 264 held by the container bot 110, the container bot 110 may transfer container(s) 264 to storage on same level to which the container bot 110 is confined (FIG. 10, Block 1813). In another aspect, the breakpack goods container(s) 264 may be transferred, by the container bot 110, to a lift (FIG. 10, Block 1814) for storage on another level 130L of the automated storage and retrieval system 100, or for transfer to an output station 160US (FIG. 1) for order fulfilment.

As may be realized, one or more of the pick/place transfers described above with respect to FIG. 10 may be opportunistic in the sense that the container bot 110 traverses to the breakpack module 266 for one transfer operation and an opportunity arises for the same container bot 110 to pick a breakpack goods container (inclusive of breakpack remainder containers) for which the container bot 110 was not scheduled to pick (e.g., a desire to pick the breakpack goods container arose after place commands were issued to the container bot, where the pick commands are then issued to, for example, the nearest container bot with a capacity to pick the breakpack goods container). For example, after transferring the supply container 265 to the breakpack operation station 140, the container bot 110 may opportunistically pick one or more of the breakpack remainder container 264S and the breakpack goods container 264 for transfer to storage on the same level or to a lift as described above.

To passively transfer the breakpack goods containers 264 and the breakpack remainder containers 264S to the lift(s) 150, the lift 150 is moved to position the load handling device LHD adjacent the interface station TS to which the breakpack goods containers 264 and/or the breakpack remainder containers 264S were transferred by the container bot 110. The load handling device LHD is extended to lift the breakpack goods containers 264 and/or the breakpack remainder containers 264S from the interface station TS and transfer the breakpack goods containers 264 and/or the breakpack remainder containers 264S to the lift 150 where the fingers 4273 of the load handling device LHD, interface with the slats 1210S of the interface station TS in the manner described above. As may be realized, the interface station TS has no moving parts and the transfer of the breakpack goods containers 264 and/or the breakpack remainder containers 264S between the container bots 110 and the lifts 150 through the interface station TS is a passive transfer. As may also be realized, transfer of pickfaces from the lifts 150 to the container bots 110 may occur in a manner substantially opposite that described above with respect to FIG. 10.

Figure 12:
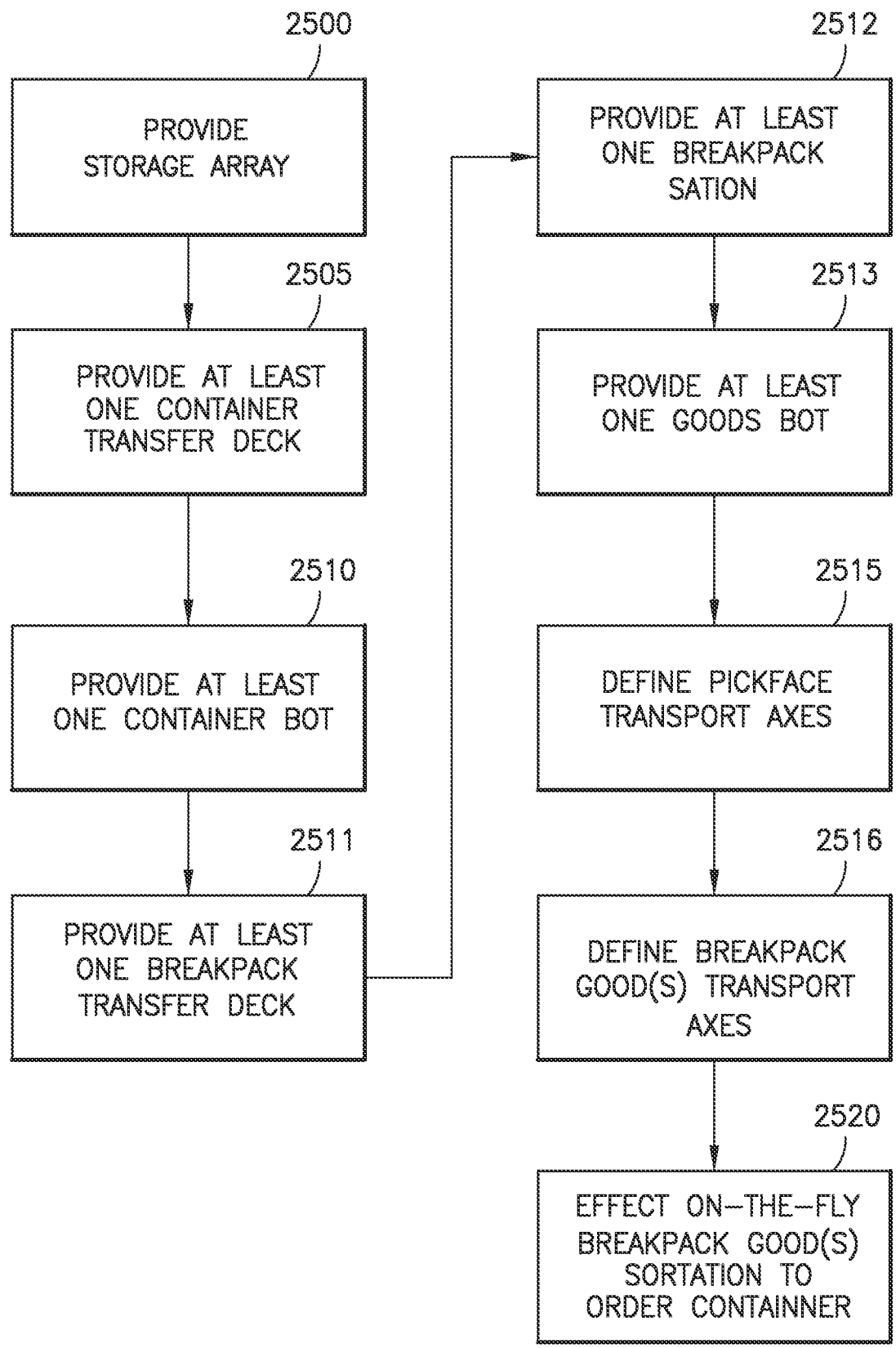
FIG. 12 exemplary flow diagram in accordance with aspects of the disclosed embodiment.

In one aspect, the automated storage and retrieval system 100 described herein is effected by providing a storage array RMA with rack storage spaces 130S arrayed on racks along aisles 130A (FIG. 12, Block 2500). At least one container transfer deck 130DC communicably connected with each of the aisles 130A is also provided (FIG. 12, Block 2505). At least one autonomous transport vehicle or container bot 110 is provided and is configured for holding at least one pickface and traversing the at least one container transfer deck 130DC and aisles 130A, and having an extendable effector or transfer arm 110PA for picking and placing the at least one pickface to and from one of the rack storage spaces 130S (FIG. 12, Block 2510). At least one goods transfer deck 130DG is also provided (FIG. 12, Block 2511). At least one breakpack operation station 140 is provided (FIG. 12, Block 2512) so as to communicably couple the at least one goods transfer deck 130DG to the container transfer deck 130DC. At least one goods bot 262 is provided (FIG. 12, Block 2513) and is configured for holding at least one breakpack goods BPG and traversing the at least one goods transfer deck 130DG. Pickface transport axes X, Y of the storage array are defined (FIG. 25, Block 2515) with the aisles 130A, the at least one container transfer deck 130DC, the at least one autonomous transport vehicle 110, traversing thereon, and the extendable effector 110PA, such that pickfaces are transported along the pickface transport axes X, Y between an inbound section of the automated storage and retrieval system 1601N, where pickfaces inbound to the storage array are generated, and a load fill section of the automated storage and retrieval system 160UT, 160EC, where outbound pickfaces from the storage array are arranged to fill a load in accordance with a predetermined load fill order sequence or to fill an individual fulfillment order in accordance with an individual fulfillment order sequence. Pickface transport axes X, Y of the breakpack goods transport axes are also defined (FIG. 12, Block 2516) by the at least one goods transfer deck 130DG and the at least one goods bot 262 traversal on the goods transfer deck 130DG. On the fly sortation of mixed case pickfaces is effected (FIG. 12, Block 2520) coincident with transport on at least one of the pickface transport axes X, Y with the storage racks and the autonomous transport vehicle 110 in combination, so that two or more of the at least one pickface are picked from one or more of the rack storage spaces 130S and placed at one or more pickface holding locations (such as, for example, transfer or buffer stations TS, BS), different than the one or more of the rack storage spaces 130S, according to the predetermined load fill order sequence.

In one aspect the controller 120 (which is operably connected to the at least one autonomous transport vehicle as described above) manages the pickface transport axes X, Y, Z wherein the pickface transport axes includes a plurality of transport axes. As described above, the plurality of pickface transport axes X, Y, Z are oriented in at least two directions angled relative to each other. As also described above, one of the plurality of pickface transport axes Y is defined by extension of the extendable effector 110PA and is in a different direction angled relative to another of the plurality of pickface transport axes X defined by the autonomous transport vehicle 110 traverse along the picking aisle 130A. In one aspect, as described above, on the fly sortation is effected, with the racks and the at least one autonomous transport vehicle in combination, coincident with transport on at least one of each of the plurality of pickface transport axes. In one aspect the lifts 150 define another pickface transport axis Z of the storage array. As described herein on the fly sortation of mixed case pickfaces is effected by the lifts 150 coincident with transport on the other pickface transport axis so that two or more of the pickfaces are picked from one or more deck levels and transported to the load fill section according to the predetermined load fill order sequence. The controller 120 (which may be operably connected to the at least one goods transport vehicle 262), or any other suitable controller in communication with the controller 120 manages the breakpack goods transport axes X, Y wherein the pickface transport axes includes a plurality of transport axes. The X, Y breakpack goods transport axes may be defined by a reference frame of a respective goods bot 262 and/or a reference frame of the goods transfer deck 130DG, such as where the X and Y axes define directions of travel along the goods transfer deck 130DG (see FIG. 2C).

As described herein, referring to FIGS. 15 and 17A, the automated storage and retrieval system 100 comprises multiple sortation (or transport) echelons 15000, 15100, 15200 that are formed by the asynchronous transport system and at least one lift 150B. Each sortation echelon 15000, 15100, 15200 is communicably connected with the common part of the storage array (e.g., the storage spaces 130S of a respective storage level 130L) and the output (e.g., output station 160UT). As described herein, each of the sortation echelons 15000, 15100, 15200 effects orthogonal sortation, corresponding to the sortation echelon 15000, 15100, 15200, of the product units distributed in the common part, so that sorted mixed output product units of the corresponding sortation echelon 15000, 15100, 15200 are in predetermined sequence. The orthogonal sortation of product units by each sortation echelon 15000, 15100, 15200 is orthogonal to the orthogonal sortation of each other of the more than one sortation echelon 15000, 15100, 15200 so that each sortation echelon 15000, 15100, 15200 is an orthogonal sortation echelon to each other sortation echelon 15000, 15100, 15200, of the more than one sortation echelon 1500, 15100, 15200, combined in output of the output product units of one or more of the mixed singulated product units (e.g., singulated packs PCK), the mixed packed groups (e.g., packs PCK and/or units UNT placed in a common container), and the mixed cases each sorted in predetermined sequence. As described herein, the orthogonal sortation of each sortation echelon 15000, 15100, 15200, effecting output of product units in predetermined sequence is independent of one or more of order sequence and order time.

Figure 16A:
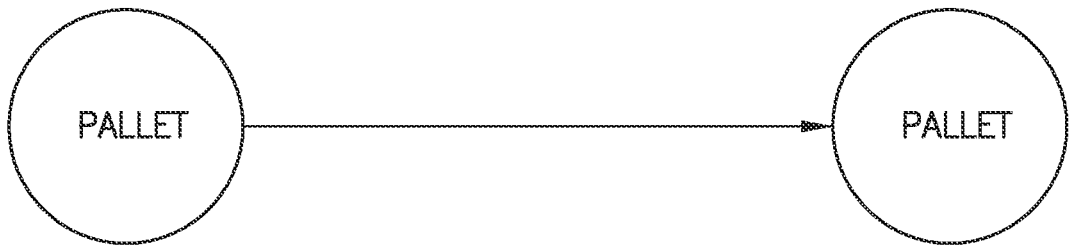
FIGS. 16A-16E are exemplary diagrams illustrating exemplary sortations effected with the orthogonal sortation echelons of FIG. 15.
Figure 16B:
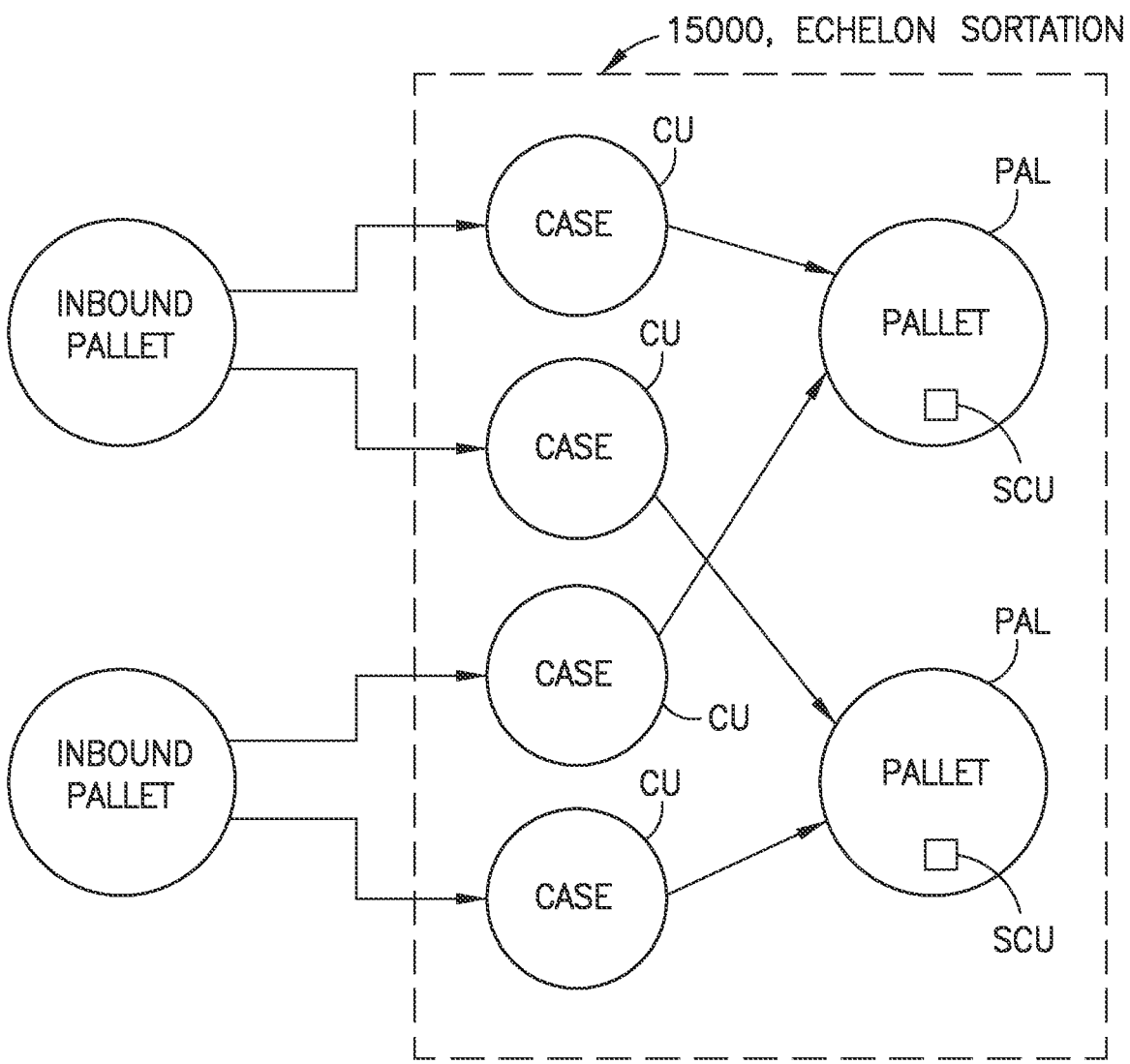

Referring to FIGS. 15 and 16B-16E, the case level sortation echelon 15000 includes at least the transfer decks 130BC, 130DC, container bots 110, picking aisles 130A, storage locations 130A, and output lifts 150B. In some aspects, the case level sortation echelon 15000 also includes the input lifts 150A. As described herein, at least a portion 15010 of the case level sortation echelon 15000 forms a vertical sequencer that arranges the sorted cases/container SCU in a predetermined sequence to effect the building of the sorted pallet PAL in a manner substantially similar to that described in U.S. Pat. No. 10,947,060, previously incorporated herein by reference in its entirety. As illustrated in FIG. 16B the case level sortation echelon 15000 receives cases CU from the storage array formed at least in part by the storage spaces 130S on the respective storage structure level 130L and sorts the cases to a predetermined pallet PAL.

Figure 16C:
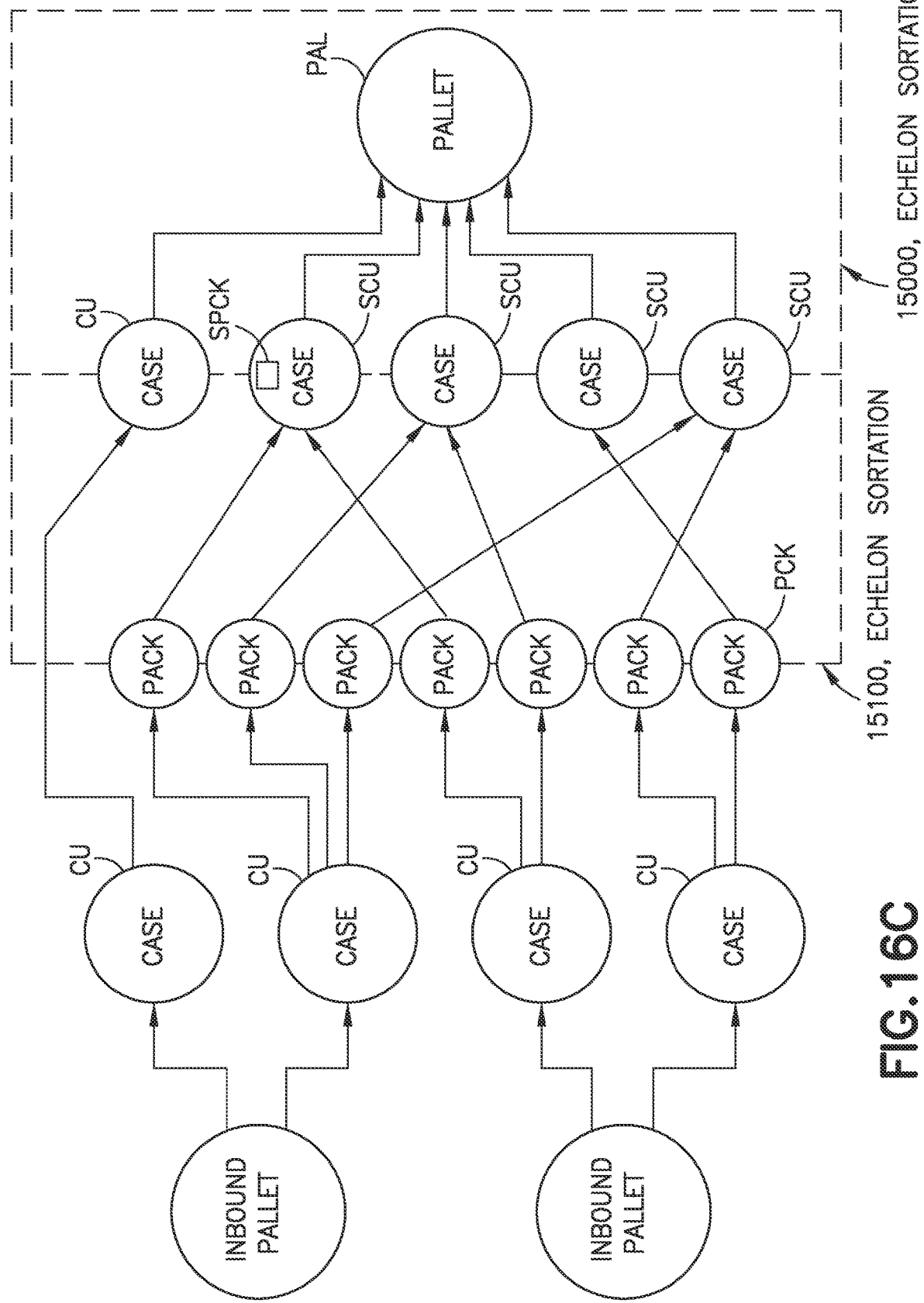
Figure 16D:
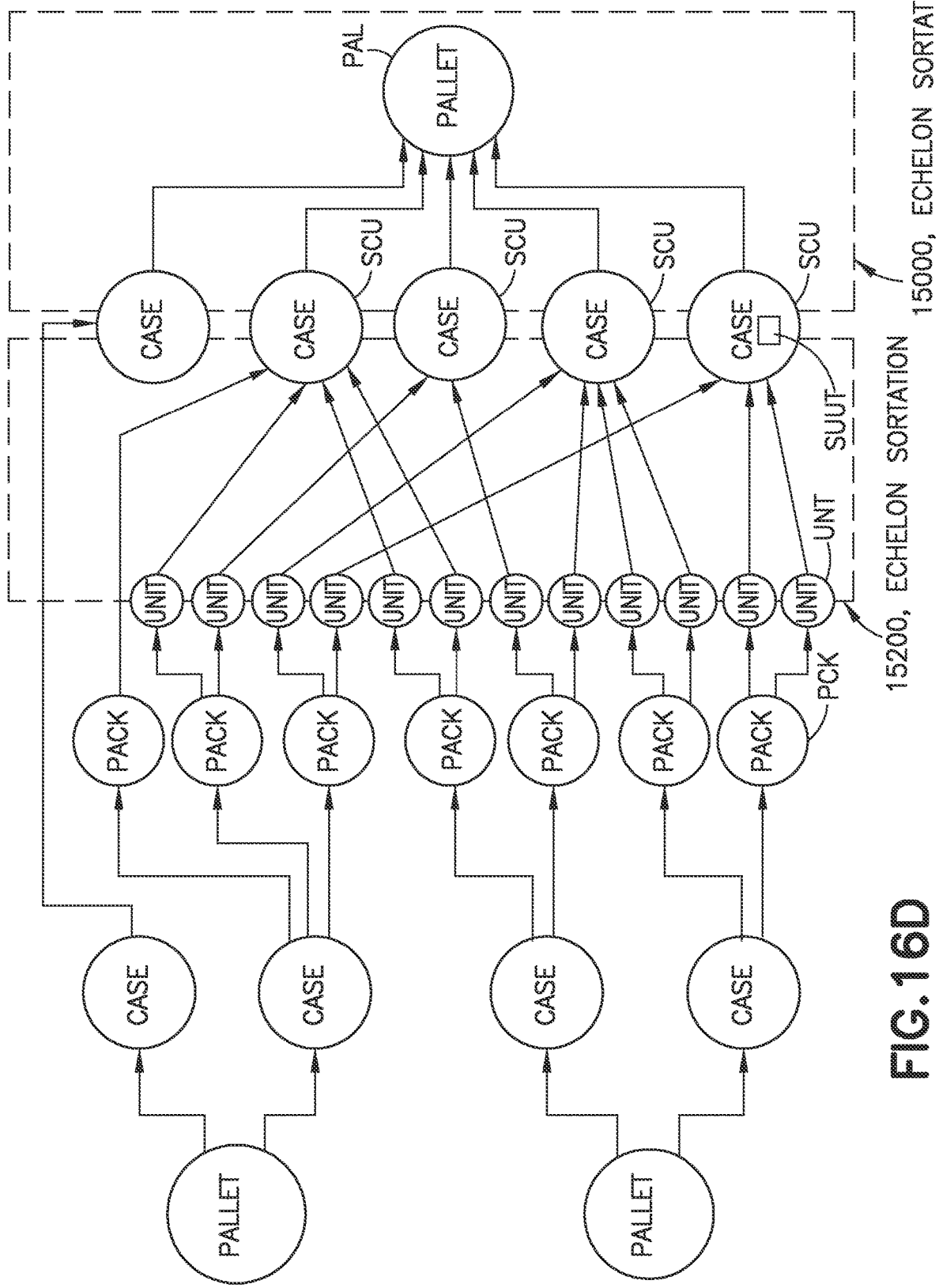
Figure 16E:
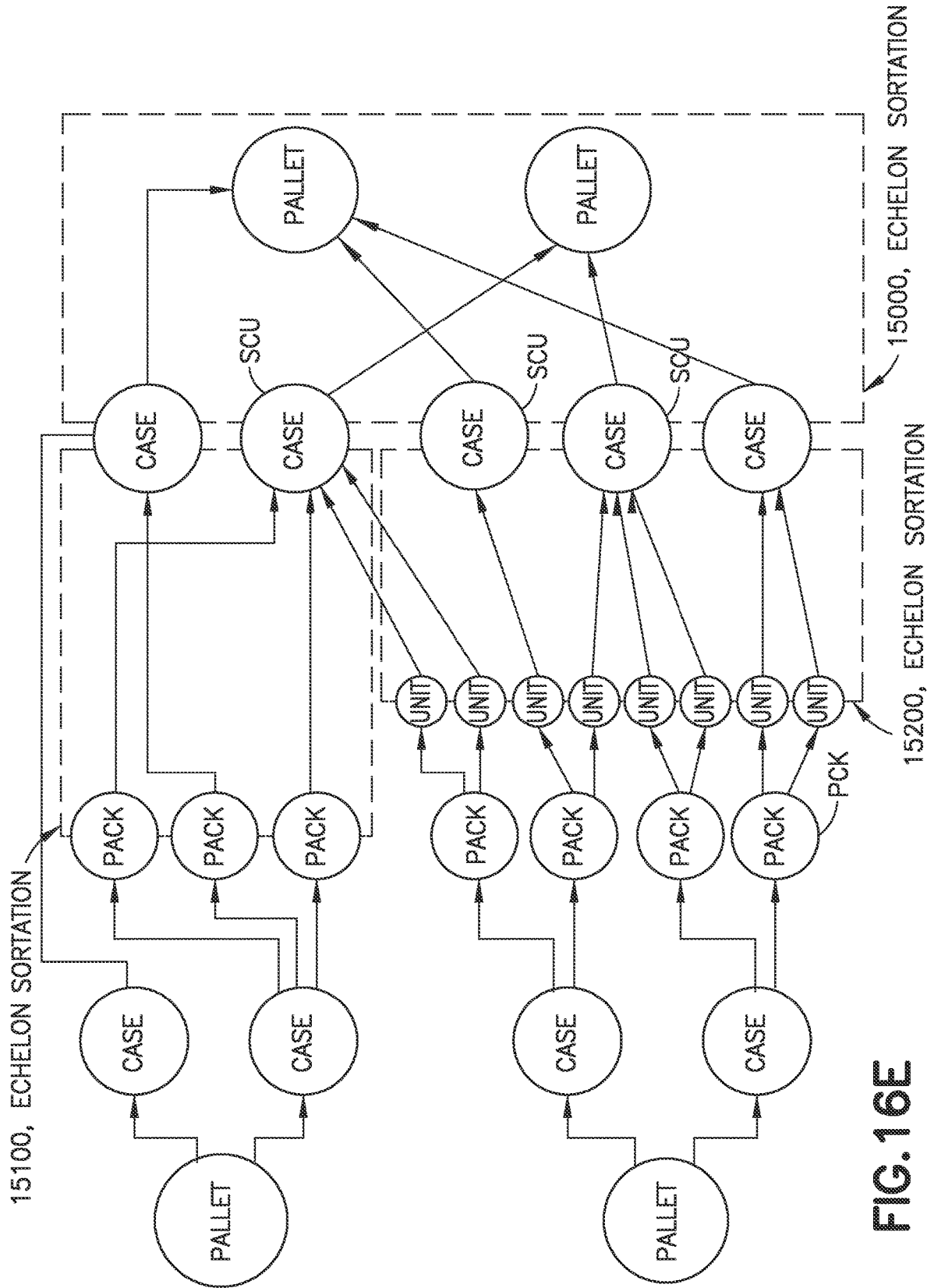

The pack level sortation echelon 15100 includes at least container bots 110, the portion 130DCP of the container transfer deck 130DC, and breakpack operation station 140. Here, as can be seen in FIGS. 16C and 16E, cases CU are transferred from the storage spaces 130S to the pick level sortation echelon 15100, broken up to the pack level and sorted at the pack level. The sorted packs SPCK are one or more of transferred by the container bots 110 to the portion 15010 of the case level sortation echelon 15000 for recursive sortation to the pallet PAL and placed in a breakpack goods container 264 (which breakpack goods containers are generally represented as "cases" in FIGS. 16C and 16E) to form a sorted mixed pack group with other sorted packs SPCK or sorted units SUNT. The breakpack goods containers 264 are transferred by the container bots 110 to the portion 15010 of the case level sortation echelon 15000 for recursive sortation to the pallet PAL. Placement of the packs PCK into the breakpack goods container 264 or placement of packs PCK on, for example, the support surface 140S of the staging area 140 (e.g., for picking by a container bot 110) is performed in any suitable manner, such as by an operator 141 at the breakpack operation station. Placement of the packs PCK into the breakpack goods containers 264 (such as the interface locations 263L for grouping with other packs PCK or units UNT) may also be performed by the goods bots 262, which may form a portion of the pack level sortation echelon 15100.

The unit/each level sortation echelon 15200 includes at least the goods deck 130DG, goods bots 262, interface locations 263L. Here, as illustrated in FIGS. 16D and 16E, cases CU are transferred from the storage spaces 130S to the unit/each level sortation echelon 15200, broken up to the unit level and sorted by the goods bots 262 at the unit level. The goods bots 262 place the sorted units SUNT in the breakpack goods containers 264 (again generally represented as "cases" in FIGS. 16D and 16E) with other sorted units SUNT to form mixed singulated product units (in the manner described herein) that are transferred in the breakpack goods container 264 by the container bots 110 to the portion 15010 of the case level sortation echelon 15000 for recursive sortation (see FIG. 17A) to the pallet PAL.

Referring to FIG. 15, the multiple sortation echelons 15000, 15100, 15200 are dynamic such that transient assets of one sortation echelon may transition to form a transient asset of another sortation echelon. For example, the container bots 110 carrying/transporting cases/containers between echelons may transition from being an asset of the case level sortation echelon 15000 to an asset of the pack level sortation echelon and vice versa. The goods bots 262 are configured to carry/transport both packs and units such that any given goods bot 262 may transition from being an asset of the pack level sortation echelon 15100 to an asset of the unit level sortation echelon 15200 and vice versa depending on the transport task assigned to the given goods bot 262.

Still referring to FIGS. 15 and 17 and also to FIGS. 16A-16E, the automated storage and retrieval system 100 provides sortation of pallets PAL (such as for placement in a shipping vehicle) (FIG. 16A), sortation of cases CU for placement on sorted pallets PAL (FIG. 16B), sortation of packs PCK (e.g., removed from cases CU) for placement in sorted containers SCU (FIGS. 16C and 16E), and sorted units/eaches UNT (e.g., removed from packs) for placement in sorted containers SCU (FIGS. 16D and 16E). Here, each of the sortation echelons 15000, 15100, 15200 provide for orthogonal sortation that is informed by recursive sortation determination. For example, as illustrated in FIGS. 16B-16E sortation of products by the case level sortation echelon is informed by sortation performed by one or more of the pack level sortation echelon 15100 and the unit/each level sortation echelon 15200 such that sortation is effected by breaking down goods components (e.g., pallets, cases, packs, units) to the smallest necessary goods component, individually sorting the smallest necessary goods component, and then reassemble the smallest necessary goods component(s) into larger groups (e.g., reassemble into one or more of pallets, cases, packs). Each of these reassembled larger groups each sorted at each and every iteration of reassembly.

As described herein, the controller 120 is configured so as to determine the recursive sortation informing the orthogonal sortation of each sortation echelon 15000, 15100, 15200.

Again, the controller 120 includes the case level sortation echelon control module 120M1, the pack level sortation echelon control module 120M2, and the unit/each level sortation echelon control module 120M3 that alone or in combination (e.g., depending on a level of sortation needed to effect order fulfillment) effect a break down of larger goods unit(s) into smaller goods units and a subsequent recursively sorted assembly of the sorted smaller goods units into sorted larger goods units as described herein. As an example, each sortation echelon 15000, 15100, 15200 configured to sort ordered goods at a respective level of sortation (e.g., case level, pack level, unit/each level) necessary to effect order fulfillment. The multiple sortation echelons 15000, 15100, 15200 are configured to output, from the automated storage and retrieval system at least one of sorted goods units/eaches, one or more sorted goods packs, one or more sorted cases, and one or more sorted pallets. Each of the sortation echelons 15000, 15100, 15200 operates under control of controller 120 independently of (i.e., decoupled from) of each other sortation echelon 15000, 15100, 15200. Here the controller 120 is configured to separate the throughput of cases CU through the automated storage and retrieval system 100 from the sortation of the goods (e.g., pallets, cases, packs, units/eaches). The controller 120 is configured to receive one or more product fulfillment orders and determine a demand for cases commanded by the product fulfilment order(s). The controller 120, through employment of one or more of the case level sortation echelon control module 120M1, the pack level sortation echelon control module 120M2, and the unit/each level sortation echelon control module 120M3 determines/resolves the sortation of the goods and the level of sortation required to fulfill the product fulfillment order(s). Resolving the levels of sortation and the sortation of the goods for one or more fulfillment orders provides for batching efficiency and minimizes work (substantially eliminates extra movements) performed by the automated storage and retrieval system 100 by batching/grouping transfers of goods common to more than one fulfillment order.

The controller 120, as described herein, is communicably coupled to the asynchronous transport system and is configured to generate with the sortation echelons 15000, 15100, 15200 the orthogonal sortation of each sortation echelon 15000, 15100, 15200. Here, the controller 120 is configured to resolve the movement of goods, bots, lifts, etc. (collectively referred to as objects) within the automated storage and retrieval system 100 given existing/available physical pathways through the automated storage and retrieval system 100 along which physical pathways the goods may travel. The resolution of the movement of the objects is performed by the controller 120 as a function of time relative to a predetermined time the order is to be fulfilled. Here, the controller 120 (e.g., provided with the physical pathways, the required goods sortation level(s), and sorted goods that are to be combined from a prior sorting) is configured to optimize a release of goods (e.g., from the common storage array formed by the storage spaces 130) through the storage and retrieval system 100 (e.g., between and within sortation echelons 15000, 15100, 15200) so that goods (e.g., pallets, cases, packs, unit/eaches) that are to be sorted through the sortation echelons 15000, 15100, 15200 are transported through the storage and retrieval system 100 close to one another in time and space.

The controller 120 is also configured to manage transport of the goods along the physical pathways so that no single node (e.g., lifts, breakpack station, bots, etc.) of the autonomous storage and retrieval system transport is overloaded. Here, the passage of goods through the automated storage and retrieval system 100 is balanced along the available physical pathways to minimize cost by controlling over and under production (e.g., transfer of goods through the storage and retrieval system 100) and sending goods along lower cost pathways.

The sortation echelons 15000, 15100, 15200 described herein are modular, where the modularity of the sortation echelons 15000, 15100, 15200 effects the addition of storage and retrieval system assets (e.g., transfer decks, bots, bot interface stations on the decks such as at the breakpack modules 266 or other suitable locations of a given storage level 130L). As an example, referring also to FIGS. 2A, 2C, and 2D, the breakpack modules 266 are configured and communicably coupled to the transfer decks 130B or picking aisles 130A so that additional goods transfer decks 130DGE1-130DGE3 may be stacked above the goods transfer decks 130DG1-130DG3, where each of the goods transfer decks goods transfer decks 130DG1-130DG3, 130DGE1-130DGE3 is accessible by the breakpack operation station 140. The addition of the goods transfer decks 130DGE1-130DGE3 expands the capacity of the goods transfer deck 130DG by providing an increased number of breakpack goods interface location 263L (e.g., at the respective elevated levels 130DGL1-130DGL3, 130DGLE1-130DGLE3) and goods bots 262. In a similar manner, additional container transfer decks 130DCE may be stacked above (or below) container transfer deck 130DC to provide container bot 110 access to the additional goods transfer decks 130DGE1-130DGE3. Ramps, similar to ramps 222, 222C, 222R, are provided to effect transition of the container bots 110 between the stacked goods transfer decks 130DG, 130DGE, while in other aspects the additional goods transfer decks 130DGE may be communicably coupled to a deck of different (stacked) storage level 130L so that the additional goods transfer decks 130DGE are accessible by container bots 110 of a respective different storage level 130L. The additional assets provided by the modularity of the sortation echelons effects a scalable increases in throughput by providing an increased number of physical pathways through the storage and retrieval system 100 so as to minimize cost of movement of the products through the storage and retrieval system 100 for any given fulfillment order.

Figure 17B:
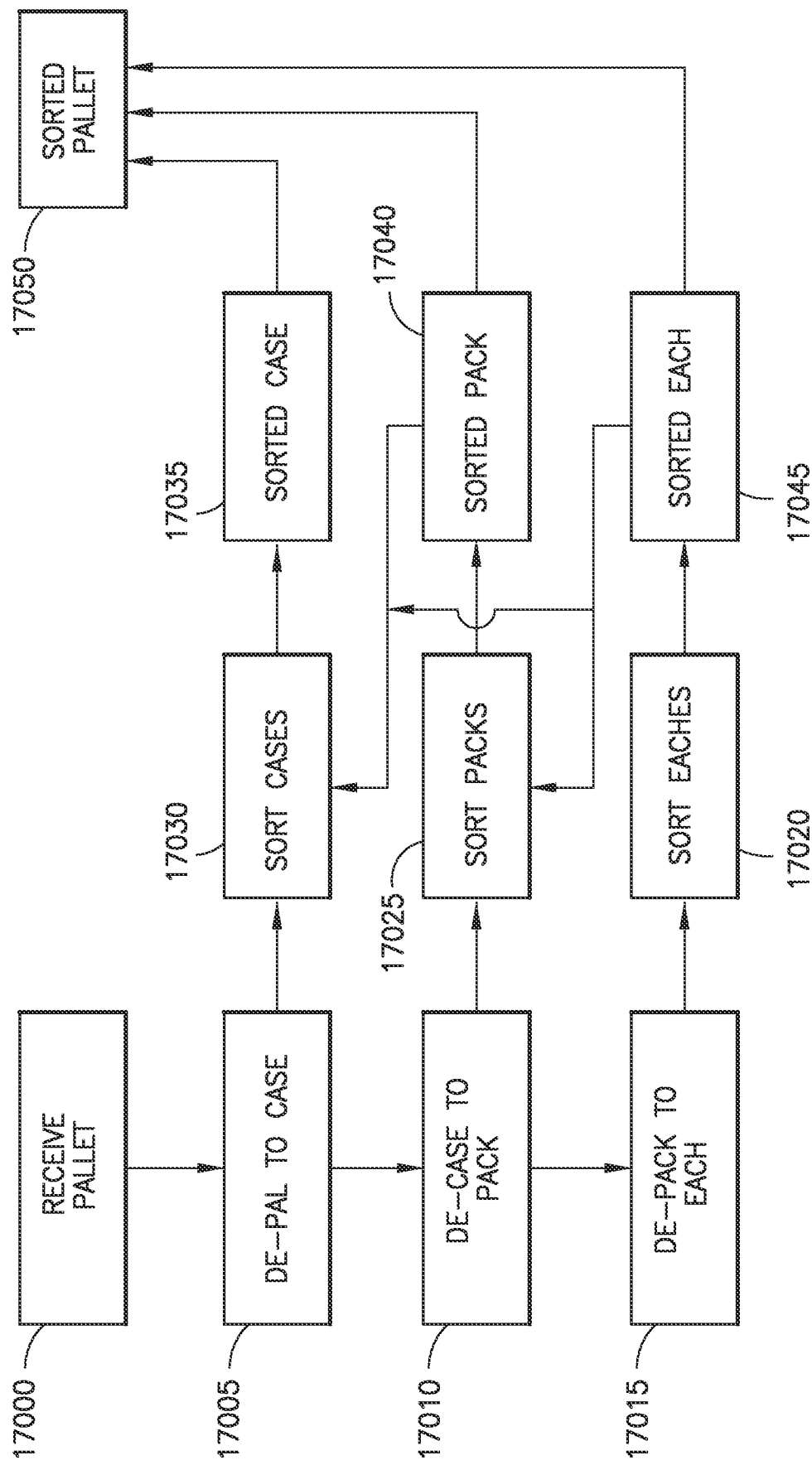
FIG. 17B is an exemplary flow diagram in accordance with aspects of the disclosed embodiment.

Referring to FIGS. 1, 2A-2E, 15, 16A-16E, 17A, and 17B an exemplary operation of the orthogonal sortation echelons 15000, 15100, 15200 will be described. In operation pallets are received into the automated storage and retrieval system 100 at the input station 1601N (FIG. 17B, Block 17000). The cases CU of the pallets are depalletized (FIG. 17B, Block 17005) by the depalletizers 160PA and are transferred to the common storage array by the input lift modules 150A and the container bots 110. The controller 120 is configured to command the assets of the automated storage and retrieval system 100 to fulfill orders where, for example, the order may include one or more of cases CU, packs PCK, and units/eaches UNT (collectively referred to as products). The products are released from the common storage array by the controller 120 relative to each other close in time and space such that the products travel along one or more physical pathways through the automated storage and retrieval system 100 storage structure 130. Here, the orthogonal sortation echelons 15000, 15100, 15200 are employed in parallel to sort the ordered products where the sortation is discriminated from the transport of the products through the storage and retrieval system 100. As described herein, the controller 120 resolves the sortation of the ordered products so as to batch product release from the common storage and effect batch sortation through the orthogonal sortation echelons 15000, 15100, 15200. With the product sortation resolved the controller resolves movement of the products along the different physical pathways of the automated storage and retrieval system. Here, ordered cases, packs, and units for any given order are released close in time and space to each other.

Ordered cases are transported by the container bots 110 to the case level sortation echelon 15000 and are sorted (FIG. 17B, Block 17030) in a predetermined sequence in any suitable manner, such as ordered placement at buffer stations BS or transfer stations TS and/or vertically sequenced by the lifts 150B. The sorted cases SCU are output by the case level sortation echelon 15000 (FIG. 17B, Block 17035) and transported (as described herein) for placement on pallet 17050 (FIG. 17B, Block 17050).

Where packs PCK are ordered, cases CU containing the packs PCK are transported by container bots 110 to, for example, the breakpack goods module 266 (which forms at least part of the pack level sortation echelon 15100) where the packs PCK are removed from the case CU (e.g., decased) (FIG. 17B, Block 17010) and sorted (FIG. 17B, Block 17025) in the manner described herein. The sorted packs SPCK are output (FIG. 17B, Block 17040) in breakpack goods containers 264, or in some aspects uncontained, which are transported to the pallet PAL or to the case level sortation echelon 15000 to be sequenced with the ordered cases CU for placement on the pallet PAL as described above.

Where units UNT are ordered, cases CU containing the units UNT are transported by container bots 110 to, for example, the breakpack goods module 266 (which forms at least part of the unit level sortation echelon 15200) where the units UNT are removed from the case CU and any pack PCK, where the units are arranged in packs, (e.g., de-cased and/or de-packed) (FIG. 17B, Block 17015) and sorted (FIG. 17B, Block 17020) in the manner described herein. The sorted units SUNT are output (FIG. 17B, Block 17045) in breakpack goods containers 264 which are one or more of transported to the pallet PAL, included with other units into a pack PCK for sortation by the pack level sortation echelon 15100 as described above, and transported to the case level sortation echelon 15000 to be sequenced with the ordered cases CU for placement on the pallet PAL as described above.

The output of the multiple sortation echelons 15000, 15100, 15200 is a pallet PAL that includes one or more of the mixed singulated product units, the mixed packed groups, and the mixed cases each sorted in predetermined sequence.

It is noted that while the recursive sortation of the sortation echelons 15000, 15100, 15200 is described with respect to transfer of product from the storage and retrieval system 100; in other aspects the recursive sortation may be performed for products being input to the storage and retrieval system 100. For example, fulfillment orders may be known the controller 120 at any given time; however, any given one of the fulfillment orders may not be scheduled to be fulfilled until a predetermined time period. Where products for the given fulfillment order are input to storage and retrieval system 100, the controller 120 may opportunistically sort the products with the sortation echelons 15000, 15100, 15200 in a manner substantially similar to that described herein; however the sorted packs, the sorted units, and/or the sorted cases may be placed into the storage array (rather than output from the system) until such time the sorted products are requested to fulfill the given fulfillment order.

In accordance with one or more aspects of the disclosed embodiment a warehousing system for storing and retrieving goods in containers is provided. The warehousing system comprises:

at least one storage level having a container autonomous transport travel loop, disposed at the at least one storage level, and container storage locations arrayed peripherally along the container autonomous transport travel loop, at least one of the container storage locations being a supply container storage location, and another of the container storage locations being a breakpack goods container storage location, wherein the at least one storage level has a breakpack goods autonomous transport travel loop disposed at the at least one storage level, separate and distinct from the container autonomous transport travel loop, and has a breakpack goods interface coupling respective edges of the container autonomous transport travel loop and the breakpack goods autonomous transport travel loop;

at least one autonomous container transport vehicle confined to the at least one storage level, the at least one autonomous container transport vehicle being configured to respectively transport along the container autonomous transport travel loop, a supply container between the supply container storage location and a breakpack operation station, and a breakpack goods container between the breakpack goods interface and the breakpack goods container storage location, wherein the breakpack goods autonomous transport travel loop is disposed to confine at least one autonomous breakpack goods transport vehicle to the at least one storage level, the at least one autonomous breakpack goods transport vehicle being arranged for transporting, along the breakpack goods autonomous transport travel loop, one or more breakpack goods between the breakpack operation station and the breakpack goods interface; and a controller configured to effect operation of the at least one autonomous container transport vehicle and the at least one autonomous breakpack goods transport vehicle for assembling orders of breakpack goods from supply containers into breakpack goods containers.

In accordance with one or more aspects of the disclosed embodiment the at least one autonomous container transport vehicle is configured to autonomously travel unconstrained along and across the container autonomous transport travel loop.

In accordance with one or more aspects of the disclosed embodiment the at least one autonomous breakpack goods transport vehicle is configured to autonomously travel unconstrained along and across the breakpack goods autonomous transport travel loop.

In accordance with one or more aspects of the disclosed embodiment the breakpack goods autonomous transport travel loop has multiple travel lanes for travel of the at least one autonomous breakpack goods transport vehicle along the breakpack goods autonomous transport travel loop, at least one of the multiple travel lanes being a passing lane for the at least one autonomous breakpack goods transport vehicle travel passing an obstruction on another of the multiple travel lanes.

In accordance with one or more aspects of the disclosed embodiment the container autonomous transport travel loop has multiple travel lanes for travel of the at least one autonomous container transport vehicle along the container autonomous transport travel loop, at least one of the multiple travel lanes having a travel sense opposite to another travel lane sense of another of the multiple travel lanes, and the at least one of the multiple travel lanes defining a queue lane for the at least one autonomous container transport vehicle at the breakpack goods interface.

In accordance with one or more aspects of the disclosed embodiment the container autonomous transport travel loop is disposed on a deck surface of a deck at the at least one elevated storage level, and the breakpack goods autonomous transport travel loop is disposed on a different deck surface of the deck, separate and distinct from the deck surface where the container autonomous transport travel loop is disposed.

In accordance with one or more aspects of the disclosed embodiment the at least one autonomous breakpack goods transport vehicle has a payload hold configured dissimilar from the at least one autonomous container transport vehicle.

In accordance with one or more aspects of the disclosed embodiment the one or more breakpack goods are unpacked from the supply container at the breakpack operation station, and the at least one autonomous breakpack goods transport vehicle is configured so as to be loaded with the one or more breakpack goods at the breakpack operation station.

In accordance with one or more aspects of the disclosed embodiment the at least one autonomous breakpack goods transport vehicle is configured so as to automatically unload the one or more breakpack goods from the at least one autonomous breakpack goods transport vehicle to the breakpack goods containers at the breakpack goods interface.

In accordance with one or more aspects of the disclosed embodiment the at least one autonomous container transport vehicle is configured to autonomously transfer the supply containers from the at least one autonomous container transport vehicle to the breakpack operation station.

In accordance with one or more aspects of the disclosed embodiment the at least one autonomous container transport vehicle is configured to autonomously pick and place the breakpack goods containers at the breakpack goods interface.

In accordance with one or more aspects of the disclosed embodiment the breakpack goods interface has more than one breakpack goods interface locations arrayed at least along a substantially whole edge of the breakpack goods autonomous transport travel loop, each breakpack goods interface location being configured to hold a respective breakpack goods container.

In accordance with one or more aspects of the disclosed embodiment the container storage locations are arrayed along pick aisles connected by the container autonomous transport travel loop at each level of the at least one elevated storage level, the container autonomous transport travel loop being configured to provide the at least one autonomous container transport vehicle at each level, access to each of the pick aisles.

In accordance with one or more aspects of the disclosed embodiment the warehousing system further comprises lifts connected via transfer stations to the container autonomous transport travel loop, each lift being configured to lift one or both of the supply containers and the breakpack goods containers into and out of the at least one elevated storage level.

In accordance with one or more aspects of the disclosed embodiment the warehousing system further comprises inbound/outbound conveyors, the inbound/outbound conveyors being configured to:

transport inbound supply containers from a depalletizer, to the at least elevated storage level, and transport outbound supply containers and filled breakpack goods containers to a palletizer, to a truck, or a downstream process.

In accordance with one or more aspects of the disclosed embodiment the at least one storage level includes an elevated storage level.

In accordance with one or more aspects of the disclosed embodiment a warehousing system for storing and retrieving goods in containers is provided. The warehousing system comprises:

at least one storage level having a container autonomous transport travel loop, disposed at the at least one storage level, and having container storage locations arrayed peripherally along the container autonomous transport travel loop, at least one of the container storage locations being a supply container storage location, and a container outfeed station disposed along the container autonomous transport travel loop, wherein the at least one storage level has a breakpack goods autonomous transport travel loop disposed at the at least one storage level, separate and distinct from the container autonomous transport travel loop, and has a breakpack goods interface, coupling respective edges of the container autonomous transport travel loop and the breakpack goods autonomous transport travel loop, with a breakpack goods container holding location;

at least one autonomous container transport vehicle confined to the at least one storage level, the at least one autonomous container transport vehicle being configured to respectively transport along the container autonomous transport travel loop, a supply container between the supply container storage location and a breakpack operation station, and a breakpack goods container between the breakpack goods container holding location and the container outfeed station, wherein the breakpack goods autonomous transport travel loop is disposed to confine at least one autonomous breakpack goods transport vehicle to the at least one storage level, the at least one autonomous breakpack goods transport vehicle being arranged for transporting, along the breakpack goods autonomous transport travel loop, one or more breakpack goods between the breakpack operation station and the breakpack goods interface; and a controller configured to effect operation of the at least one autonomous container transport vehicle and the at least one autonomous breakpack goods transport vehicle for assembling orders of breakpack goods from supply containers into breakpack goods containers and outfeed of breakpack goods containers through the container outfeed station.

In accordance with one or more aspects of the disclosed embodiment the at least one autonomous container transport vehicle is configured to transport the breakpack goods containers from the breakpack goods interface to the container outfeed station, for outfeed of the breakpack goods containers, and to transport other breakpack goods containers from the breakpack goods interface to the container storage locations that are breakpack goods container storage locations for storage.

In accordance with one or more aspects of the disclosed embodiment the at least one autonomous container transport vehicle is configured to transport the supply containers between the supply container storage location and the container outfeed station.

In accordance with one or more aspects of the disclosed embodiment the at least one autonomous container transport vehicle is configured to autonomously travel unconstrained along and across the container autonomous transport travel loop.

In accordance with one or more aspects of the disclosed embodiment the at least one autonomous breakpack goods transport vehicle is configured to autonomously travel unconstrained along and across the breakpack goods autonomous transport travel loop.

In accordance with one or more aspects of the disclosed embodiment the breakpack goods autonomous transport travel loop has multiple travel lanes for travel of the at least one autonomous breakpack goods transport vehicle along the breakpack goods autonomous transport travel loop, at least one of the multiple travel lanes being a passing lane for the at least one autonomous breakpack goods transport vehicle travel passing an obstruction on another of the multiple travel lanes.

In accordance with one or more aspects of the disclosed embodiment the container autonomous transport travel loop has multiple travel lanes for travel of the at least one autonomous container transport vehicle along the container autonomous transport travel loop, at least one of the multiple travel lanes having a travel sense opposite to another travel lane sense of another of the multiple travel lanes, and the at least one of the multiple travel lanes defining a queue lane for the at least one autonomous container transport vehicle at the breakpack goods interface.

In accordance with one or more aspects of the disclosed embodiment the container autonomous transport travel loop is disposed on a deck surface of a deck at the at least one storage level, and the breakpack goods autonomous transport travel loop is disposed on a different deck surface of the deck, separate and distinct from the deck surface where the container autonomous transport travel loop is disposed.

In accordance with one or more aspects of the disclosed embodiment the at least one autonomous breakpack goods transport vehicle has a payload hold configured dissimilar from the at least one autonomous container transport vehicle.

In accordance with one or more aspects of the disclosed embodiment one or more breakpack goods are unpacked from the supply container at the breakpack operation station, and the at least one autonomous breakpack goods transport vehicle is configured so as to be loaded with the one or more breakpack goods at the breakpack operation station.

In accordance with one or more aspects of the disclosed embodiment the at least one autonomous breakpack goods transport vehicle is configured so as to automatically unload one or more breakpack goods from the at least one autonomous breakpack goods transport vehicle to the breakpack goods containers at the breakpack goods interface.

In accordance with one or more aspects of the disclosed embodiment the at least one autonomous container transport vehicle is configured to autonomously transfer the supply containers from the at least one autonomous container transport vehicle to the breakpack operation station.

In accordance with one or more aspects of the disclosed embodiment the at least one autonomous container transport vehicle is configured to autonomously pick and place the breakpack goods containers at the breakpack goods interface.

In accordance with one or more aspects of the disclosed embodiment the breakpack goods interface has more than one breakpack goods interface locations arrayed at least along a substantially whole edge of the breakpack goods autonomous transport travel loop, each breakpack goods interface location being configured to hold a respective breakpack goods container.

In accordance with one or more aspects of the disclosed embodiment the container storage locations are arrayed along pick aisles connected by the container autonomous transport travel loop at each level of the at least one storage level, the container autonomous transport travel loop being configured to provide the at least one autonomous container transport vehicle at each level, access to each of the pick aisles.

In accordance with one or more aspects of the disclosed embodiment the warehousing system further comprises lifts connected via transfer stations to the container autonomous transport travel loop, each lift being configured to lift one or both of the supply containers and the breakpack goods containers into and out of the at least one elevated storage level.

In accordance with one or more aspects of the disclosed embodiment the warehousing system further comprises inbound/outbound conveyors, the inbound/outbound conveyors being configured to:
  transport inbound supply containers from a depalletizer, to the at least one storage level, and
  transport outbound supply containers and filled breakpack goods containers to a palletizer, to a truck, or a downstream process.

In accordance with one or more aspects of the disclosed embodiment the at least one storage level includes an elevated storage level.

In accordance with one or more aspects of the disclosed embodiment a warehousing system for storing and retrieving goods in containers is provided. The warehousing system comprises:
  a multilevel storage array, each level of which has a transport area and a storage area, the storage area including an array of storage shelves configured to hold containers thereon, and the transport area being substantially continuous and arranged to communicably connect the storage shelves to each other, the transport area including picking aisles and a container transfer deck connecting the picking aisles;
  at least one autonomous guided container transport vehicle, distinct from the container transfer deck, located on each level of the multilevel storage array and configured to traverse the container transfer deck and picking aisles on each level and transport containers accessed to and from container storage locations on each of the storage shelves on each level of the multilevel storage array between a breakpack operation station, at each level of the multilevel storage array, and container storage locations on the storage shelves, the at least one autonomous guided container transport vehicle being configured to respectively transport supply goods containers and breakpack goods containers;
  a breakpack goods transfer deck at each level of the multilevel storage array, separate and distinct from the container transfer deck so that a respective level has the container transfer deck and the breakpack goods transfer deck separate and distinct from each other and separately coupled to the breakpack operation station;

wherein the breakpack goods transfer deck is configured so that at least one autonomous guided breakpack goods transport vehicle traverses the breakpack goods transfer deck and transports breakpack goods from the breakpack operation station into corresponding breakpack goods containers for transport by the at least one autonomous guided container transport vehicle on the container transfer deck; and a controller configured to effect operation of the at least one autonomous guided container transport vehicle between the container storage locations, the breakpack operation station, and a breakpack goods container located along the breakpack goods transfer deck.

In accordance with one or more aspects of the disclosed embodiment the controller is configured to effect operation of the at least one autonomous guided breakpack goods transport vehicle so that transport of the breakpack goods, by the at least one autonomous guided breakpack goods transport vehicle traverse on the breakpack goods transfer deck, sorts the breakpack goods to corresponding breakpack goods containers.

In accordance with one or more aspects of the disclosed embodiment the controller is configured to effect operation of the at least one autonomous guided container transport vehicle so that the at least one autonomous guided container transport vehicle accesses corresponding breakpack goods containers at the breakpack goods transfer deck and transports the breakpack goods containers via traverse along the container transfer deck to at least one of a container output station and a corresponding container storage location of storage shelves of a corresponding level of the multilevel storage array.

In accordance with one or more aspects of the disclosed embodiment the breakpack goods transfer deck joins the breakpack operation station and the container transfer deck at a separate location from each access of the container transfer deck to the breakpack operation station for the at least one autonomous guided container transport vehicle.

In accordance with one or more aspects of the disclosed embodiment the at least one autonomous guided container transport vehicle is configured to autonomously travel unconstrained along and across the container transfer deck.

In accordance with one or more aspects of the disclosed embodiment the at least one autonomous guided breakpack goods transport vehicle is configured to autonomously travel unconstrained along and across the breakpack goods transfer deck.

In accordance with one or more aspects of the disclosed embodiment the breakpack goods transfer deck has multiple travel lanes for travel of the at least one autonomous guided breakpack goods transport vehicle along the breakpack goods transfer deck, at least one of the multiple travel lanes being a passing lane for the at least one autonomous guided breakpack goods transport vehicle travel passing an obstruction on another of the multiple travel lanes.

In accordance with one or more aspects of the disclosed embodiment the container transfer deck has multiple travel lanes for travel of the at least one autonomous guided container transport vehicle along the container transfer deck, at least one of the multiple travel lanes having a travel sense opposite to another travel lane sense of another of the multiple travel lanes, and the at least one of the multiple travel lanes defining a queue lane for the at least one autonomous guided container transport vehicle at a breakpack goods interface, the breakpack goods interface coupling respective edges of the container transfer deck and the breakpack goods transfer deck.

In accordance with one or more aspects of the disclosed embodiment the at least one autonomous guided breakpack goods transport vehicle is configured so as to automatically unload the breakpack goods from the at least one autonomous guided breakpack goods transport vehicle to breakpack goods containers at the breakpack goods interface.

In accordance with one or more aspects of the disclosed embodiment the at least one autonomous guided container transport vehicle is configured to autonomously pick and place the breakpack goods containers at the breakpack goods interface.

In accordance with one or more aspects of the disclosed embodiment the breakpack goods interface has more than one breakpack goods interface locations arrayed at least along a substantially whole edge of the breakpack goods transfer deck, each breakpack goods interface location being configured to hold a respective breakpack goods container.

In accordance with one or more aspects of the disclosed embodiment the container transfer deck is disposed on a deck surface of a deck at a respective level of the multilevel storage, and the breakpack goods transfer deck is disposed on a different deck surface of the deck, separate and distinct from the deck surface where the container transfer deck is disposed.

In accordance with one or more aspects of the disclosed embodiment the at least one autonomous guided breakpack goods transport vehicle has a payload hold configured dissimilar from the at least one autonomous guided container transport vehicle.

In accordance with one or more aspects of the disclosed embodiment the breakpack goods are unpacked from the supply goods containers at the breakpack operation station, and the at least one autonomous guided breakpack goods transport vehicle is configured so as to be loaded with the breakpack goods at the breakpack operation station.

In accordance with one or more aspects of the disclosed embodiment the at least one autonomous guided container transport vehicle is configured to autonomously transfer the supply goods containers from the at least one autonomous guided container transport vehicle to the breakpack operation station.

In accordance with one or more aspects of the disclosed embodiment the container storage locations are arrayed along the picking aisles connected by the container transfer deck at each level of the multilevel storage array, the container transfer deck being configured to provide the at least one autonomous guided container transport vehicle at each level, access to each of the picking aisles.

In accordance with one or more aspects of the disclosed embodiment the warehousing system further comprises lifts connected via transfer stations to the container transfer deck, each lift being configured to lift one or both of the supply goods containers and the breakpack goods containers into and out of the multilevel storage array.

In accordance with one or more aspects of the disclosed embodiment the warehousing system further comprises inbound/outbound conveyors, the inbound/outbound conveyors being configured to:

transport inbound supply goods containers from a depalletizer, to the multilevel storage array, and transport outbound supply goods containers and filled breakpack goods containers to a palletizer or to a truck.

In accordance with one or more aspects of the disclosed embodiment a product order fulfillment system of mixed product units is provided. The system includes a storage array, with at least one elevated storage level, wherein mixed product units are input and distributed in the storage array in cases, of product units of common kind per case; an automated transport system, with at least one asynchronous transport system, for level transport, and a lift for between level transport, communicably connected to the storage array so as to automatically retrieve and output, from an output of the storage array, product units distributed in the cases in a common part of the at least one elevated storage level of the storage array, the output product units being one or more of mixed singulated product units, in mixed packed groups, and in mixed cases; wherein the at least one asynchronous transport system, and the lift are configured so as to form more than one transport echelon, each echelon being communicably connected with the common part and the output, and each effecting orthogonal sortation, corresponding to the transport echelon, of the product units distributed in the common part, so that sorted mixed output product units of the corresponding transport echelon are in predetermined sequence, wherein the orthogonal sortation of product units by each transport echelon is orthogonal to the orthogonal sortation of each other of the more than one transport echelon so that each transport echelon is an orthogonal transport echelon to each other transport echelon, of the more than one transport echelon, combined in output of the output product units of the one or more of the mixed singulated product units, the mixed packed groups, and the mixed cases each sorted in predetermined sequence.

In accordance with one or more aspects of the disclosed embodiment the orthogonal sortation of each transport echelon, effecting output of product units in predetermined sequence is independent of one or more of order sequence and order time.

In accordance with one or more aspects of the disclosed embodiment the orthogonal sortation of each echelon is informed by recursive sortation determination.

In accordance with one or more aspects of the disclosed embodiment the product order fulfillment system further comprises a controller configured so as to determine recursive sortation informing the orthogonal sortation of each orthogonal sortation echelon.

In accordance with one or more aspects of the disclosed embodiment the controller is communicably coupled to the asynchronous transport system and configured to generate with the orthogonal transport echelons the orthogonal sortation of each transport echelon.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. A product order fulfillment system of mixed product units, the system comprising:
a storage array, wherein mixed product units are input and distributed in the storage array in cases, of product units of common kind per case; and
an automated transport system, with at least one asynchronous transport system, for level transport, and a lift for between level transport, communicably connected to the storage array so as to automatically retrieve and output, from an output of the storage array, product units distributed in the cases in a common part of the storage array, the output product units being one or more of mixed singulated product units, in mixed packed groups, and in mixed cases;
wherein the at least one asynchronous transport system, and the lift are configured so as to form more than one transport echelon, each echelon being communicably connected with the common part and the output, and each effecting orthogonal sortation, corresponding to the transport echelon, of the product units distributed in the common part, so that sorted mixed output product units of the corresponding transport echelon are in predetermined sequence, wherein the orthogonal sortation of product units by each transport echelon is orthogonal to the orthogonal sortation of each other of the more than one transport echelon so that each transport echelon is an orthogonal transport echelon to each other transport echelon, of the more than one transport echelon, combined in output of the output product units of the one or more of the mixed singulated product units, the mixed packed groups, and the mixed cases each sorted in predetermined sequence.

2. The product order fulfillment system of claim 1, wherein the orthogonal sortation of each transport echelon, effecting output of product units in predetermined sequence is independent of one or more of order sequence and order time.

3. The product order fulfillment system of claim 1, wherein the orthogonal sortation of each echelon is informed by recursive sortation determination.

4. The product order fulfillment system of claim 1, further comprising a controller configured so as to determine recursive sortation informing the orthogonal sortation of each orthogonal sortation echelon.

5. The product order fulfillment system of claim 1, wherein the controller is communicably coupled to the asynchronous transport system and configured to generate with the orthogonal transport echelons the orthogonal sortation of each transport echelon.

6. The product order fulfillment system of claim 1, wherein the storage array has at least one elevated storage level.

7. A warehousing system for storing and retrieving goods in containers, the warehousing system comprising:
at least one storage level having
a container autonomous transport travel loop, disposed at the at least one storage level, and
container storage locations arrayed peripherally along the container autonomous transport travel loop, at least one of the container storage locations being a supply container storage location, and another of the container storage locations being a breakpack goods container storage location,
wherein the at least one storage level has a breakpack goods autonomous transport travel loop disposed at the at least one storage level, separate and distinct from the container autonomous transport travel loop, and has a breakpack goods interface coupling respective edges of the container autonomous transport travel loop and the breakpack goods autonomous transport travel loop;
at least one autonomous container transport vehicle confined to the at least one storage level, the at least one autonomous container transport vehicle being configured to respectively transport along the container autonomous transport travel loop,
a supply container between the supply container storage location and a breakpack operation station, and
a breakpack goods container between the breakpack goods interface and the breakpack goods container storage location,
wherein the breakpack goods autonomous transport travel loop is disposed to confine at least one autonomous breakpack goods transport vehicle to the at least one storage level, the at least one autonomous breakpack goods transport vehicle being arranged for transporting, along the breakpack goods autonomous transport travel loop, one or more breakpack goods between the breakpack operation station and the breakpack goods interface; and
a controller configured to effect operation of the at least one autonomous container transport vehicle and the at least one autonomous breakpack goods transport vehicle for assembling orders of breakpack goods from supply containers into breakpack goods containers.

8. The warehousing system of claim 7, wherein the at least one autonomous container transport vehicle is configured to autonomously travel unconstrained along and across the container autonomous transport travel loop.

9. The warehousing system of claim 7, wherein the at least one autonomous breakpack goods transport vehicle is configured to autonomously travel unconstrained along and across the breakpack goods autonomous transport travel loop.

10. The warehousing system of claim 7, wherein the breakpack goods autonomous transport travel loop has multiple travel lanes for travel of the at least one autonomous breakpack goods transport vehicle along the breakpack goods autonomous transport travel loop, at least one of the multiple travel lanes being a passing lane for the at least one autonomous breakpack goods transport vehicle travel passing an obstruction on another of the multiple travel lanes.

11. The warehousing system of claim 7, wherein the container autonomous transport travel loop has multiple travel lanes for travel of the at least one autonomous container transport vehicle along the container autonomous transport travel loop, at least one of the multiple travel lanes having a travel sense opposite to another travel lane sense of another of the multiple travel lanes, and the at least one of the multiple travel lanes defining a queue lane for the at least one autonomous container transport vehicle at the breakpack goods interface.

12. The warehousing system of claim 7, wherein the container autonomous transport travel loop is disposed on a deck surface of a deck at the at least one storage level, and the breakpack goods autonomous transport travel loop is disposed on a different deck surface of the deck, separate and distinct from the deck surface where the container autonomous transport travel loop is disposed.

13. The warehousing system of claim 7, wherein the at least one autonomous breakpack goods transport vehicle has a payload hold configured dissimilar from the at least one autonomous container transport vehicle.

14. The warehousing system of claim 7, wherein the one or more breakpack goods are unpacked from the supply container at the breakpack operation station, and the at least one autonomous breakpack goods transport vehicle is configured so as to be loaded with the one or more breakpack goods at the breakpack operation station.

15. The warehousing system of claim 7, wherein the at least one autonomous breakpack goods transport vehicle is configured so as to automatically unload the one or more breakpack goods from the at least one autonomous breakpack goods transport vehicle to the breakpack goods containers at the breakpack goods interface.

16. The warehousing system of claim 7, wherein the at least one autonomous container transport vehicle is configured to autonomously transfer the supply containers from the at least one autonomous container transport vehicle to the breakpack operation station.

17. The warehousing system of claim 7, wherein the at least one autonomous container transport vehicle is configured to autonomously pick and place the breakpack goods containers at the breakpack goods interface.

18. The warehousing system of claim 7, wherein the breakpack goods interface has more than one breakpack goods interface locations arrayed at least along a substantially whole edge of the breakpack goods autonomous transport travel loop, each breakpack goods interface location being configured to hold a respective breakpack goods container.

19. The warehousing system of claim 7, wherein the container storage locations are arrayed along pick aisles connected by the container autonomous transport travel loop at each level of the at least one storage level, the container autonomous transport travel loop being configured to provide the at least one autonomous container transport vehicle at each level, access to each of the pick aisles.

20. The warehousing system of claim 7, further comprising lifts connected via transfer stations to the container autonomous transport travel loop, each lift being configured to lift one or both of the supply containers and the breakpack goods containers into and out of the at least one storage level.

21. The warehousing system of claim 20, further comprising inbound/outbound conveyors, the inbound/outbound conveyors being configured to:
transport inbound supply containers from a depalletizer, to the at least storage level, and
transport outbound supply containers and filled breakpack goods containers to a palletizer, to a truck, or a downstream process.

22. The warehousing system of claim 7, wherein the at least one storage level includes an elevated storage level.

23. A warehousing system for storing and retrieving goods in containers, the warehousing system comprising:
at least one storage level having a container autonomous transport travel loop, disposed at the at least one storage level, and having
container storage locations arrayed peripherally along the container autonomous transport travel loop, at least one of the container storage locations being a supply container storage location, and
a container outfeed station disposed along the container autonomous transport travel loop,
wherein the at least one storage level
has a breakpack goods autonomous transport travel loop disposed at the at least one storage level, separate and distinct from the container autonomous transport travel loop, and
has a breakpack goods interface, coupling respective edges of the container autonomous transport travel loop and the breakpack goods autonomous transport travel loop, with a breakpack goods container holding location;
at least one autonomous container transport vehicle confined to the at least one storage level, the at least one autonomous container transport vehicle being configured to respectively transport along the container autonomous transport travel loop, a supply container between the supply container storage location and a breakpack operation station, and a breakpack goods container between the breakpack goods container holding location and the container outfeed station, wherein the breakpack goods autonomous transport travel loop is disposed to confine at least one autonomous breakpack goods transport vehicle to the at least one storage level, the at least one autonomous breakpack goods transport vehicle being arranged for transporting, along the breakpack goods autonomous transport travel loop, one or more breakpack goods between the breakpack operation station and the breakpack goods interface; and a controller configured to effect operation of the at least one autonomous container transport vehicle and the at least one autonomous breakpack goods transport vehicle for assembling orders of breakpack goods from supply containers into breakpack goods containers and outfeed of breakpack goods containers through the container outfeed station.

24. A warehousing system for storing and retrieving goods in containers, the warehousing system comprising:

a multilevel storage array, each level of which has a transport area and a storage area, the storage area including an array of storage shelves configured to hold containers thereon, and the transport area being substantially continuous and arranged to communicably connect the storage shelves to each other, the transport area including picking aisles and a container transfer deck connecting the picking aisles;

at least one autonomous guided container transport vehicle, distinct from the container transfer deck, located on each level of the multilevel storage array and configured to traverse the container transfer deck and picking aisles on each level and transport containers accessed to and from container storage locations on each of the storage shelves on each level of the multilevel storage array between a breakpack operation station, at each level of the multilevel storage array, and container storage locations on the storage shelves, the at least one autonomous guided container transport vehicle being configured to respectively transport supply goods containers and breakpack goods containers;

a breakpack goods transfer deck at each level of the multilevel storage array, separate and distinct from the container transfer deck so that a respective level has the container transfer deck and the breakpack goods transfer deck separate and distinct from each other and separately coupled to the breakpack operation station;

wherein the breakpack goods transfer deck is configured so that at least one autonomous guided breakpack goods transport vehicle traverses the breakpack goods transfer deck and transports breakpack goods from the breakpack operation station into corresponding breakpack goods containers for transport by the at least one autonomous guided container transport vehicle on the container transfer deck; and a controller configured to effect operation of the at least one autonomous guided container transport vehicle between the container storage locations, the breakpack operation station, and a breakpack goods container located along the breakpack goods transfer deck.

25. A method comprising:

providing a storage array, wherein mixed product units are input and distributed in the storage array in cases, of product units of common kind per case; and providing an automated transport system, with at least one asynchronous transport system, for level transport, and a lift for between level transport, communicably connected to the storage array so as to automatically retrieve and output, from an output of the storage array, product units distributed in the cases in a common part of the storage array, the output product units being one or more of mixed singulated product units, in mixed packed groups, and in mixed cases; and effecting orthogonal sortation, with more than one transport echelon formed by the at least one asynchronous transport system and the lift, of the product units distributed in the common part, so that sorted mixed output product units of the corresponding transport echelon are in predetermined sequence, wherein the orthogonal sortation of product units by each transport echelon is orthogonal to the orthogonal sortation of each other of the more than one transport echelon so that each transport echelon is an orthogonal transport echelon to each other transport echelon, of the more than one transport echelon, combined in output of the output product units of the one or more of the mixed singulated product units, the mixed packed groups, and the mixed cases each sorted in predetermined sequence, where each echelon is communicably connected with the common part and the output.

26. The method of claim 25, wherein the orthogonal sortation of each transport echelon, effecting output of product units in predetermined sequence is independent of one or more of order sequence and order time.

27. The method of claim 25, wherein the orthogonal sortation of each echelon is informed by recursive sortation determination.

28. The method of claim 25, further comprising determining, with a controller, recursive sortation informing the orthogonal sortation of each orthogonal sortation echelon.

29. The method of claim 25, wherein the controller is communicably coupled to the asynchronous transport system and configured to generate with the orthogonal transport echelons the orthogonal sortation of each transport echelon.

30. The method of claim 25, wherein the storage array has at least one elevated storage level.

* * * * *